(12) United States Patent
Sharma et al.

(10) Patent No.: US 10,778,731 B2
(45) Date of Patent: Sep. 15, 2020

(54) COMMUNICATIONS METHODS, APPARATUS AND SYSTEMS FOR CONSERVING MEDIA RESOURCE FUNCTION RESOURCES

(71) Applicant: Ribbon Communications Operating Company, Inc., Westford, MA (US)

(72) Inventors: Ashish Sharma, Bangalore (IN); Nagesh Kumar Bollapalli, Bangalore (IN)

(73) Assignee: RIBBON COMMUNICATIONS OPERATING COMPANY, INC., Westford, MA (US)

( * ) Notice: Subject to any disclaimer, the term of this patent is extended or adjusted under 35 U.S.C. 154(b) by 0 days.

(21) Appl. No.: 16/147,829

(22) Filed: Sep. 30, 2018

(65) Prior Publication Data

US 2019/0036983 A1   Jan. 31, 2019

Related U.S. Application Data

(63) Continuation of application No. 14/870,509, filed on Sep. 30, 2015, now Pat. No. 10,129,300.

(30) Foreign Application Priority Data

Aug. 18, 2015 (IN) ............................ 4317/CHE/2015

(51) Int. Cl.
*H04L 29/06* (2006.01)
*H04L 12/707* (2013.01)

(52) U.S. Cl.
CPC .......... *H04L 65/1069* (2013.01); *H04L 45/22* (2013.01); *H04L 65/1006* (2013.01); *H04L 65/1026* (2013.01); *H04L 65/605* (2013.01)

(58) Field of Classification Search
CPC . H04L 65/1069; H04L 65/1006; H04L 65/22; H04L 65/1026; H04L 65/605;
(Continued)

(56) References Cited

U.S. PATENT DOCUMENTS 9,497,108 B2 * 11/2016 Larkin .................. H04L 65/104
9,674,242 B1 * 6/2017 Fritz .................... H04L 65/1006
(Continued)

*Primary Examiner* — Patrice L Winder
*Assistant Examiner* — Aye M Aung
(74) *Attorney, Agent, or Firm* — Straub & Straub; Stephen T. Straub; Michael P. Straub

(57) ABSTRACT

Communications methods, apparatus and systems for conserving Media Resource Function (MRF) resources by identifying streams of sessions, for example, non-real time streams, which can be routed to avoid use of MRF resources. An exemplary embodiment includes receiving by a SBC a session initiation request from a first device directed to a second device for a session including a plurality of streams; establishing a plurality of routes to the second device, said routes including at least a first route and a second route, the first route not including a media content processing entity and the second route including a media content processing entity; identifying from the streams for the session a first set of streams; said first set of streams including one or more streams that do not require media content processing; and routing one or more of the streams of the first set of streams via the first route.

20 Claims, 24 Drawing Sheets

(58) Field of Classification Search
CPC ... H04L 45/22; H04L 65/105; H04L 65/1073; H04L 65/1036; H04L 65/1093; H04L 65/4038; H04L 12/6418; H04L 65/44
See application file for complete search history.

(56) References Cited

U.S. PATENT DOCUMENTS

| | | | |
|---|---|---|---|
| 2006/0274730 A1* | 12/2006 | Medlock | H04L 29/06027 370/352 |
| 2013/0044644 A1* | 2/2013 | Ku | H04L 65/1016 370/259 |
| 2013/0177011 A1* | 7/2013 | Carter | H04L 65/1043 370/352 |
| 2013/0279494 A1* | 10/2013 | Panattu Sethumadhavan | H04L 65/1069 370/352 |
| 2016/0219093 A1* | 7/2016 | Gangadharan | H04L 65/1006 |
| 2017/0019632 A1* | 1/2017 | Lad | H04N 5/23296 |
| 2017/0251028 A1* | 8/2017 | Bollapalli | H04L 67/141 |
| 2018/0013893 A1* | 1/2018 | Cohen | G06F 17/289 |

\* cited by examiner

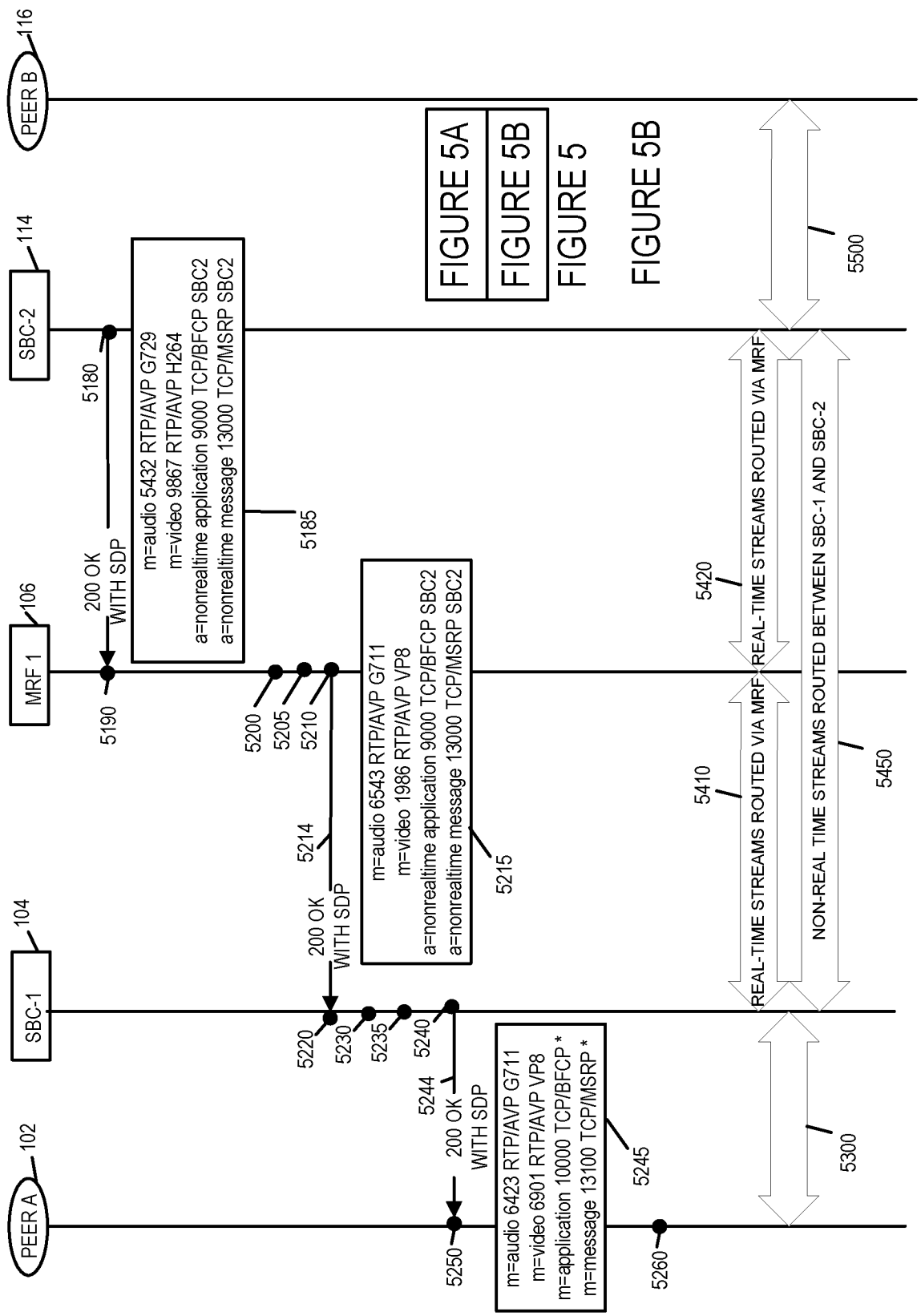

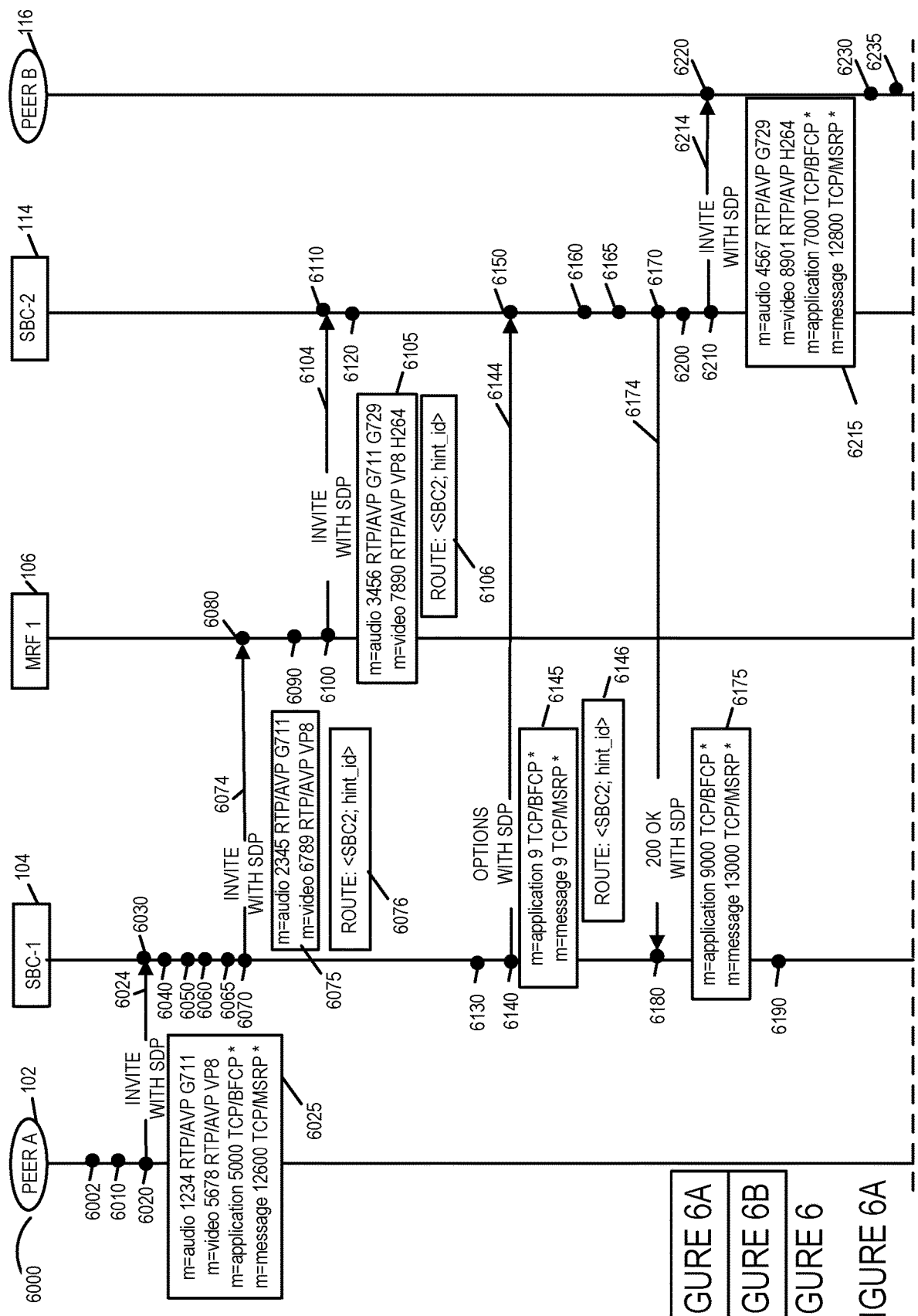

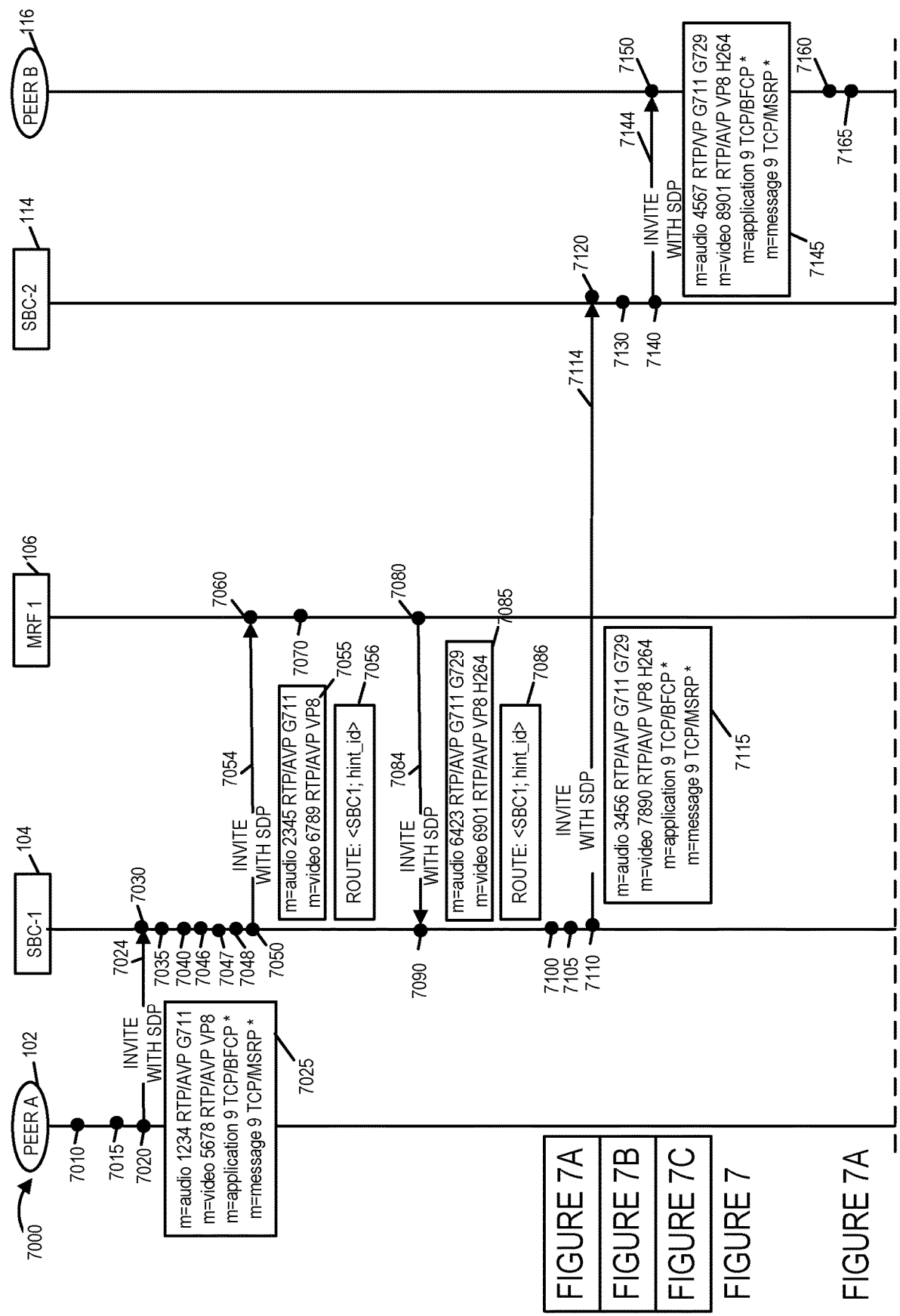

ROUTE: <SBC1; hint_id>

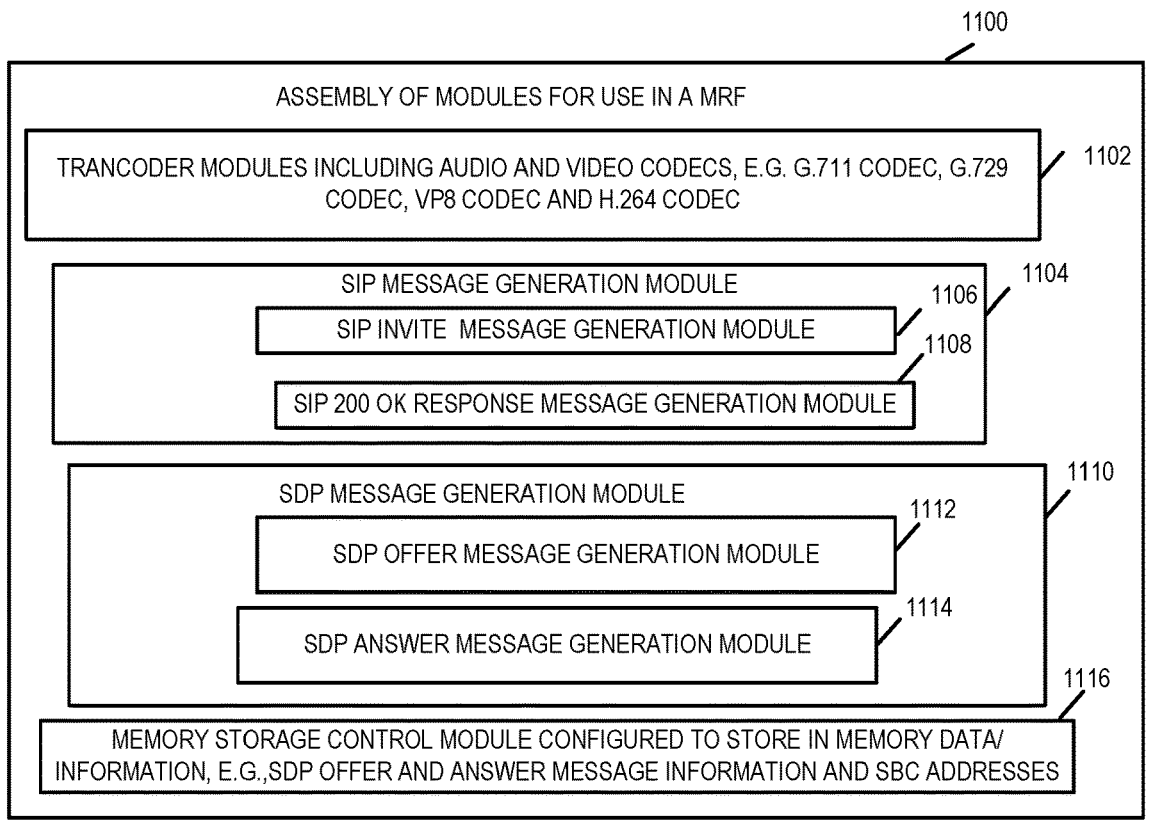
FIGURE 11
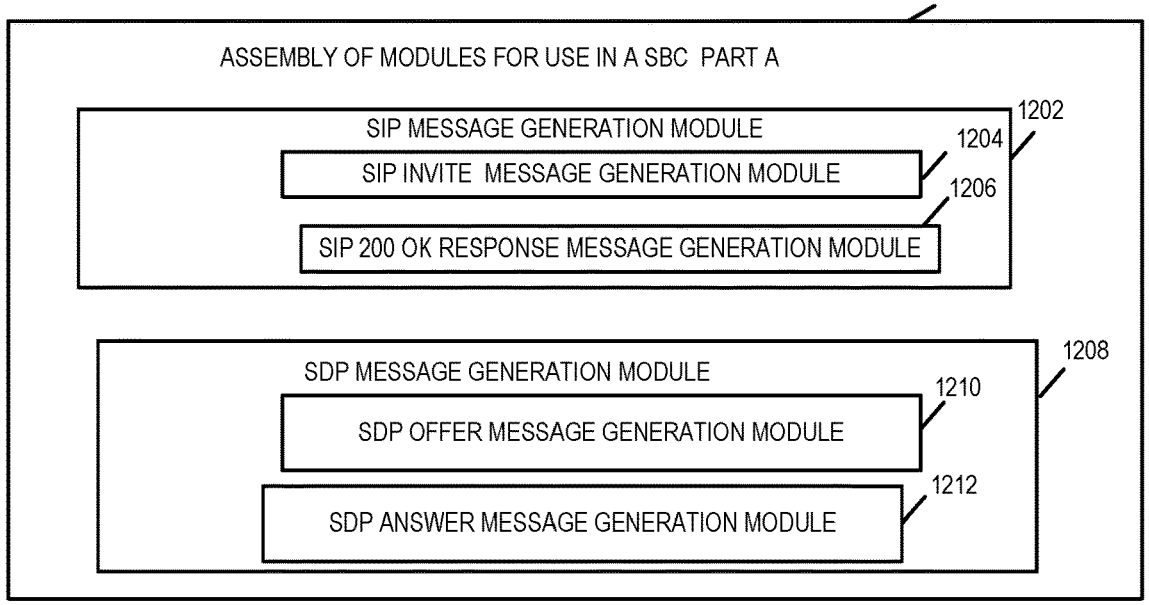
FIGURE 12A
| FIGURE 12A |
|---|
| FIGURE 12B |
FIGURE 12

```
┌─────────────────────────────────────────────────────────────────────────┐
│ ESTABLISH A PLURALITY OF ROUTES TO THE SECOND DEVICE, SAID PLURALITY OF ROUTES │ 1500A
│ INCLUDING AT LEAST A FIRST ROUTE AND A SECOND ROUTE, THE FIRST ROUTE NOT INCLUDING A │
│    MEDIA CONTENT PROCESSING ENTITY, E.G., A MULTIMEDIA RESOURCE FUNCTION (MRF)  │
│    APPARATUS, AND THE SECOND ROUTE INCLUDING A MEDIA CONTENT PROCESSING ENTITY  │
└─────────────────────────────────────────────────────────────────────────┘
```

```
┌─────────────────────────────────────────────────────────────────────────┐ 1502
│    GENERATE, AT THE FIRST SBC, IN RESPONSE TO RECEIVING THE FIRST SESSION       │
│   INITIATION REQUEST, A SECOND SESSION INITIATION REQUEST, THE SECOND SESSION   │
│   INITIATION REQUEST BEING A SECOND SIP INVITE REQUEST INCLUDING A SECOND SDP   │
│   MESSAGE AND A RECORD-ROUTE HEADER WITH THE ADDRESS OF THE FIRST SBC AND       │
│   SAID SECOND SDP MESSAGE DOES NOT INCLUDE INFORMATION ON THE STREAMS TO BE     │
│   ROUTE VIA THE FIRST ROUTE, THE INFORMATION ON THE STREAMS TO BE ROUTED VIA    │
│   THE FIRST ROUTE INCLUDED IN THE SECOND SESSION INITIATION REQUST BEING A CALL │
│         LEG SESSION IDENTIFIER INCLUDED IN THE SIP ROUTE HEADER                 │
└─────────────────────────────────────────────────────────────────────────┘
```

```
┌─────────────────────────────────────────────────────────────────────────┐ 1504
│    SEND THE SECOND SESSION INITIATION REQUEST TO A SECOND SBC VIA THE MEDIA     │
│                         CONTENT PROCESSING ENTITY                               │
└─────────────────────────────────────────────────────────────────────────┘
```

```
┌─────────────────────────────────────────────────────────────────────────┐
│ SEND, FROM THE FIRST SBC TO THE SECOND SBC WITHOUT TRAVERSING THE MEDIA │
│   CONTENT PROCESSING ENTITY, A SIP OPTIONS REQUEST WITH A THIRD SESSION │ 1506
│   DESCRIPTION PROTOCOL (SDP) MESSAGE AND A ROUTE HEADER, THE THIRD SDP  │
│  MESSAGE INCLUDING INFORMATION CORRESPONDING TO THE STREAMS FROM THE    │
│    SESSION TO BE ROUTED VIA THE FIRST ROUTE, AND THE SIP OPTIONS REQUEST│
│       ROUTE HEADER INCLUDING THE CALL LEG SESSION IDENTIFIER            │
└─────────────────────────────────────────────────────────────────────────┘
```

```
┌─────────────────────────────────────────────────────────────────────────┐
│    RECEIVE, AT THE SECOND SBC, THE SIP OPTIONS REQUEST AND A THIRD      │
│    SESSION INITIATION REQUEST, SAID THIRD SESSION INITIATION REQUEST    │ 1508
│   BEING SENT FROM THE MEDIA CONTENT PROCESSING ENTITY AND INCLUDING     │
│       A FOURTH SESSION DESCRIPTION MESSAGE AND THE PROPRIETARY          │
│         INFORMATION INCLUDED IN THE SECOND INITATION REQUEST            │ 1510
└─────────────────────────────────────────────────────────────────────────┘
```

```
┌─────────────────────────────────────────────────────────────────────────┐
│   GENERATE A FOURTH SESSION INITIATION REQUEST, AT THE SECOND SBC, BASED ON    │
│   THE SIP OPTIONS REQUEST AND THE THIRD SESSION INITATION REQUEST, THE FOURTH  │
│   SESSION INITIATION REQUEST INCLUDING A FIFTH SESSION DESCRIPTION PROTOCOL    │
│   MESSAGE INCLUDING INFORMATION ON STREAMS TO BE ROUTED VIA THE FIRST ROUTE    │
│                            AND THE SECOND ROUTE                                │
└─────────────────────────────────────────────────────────────────────────┘
```
1512
```
┌─────────────────────────────────────────────────────────────────────────┐
│     SEND, FROM THE SECOND SBC, THE FOURTH SESSION INITIATION REQUEST TO THE    │
│                                SECOND DEVICE                                   │
└─────────────────────────────────────────────────────────────────────────┘
```
1514
```
┌─────────────────────────────────────────────────────────────────────────┐
│  RECEIVE, AT THE SECOND SBC FROM THE SECOND DEVICE, IN RESPONSE TO THE FOURTH  │
│     SESSION INITIATION REQUEST A FIRST RESPONSE MESSAGE, SAID FIRST RESPONSE   │
│                   MESSAGE INCLUDING A SIXTH SDP MESSAGE                        │
└─────────────────────────────────────────────────────────────────────────┘
```
1516
```
┌─────────────────────────────────────────────────────────────────────────┐
│  GENERATE, AT THE SECOND SBC, A SECOND RESPONSE MESSAGE INCLUDING A SEVENTH   │
│  SDP MESSAGE, SAID SECOND RESPONSE MESSAGE BEING BASED ON SAID FIRST RESPONSE │
│  MESSAGE AND INCLUDING INFORMATION ON THE STREAMS TO BE ROUTED VIA THE SECOND │
│                                   ROUTE                                        │
└─────────────────────────────────────────────────────────────────────────┘
```
1518
```
┌─────────────────────────────────────────────────────────────────────────┐
│        SEND, FROM THE SECOND SBC, THE SECOND RESPONSE MESSAGE TO THE MEDIA     │
│                             CONTENT PROCESSING ENTITY                          │
└─────────────────────────────────────────────────────────────────────────┘
```

| FIGURE 15A |
|------------|
| FIGURE 15B |

COMMUNICATIONS METHODS, APPARATUS AND SYSTEMS FOR CONSERVING MEDIA RESOURCE FUNCTION RESOURCES

RELATED APPLICATION

The present application is a continuation of U.S. patent application Ser. No. 14/870,509 filed on Sep. 30, 2015 which claims the benefit of the filing date of Indian Provisional Application S.N. 4317/CHE/2015 filed on Aug. 18, 2015 both of which are hereby expressly incorporated by reference in their entirety.

FIELD

The present invention relates to communications methods, apparatus and systems and more particularly to conserving Media Resource Function (MRF) resources by identifying streams of sessions, such as for example, non-real time streams which can be routed in a way that avoids use of MRF resources.

BACKGROUND

With the advent and proliferation of different technologies, each of which optimized different access-types and each of which employ different codecs, it is not an uncommon phenomenon that a call gets transcoded as it traverses various networks employing different kinds of technology. For example, different codecs are used for coding and decoding voice traffic carried in different networks. By way of example, in LTE networks Adaptive Multi-Rate codecs are used for voice; in CDMA networks Enhanced Variable-Rate Codecs (EVRCs) are used for voice, in Web Real-time Communication (WebRTC) networks OPUS codecs are used for voice; and in traditional Public Switched Telephone Networks (PSTNs) G.711 codecs are used for voice. In a similar way, different codecs are employed for the transmission of video across different networks optimized for technologies. For example, in LTE networks the use of H.264 codecs is recommended for video while in a WebRTC network VP8 codecs are used for video transmission. Video which is another form of real-time traffic typically requires media relay with policing but for interconnecting certain networks such as MSLync, WebRTC or Enterprise networks video transcoding is required.

As a result, Session Border Controllers (SBCs) employed in these networks therefore need to be able to provide transcoding not only for audio streams but also video streams. SBC nodes typically provide video transcoding by invoking Media Resource Function nodes and/or equipment referred to herein as MRFs, which have specialized functions to provide audio and video transcoding. The SBCs typically invoke an MRF using a Session Initiation Protocol (SIP) based interface. For example, in some instances a call is routed via an MRF and the MRF egresses the call by acting as a SIP Back-to-Back User Agent (B2BUA). A SIP session can consist of real time and non-real time streams. Examples of real time streams which may be included in a session are audio streams, e.g., carrying voice data, video streams, e.g., carrying core-video and whiteboard sharing data, and image streams, e.g., carrying fax data. Non-real time streams include application streams such as for example Message Session Relay Protocol (MSRP) streams, Binary Floor Control Protocol (BFCP) streams and Far End Camera Control protocol streams.

Most video calls involve whiteboard sharing that requires a Binary Floor Control Protocol (BFCP) stream. In addition to this a video stream may also require a Far End Camera Control (FECC) stream. Also some of the sessions have Message Session Relay Protocol streams such as when providing Rich Communications Services (RCS).

The Binary Floor Control Protocol is defined in the Request for Proposal (RFC) 4582 published by the Internet Engineering Task Force (IETF). As described in RFC 4582, floor control is a means to manage joint or exclusive access to shared resources in a (multiparty) conferencing environment. Thereby, floor control complements other functions—such as conference and media session setup, conference policy manipulation, and media control—that are realized by other protocols. BFCP is used between floor participants and floor control servers, and between floor chairs (i.e., moderators) and floor control servers. Within a conference, some applications need to manage the access to a set of shared resources, such as the right to send media to a particular media session. Floor control enables such applications to provide users with coordinated (shared or exclusive) access to these resources. BFCP is a non-real time stream.

MSRP is a non-real time session-oriented instant message transport protocol defined in the IETF Request for Proposal (RFC) 4975 published by the Internet Engineering Task Force.

And, Far End Camera Control protocol (FECC) stream is described in the IETF Request for Proposal (RFC) 4573 as a non-real time stream used by participants to control the remote camera in conversational video applications. In conversational video applications, far-end camera control protocol is used by participants to control the remote camera. The protocol that is commonly used is ITU (International Telecommunication Union) H.281 over H.224.

While MRFs support real-time streams such as audio and video streams and provide transcoding for the streams, the MRFs typically don't support performing Message Session Relay Protocol (MSRP) or Far End Camera Control protocol streams relay.

If the MRFs receive and pass through these non-real time protocol communication streams such as BFCP and MSRP streams, MRF resources/ports will be used for these non-real time streams impacting MRF ports used for transcoding on real-time streams.

In view of the above discussion, there is a need for new methods, apparatus and systems to conserve Media Resource Function (MRF) resources by identifying streams of sessions, for example non-real time streams, which can be routed in a way that avoids use of MRF resources.

In view of the above there is also a need for new methods, apparatus and systems that can route streams identified as not requiring MRF resources in a way that avoids use of MRF resources.

In view of the above there is also a need for new methods, apparatus and systems that can route streams identified as not supported by a MRF in a way that avoids use of the MRF's resources.

SUMMARY

The present invention includes communications methods, apparatus and systems directed to addressing one or more of the needs identified above. Various new methods, apparatus and systems are described to conserve Media Resource Function (MRF) resources by identifying non-real time streams of sessions which can be routed in a way that avoids use of MRF resources and routing those streams without using MRF resources.

An exemplary communications method in accordance with one embodiment of the present invention comprises receiving, by a first Session Border Controller (SBC), a first session initiation request from a first device directed to a second device for a session including a plurality of streams; establishing, by the first SBC, a plurality of routes to the second device, said plurality of routes including at least a first route and a second route, the first route not including a media content processing entity and the second route including a media content processing entity; identifying, by the first SBC, from the plurality of streams for the session a first set of streams; said first set of streams including one or more streams that do not require media content processing; and routing, by the first SBC, one or more of the streams of the first set of streams of the session to the second device via the first route.

In some embodiments, the communications method further includes routing via the second route, by the first SBC, the streams of the plurality of streams that are not routed to the second device via the first route.

In some embodiments of the communications method, the first route bypasses the media content processing entity.

In some embodiments of the communication method the first SBC identifies data-channel streams included in the session for inclusion in the first set of streams.

In some embodiments of the communications method at least one of the streams that do not require media content processing is routed to the second device via the first route.

In some embodiments of the communications method the session initiation request includes a first session description protocol (SDP) message including information describing the plurality of streams included in the session; and identification of the first set of streams is based on the information describing the plurality of streams included in the first SDP message.

In some embodiments of the communications method the first session initiation request is a Session Initiation Protocol (SIP) Invite request and the first and second routes include a second Session Border Controller, the method further includes: routing, by the first SBC, at least some of the plurality of streams for the session via the second route.

In some embodiments of the communications method the first session initiation request is a Session Initiation Protocol (SIP) Invite request and the second route includes a second Session Border Controller, the method further includes: routing, by the first SBC, at least some of the plurality of streams for the session via the first route and some of the of the plurality of streams of the session via the second route.

In some embodiments of the communications method, the first Session Border Controller routes the non-real time and real-time streams of the plurality of streams of the session to a Peer destination device without routing the streams via a second Session Border Controller. In some of such embodiments, the real-time streams of the session are: (i) sent, by the first Session Border Controller, to a Media Resource Function (MRF) node for media content processing, e.g., transcoding, transrating and/or transizing; (ii) received from the MRF node after being processing, and (iii) then sent, by the first Session Border Controller, to the Peer destination device along with the non-real time streams of the sessions.

In some embodiments of the communications method the establishing a plurality of routes to the second device includes: generating, at the first SBC, in response to receiving the first session initiation request, a second session initiation request, the second session initiation request being a second SIP Invite request including a second SDP message and a Record-Route header with the address of the first SBC, said second SIP Invite request including information on the streams to be routed via the first route in one or more proprietary Session Initiation Protocol (SIP) headers, one or more proprietary extensions to one or more existing SIP headers, or one or more proprietary attributes of the second SDP message; and sending the second session initiation request to the second SBC via the media content processing device. In some of such embodiments, the one or more existing SIP headers is a SIP Route header.

In some of communications method the second SDP message does not include information on the streams to be routed via the first route, the information on the streams to be routed via the first route included in the second session initiation request is a call leg session identifier included in the SIP Route header; and the establishing a plurality of routes to the second device step of the method further includes: sending, from the first SBC to the second SBC without traversing the media content processing entity, a SIP Options request with a third session description protocol (SDP) message and a route header, the third SDP message including information corresponding to the streams from the session routed via the first route, and the SIP Options request route header including the call leg session identifier.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 5 comprises the combination of FIG. 5A and FIG. 5B.

FIG. 5B illustrates a second part of an exemplary signaling diagram and method in accordance with an exemplary embodiment of the present invention.

FIG. 6 comprises the combination of FIGS. 6A and 6B.

FIG. 6A illustrates a first part of an exemplary signaling diagram and method in accordance with an exemplary embodiment of the present invention.

FIG. 7 comprises the combination of FIGS. 7A, 7B and 7C.

FIG. 7A illustrates a first part of an exemplary signaling diagram and method in accordance with an exemplary embodiment of the present invention.

FIG. 8 comprises FIGS. 8A and 8B.

FIG. 11 illustrates an exemplary assembly of modules for use in a media content processing entity, e.g., MRF, in accordance with an embodiment of the present invention.

FIG. 12 comprises FIGS. 12A and 12B.

FIG. 12A illustrates a first part of an exemplary assembly of modules for use in a Session Border Controller in accordance with an exemplary embodiment of the present invention.

FIG. 14 comprises FIGS. 14A and 14B.

FIG. 15 comprises FIGS. 15A and 15B.

FIG. 15A illustrates a first part of a flowchart providing additional exemplary sub-steps of the route establishment step of the exemplary method illustrated in FIG. 13 in accordance with an embodiment of the present invention.

DETAILED DESCRIPTION

The present invention relates to methods, systems and apparatus for identifying streams in a session that can routed in such a way as to avoid use of MRF resources thereby conserving MRF resources for streams which require transcoding or other multi-media resource functionality.

Figure 1A:
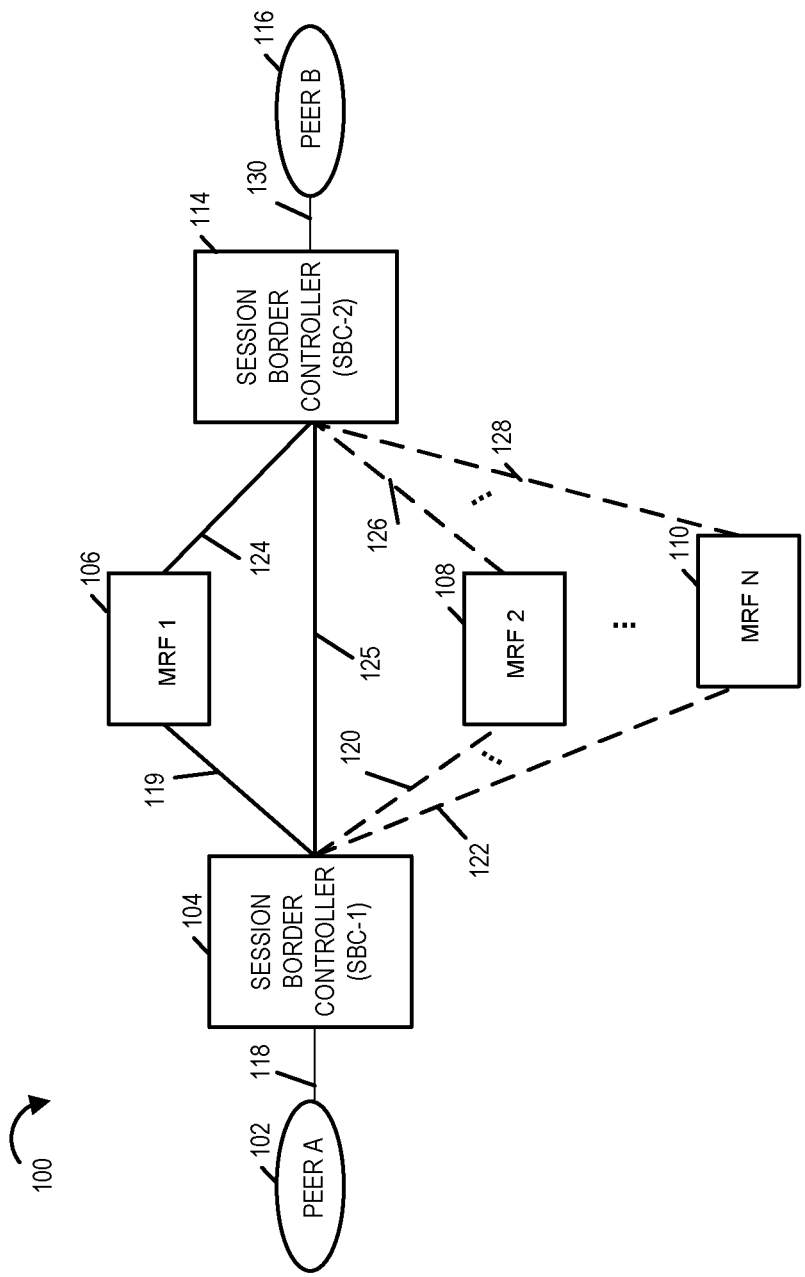
FIG. 1A illustrates an exemplary system implemented in accordance with an exemplary embodiment of the invention.

FIG. 1A is a drawing illustrating an exemplary communications system in accordance with an embodiment of the present invention. FIG. 1A includes a Peer node A 102, a Session Border Controller (SBC-1) 104, a MRF node 1(MRF 1) 106, a MRF node 2 (MRF 2) 108, . . . , MRF node N 110, a Session Border Controller (SBC-2) 114, a peer B 116, and communication links 118, 119, 120, . . . , 122, 124, 126, . . . , 128, and 130. The Peer node A 102 is coupled to SBC-1 104 via communication link 118. SBC-1 104 is coupled to MRF 1 106, MRF 2 108, . . . , MRF N 110 via communication links 119, 120, . . . , 122 respectively. SBC-2 114 is coupled to MRF 1 106, MRF 2 108, . . . , MRF N 110 via communication links 124, 126, . . . , 128 respectively. SBC-2 114 is coupled to peer B 116 via communication link 130. In the exemplary embodiment peer nodes A and B are user equipment such as for example, smart phones and peer media nodes such as SBCs and/or gateways. SBC-1 104 is coupled to SBC-2 114 via communications link 125. MRF 2 108, . . . , MRF N 110 are optional elements of the exemplary system 100 as are communication links 120, . . . , 122 and 126, . . . , 128.

Figure 1B:
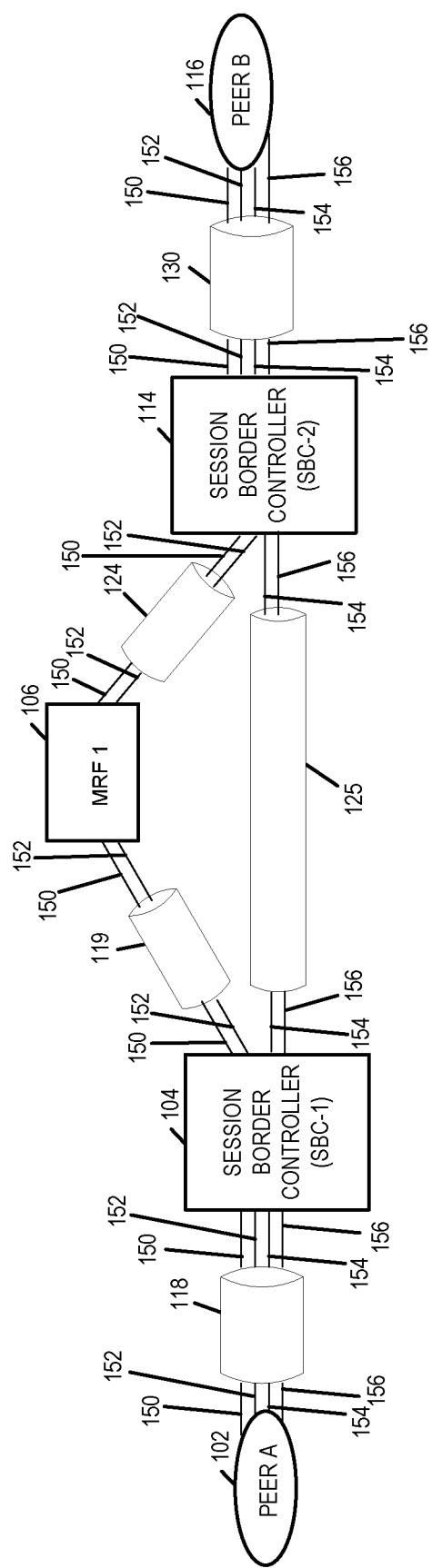
FIG. 1B illustrates an exemplary system with real and non-real time signal streams in accordance with an embodiment of the present invention.

FIG. 1B is a portion of the exemplary system 100 in which signal streams of a session have been shown. Elements with the same numerals in the Figures are the same or similar and will not be described in detail again. In FIG. 1A includes a first session with a real-time audio stream 150, a real-time video stream 152, a non-real time BFCP stream 154, and a non-real time MRSRP stream 156. FIG. 1B illustrates how the real-time audio stream 150 and real-time video stream 152 of the first session are routed via MRF 1 106 where the signal streams may, and in some embodiments do, undergoing media processing, e.g., transrating, transcoding, transizing, etc., while the non-real time streams of the session, non-real time BFCP stream 154 and non-real time MSRP stream 156 are routed so as to bypass MRF 1 106.

Figure 2:
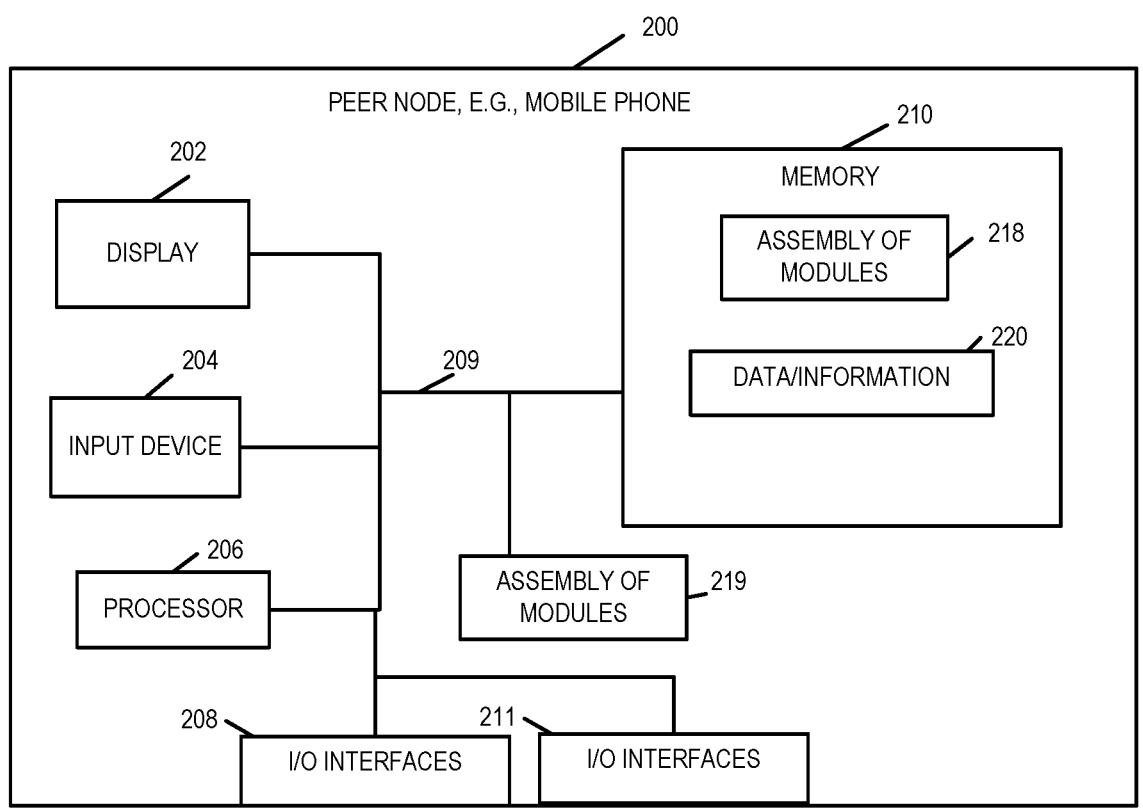
FIG. 2 illustrates an exemplary peer node in accordance with an exemplary embodiment of the invention.

FIG. 2 illustrates an exemplary embodiment of a peer node in accordance with one embodiment of the present invention. Exemplary peer node 200 includes a display 202, an input device 204 such as a keypad, a processor 206, e.g., a CPU, I/O interfaces 208 and 211 which include receivers and transmitters, which couple the peer node to various devices such as SBCs and networks, memory 210, and an assembly of modules 219, e.g., circuits corresponding to different modules, coupled together via a bus 209 over which the various elements may interchange data and information. Memory 210 includes an assembly of modules 218, e.g., an assembly of software modules, and data/information 220. The assembly of modules 219 and/or 218 include modules for communicating over Internet Protocol networks using Session Initiation Protocol (SIP) and Session Description Protocol (SDP). The exemplary Peer A node 102 and Peer B node 116 shown in FIGS. 1, 5, 6 and 7 respectively are in some embodiments implemented in accordance with exemplary Peer node 200 of FIG. 2. The exemplary peer node 200 may, and in some embodiments is, implemented as a device such a Voice Over Internet Phone, a mobile phone, smartphone, tablet, laptop computer or other communications device.

Figure 3:
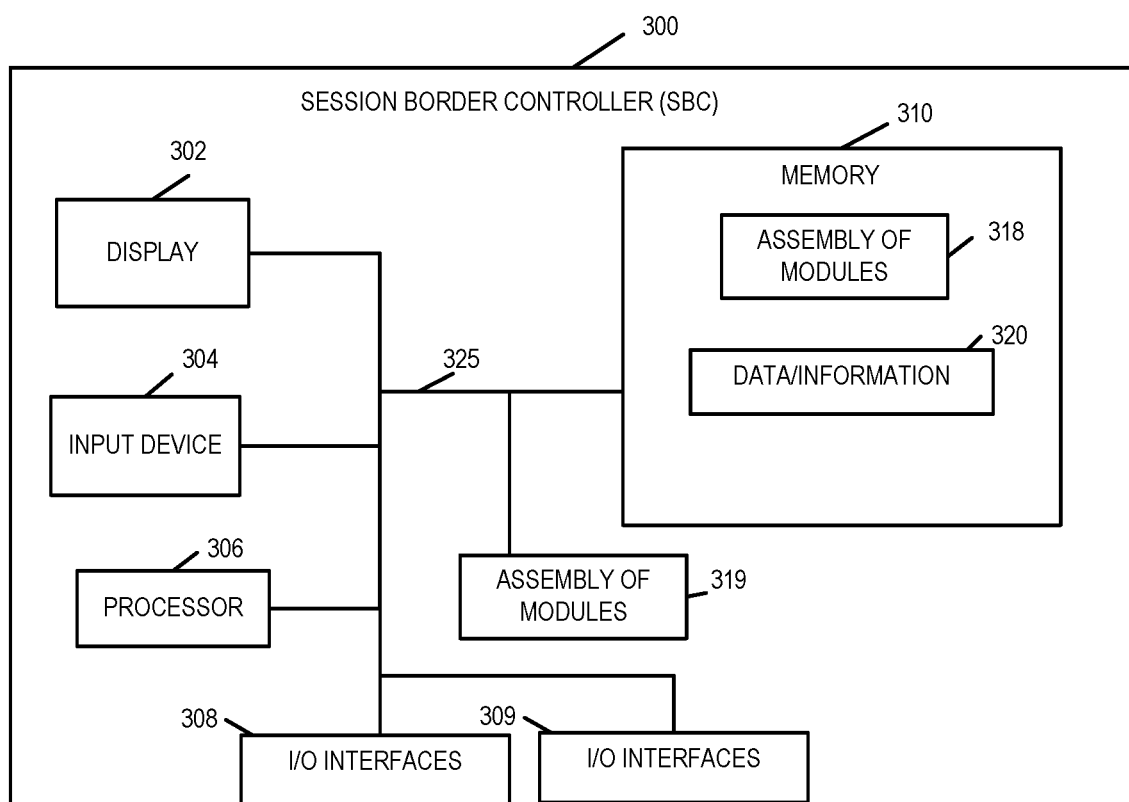
FIG. 3 illustrates an exemplary Session Border Controller in accordance with an exemplary embodiment of the invention.

FIG. 3 illustrates an exemplary embodiment of a Session Border Controller in accordance with one embodiment of the present invention. Exemplary session border controller 300 includes a display 302, an input device 304, a processor 306, e.g., a CPU, I/O interfaces 308 and 309, which couple the SBC to a core network or various other devices including peer nodes, MRF nodes and user equipment, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320.

Figure 4:
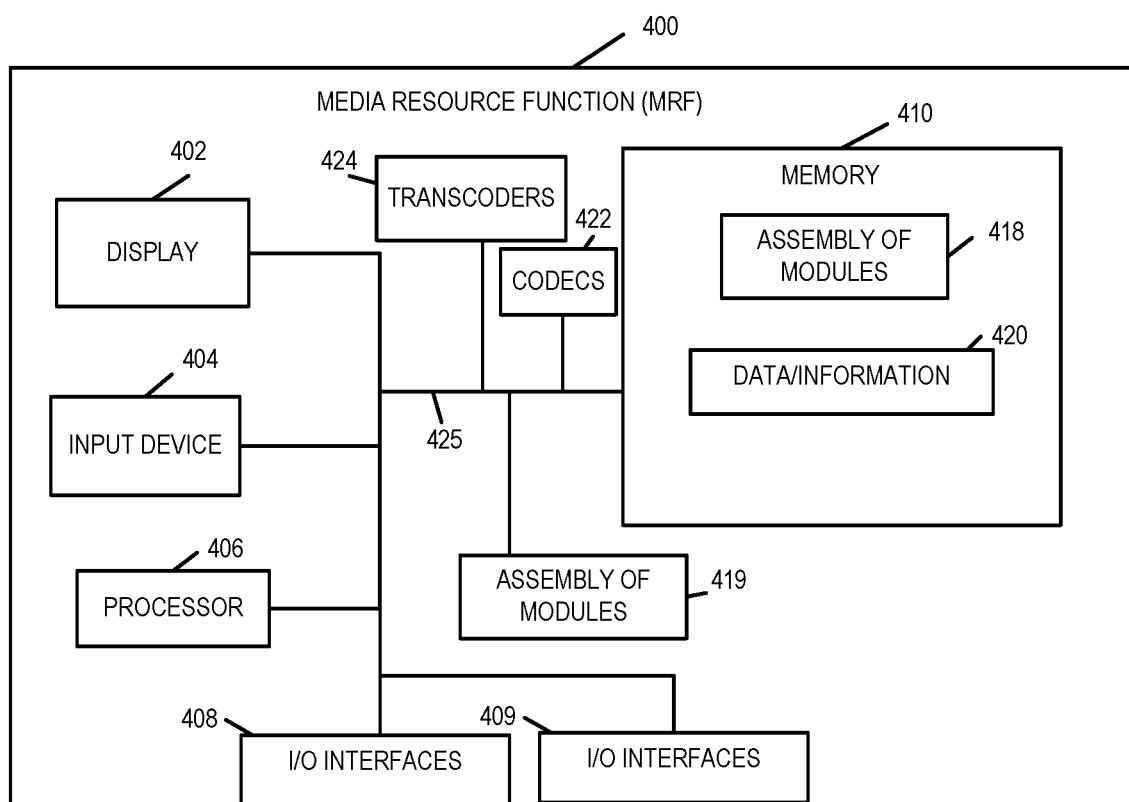
FIG. 4 illustrates an exemplary media content processing entity implemented as a Media Resource Function in accordance with an exemplary embodiment of the present invention.

FIG. 4 illustrates an exemplary embodiment of a Media Function Resource node 400 in accordance with one embodiment of the present invention. Exemplary MRF 400 includes a display 402, an input device 404, a processor 406, e.g., a CPU, I/O interfaces 408 and 409, which couple the MRF to a core network or various other devices such as for example SBCs, codecs 422 such as audio and video codecs used for coding and decoding various media signals, transcoders 424 used for transcoding media signals, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420.

In connection with exemplary embodiment of FIG. 1, Session Initiation Protocol (SIP) is used to manage communication streams of a session, e.g., real-time and non-real time streams such as for example RTP audio and video streams and non-real time MSRP, BFCP and FECC streams, over the communication links of the networks. The Peers A 102 and B 116 may be, and in some embodiments are, end user equipment such as smartphones generating communication streams either using SIP or H.323. The Session Border Controllers SBC-1 104 and SBC-2 114 invoke Media Resource Functions to perform services, e.g., transcoding of the real-time streams such as for example, audio, video and image streams received in sessions, e.g., VOIP or multimedia call sessions, established between Peer A 102 and Peer B 116. SBC invokes an MRF, e.g., SBC-1 104 invokes an MRF, e.g., MRF 1 106 from the plurality of MRF nodes MRF 1 106, MRF 2, 108, . . . , MRF N 110 available to provide services such as transcoding services to SBC-1 104. The SBC-1 104 invokes the MRF 1 106 as a Back-to-Back User Agent (B2BUA) mode of invocation in which the MRF acts as a B2BUA. In this mode of invocation the MRF acts as a SIP Back-to-Back User Agent between both (logical) SBCs of a communication session. The MRF divides the communication channel into two call legs and manages the SIP signaling between both ends of the call from session establishment to session termination. With respect to the originating leg of the communication session the MRF acts as a SIP User Agent Server (UAS) and processes the request as a SIP User Agent Client (UAC) to the destination end in this way it processes the SIP signaling between the end points in a back-to-back manner. Prior to invoking an MRF, SBC-1 and/or SBC-2 receive session requests from the Peer nodes A 102 and/or B 116 and determine which streams of each session can be routed directly between the SBCs to conserve MRF resources and which streams require MRF services such as transcoding and need to be routed through an MRF. The SBCs exchange certain SDP attributes between SBC 1 and SBC 2 during the session establishment process that results in the real-time streams such as the audio and video streams of the session being routed via MRF and non-real time streams such as MSRP, BFCP, FECC being routed directly between SBC-1 104 and SBC-2 114.

An exemplary method of the present invention is now explained using the exemplary system 100 of FIG. 1 in which Peer A 102 is a user device such as a smartphone which has initiated a multi-media call/communication session to Peer B 116 a cellphone. In FIG. 1, the ingress SBC-1 104 receives a Session Initiation Protocol (SIP) Invite message including a Session Description Protocol (SDP) message over communications link 118. Based upon the information corresponding to the streams for the session included in the SDP message included in the received SIP Invite message, the SBC-1 104 identifies the set of streams to be included in the call/communication session to be established which do not require MRF services and/or determines which streams to be included in the call do require MRF services, such as for example transcoding. In one exemplary embodiment, SBC-1 104 identifies the real-time streams of the session to be routed via an MRF and the non-real time streams of the session to be routed so as to not pass through an MRF but to bypass the MRF.

The non-real time communications such as for example BFCP or MSRP streams do not require either anchoring or UDP/TCP payload analysis at the transcoding network elements. Furthermore, these non-real time streams do not require any synchronization with real time streams such as Real-time Transport Protocol (RTP) media streams. As a result, the non-real time streams such as for example, BFCP, MSRP and FECC streams are typically identified as streams which be routed in a manner that bypasses the MRF nodes.

SBC-1 104 identifies MRF 1 106 from the plurality of MRFs, MRF 1 106, MRF 2 108, . . . , MRF N 110 available to provide transcoding services for a session. SBC-1 104 also identifies the egress SBC as SBC-2 114.

SBC-1 104 then invokes MRF 1 106 in a back to back user agent mode (B2BUA mode of operation) for transcoding the real-time streams of the session, e.g., audio and video streams. MRF 1 106 when in B2BUA mode receives and forwards the call to the egress SBC, SBC-2 114 whose address is specified by SBC-1 114 while invoking MRF 1 106. The information on the non-real time streams is exchanged in proprietary attributes between SBC-1 and SBC-2. This results in the real-time streams being routed via MRF 1 106 over communications links 119 and 124 and the non-real time streams being routed from SBC-1 104 to SBC-2 114 bypassing MRF 1 106 over communications link 125. Both the real-time and non-real time streams of the session are routed from SBC-114 to Peer B over communications link 130. The call flows change depending on how the proprietary information is exchanged between SBC-1 104 and SBC-2 114. In one embodiment, SBC-1 104 which anchors the session non-real media encodes the non-real time media stream information in a proprietary attribute of an SDP offer or as an embedded SDP in a Route header and sends it via MRF-1 106 to the egress SBC, SBC-2 114. The egress SBC, SBC-2 114, decodes this proprietary information received in the SDP as if it came in the main SDP offer message and handles the call regularly. In the SDP answer message the egress SBC does the reverse and the ingress SBC decodes the proprietary attribute for the non-real time streams of the session and processes it as if it was received in the main SDP answer message. In some embodiments, the proprietary information corresponding to the streams that are not to be routed via the MRF are passed in a proprietary header or in proprietary extension of an existing header such as a Route header of a SIP INVITE message. SBC-1 104 and SBC-2 114 may be, and in some embodiments are implemented in accordance with the SBC 300 of FIG. 3. In some embodiments, the Peer A 102 and Peer B 116 are implemented in accordance with the Peer node 200 illustrated in FIG. 2. In some embodiments, the MRF 1 106, MRF 2 108, ... MRF N 110 are implemented in accordance with MRF node 400 of FIG. 4.

Figure 9:
FIG. 9 illustrates an exemplary SIP proprietary extension to a SIP route header in accordance with an embodiment of the present invention.

In most embodiments Session Initiation Protocol (SIP) signaling is used to communicate between the various devices of FIG. 1 to setup routing paths for the streams of a call/communication session. FIG. 9 illustrates the format of an exemplary SIP proprietary extension to a SIP route header 910 in accordance with an embodiment of the present invention. SIP route header 910 is in the format ROUTE: <SBC1; hint_id> where ROUTE indicates it is a route header, SBC1 is the address of SBC-1 104 and hint_id is a proprietary extension that is used to identify the call leg of a session.

Figure 10:
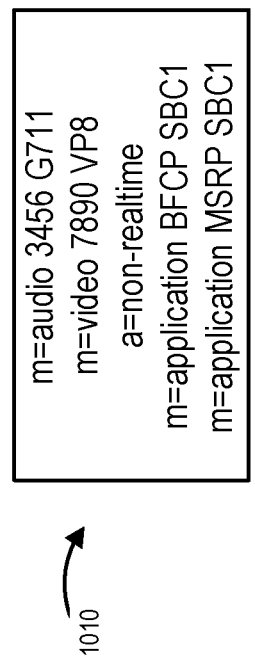
FIG. 10 illustrates an exemplary SDP message media field with a proprietary attribute in accordance with an embodiment of the present invention.

FIG. 10 illustrates the format of an exemplary SDP message media field 1010 with a proprietary attribute in accordance with an embodiment of the present invention. The SDP message field includes four m-line descriptions describing the four streams for the session. The m=audio 3456 G711 describes the first stream as an audio stream with a receiving RTP port of 3456 and G711 codec format. The m=video 7890 VP8 describes the second stream as an main-video stream with a receiving port of 7890 and a VP8 codec format. The a=non-realtime attribute indicates the start of the SDP message proprietary attribute. It identifies that this attribute line contains a description for a non-real time stream and there could be multiple of such attributes. The m=application 9 TCP/BFCP SBC1 is the proprietary description for the third stream of the session. It is a non-real time BFCP stream that is to be routed from SBC1. SBC1 is the identifier for SBC-1 104. In some embodiments, SBC-1 is the IP address and port for SBC-1. The m=message 7654 TCP/MSRP SBC1 is the proprietary description for the four stream of the session. It is a non-real time MSRP stream that is to be routed from SBC1. SBC1 is the identifier for SBC-1 104. In some embodiments, SBC-1 is the IP address and port for SBC-1.

Figure 5A:
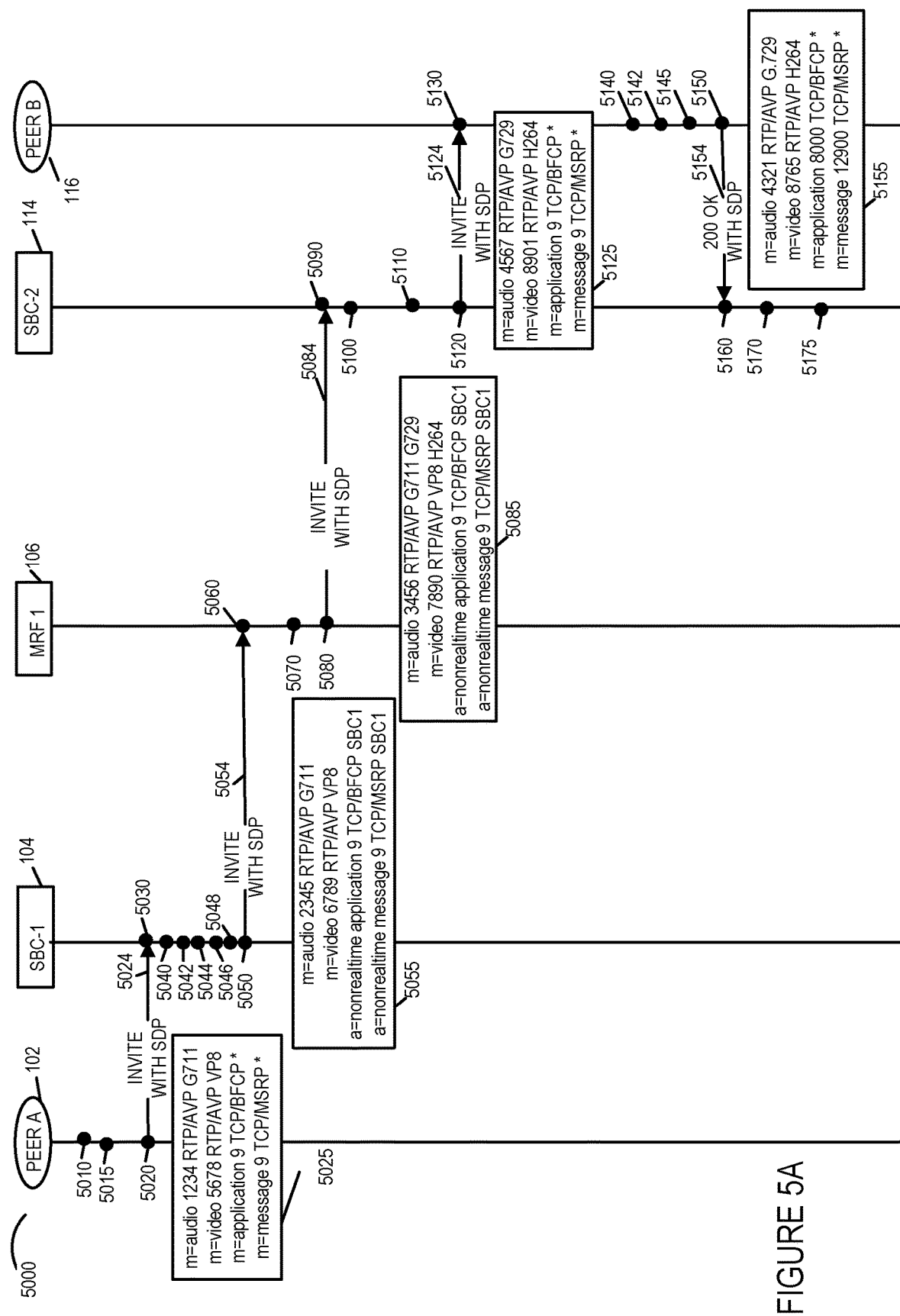
FIG. 5A illustrates a first part of an exemplary signaling diagram and method in accordance with an exemplary embodiment of the present invention.

FIG. 5 consisting of a first part FIG. 5A and a second part FIG. 5B shows a signaling diagram 5000 illustrating the exemplary communications system 100 with signaling and the steps implemented as part of an exemplary method of determining and establishing routing paths different streams of a session. The routing of the different resulting in a conservation of MRF resources. Elements or steps with the same reference numbers used in different figures are the same or similar and those elements or steps will not be described in detail again.

In the signaling diagram 5000, the MRF acts as a B2BUA where the SBCs invoke the MRF to be included in the media path for media transcoding. The MRFs in this mode supports Session Initiation Protocol Route header based loose routing as described in the Internet Engineering Task Force Request For Comment 3621. In this example a peering deployment is used wherein a centralized Session Initiation Protocol (SIP) policy and routing server is employed to provide end to end routing while an MRF is used as a centralized video transcoding/transrating/transizing resource to support various internetworking scenarios. In the example, the SBCs chain the MRF to setup a call that requires transcoding from the audio/video perspective. The use of the term transcoding is used interchangeably with terms transrating and transsizing. In this example, Session Initiation Protocol SIP messaging with Session Description Protocol (SDP) offer and exchange is used to establish the session. In general, Peer A 102 the offerer and originator of the session generates an SDP message that constitutes the offer—the set of media streams and codecs the offerer wishes to use, along with the IP addresses and ports the offerer would like to use to receive the media. The offer is conveyed to the other participant, called the answerer which in this case is the Peer B 116. The answerer generates an answer, which is an SDP message that responds to the offer provided by the offerer. The answer has a matching media stream for each stream in the offer, indicating whether the stream is accepted or not, along with the codecs that will be used and the IP addresses and ports that the answerer wants to use to receive media. In this example, a media processing entity MRF 1 106 is included in the path to provide transcoding that allows the offerer and answerer to communicate even if they do not both support the same codecs. The SBC-1 104 and SBC-2 114 are session border controllers which are on the edge of the network and facilitate the setup and routing of the communications session. Each portion of the call from Peer A 102 to SBC-1 104, SBC-104 to MRF 1 106, MRF 1 106 to SBC-2 114, and SBC-2 114 to Peer B 116 includes a SIP INVITE with a SDP offer message and a SIP response message with SDP answer message. In this example for a variety of reasons including to conserve MRF resources and because the MRF in some embodiments does not support non-real time streams, the ingress SBC-1 104 modifies the SDP offer of Peer A 114 so as to create a route for the non-real time streams of the session that bypasses the MRF 1 106. In this way, SBC-1 104 can conserve MRF resources and costs associated with using MRF resources such as for example licensing fees while still being able to provide the requested services to Peer A. Details of the steps and signaling of the exemplary method 5000 illustrated in FIG. 5 will now be provided.

Operation of the method begins in start step 5010 shown on FIG. 5A. Operation proceeds from start step 5010 to step 5015.

In step 5015, Peer A 102 generates a SIP Invite message 5024 to initiate a call session, e.g., a Voice Over Internet Protocol (VOIP) multi-media video conferencing call session, with Peer B 116. The SIP Invite message 5024 includes a SDP offer message which includes the description of the session being offered by Peer A 102 to Peer B 116. IETF RFC 4566 describes the SDP: Session Description Protocol. The SDP message which includes the session description generally includes the following information the session name and purpose, time(s) the session is active, the media comprising the session and information needed to receive the media such as for example, addresses, ports, and formats. With respect to the media and transport information, the SDP message includes information describing the type of media such as for example audio, video and image media data, the transport protocol such as for example Real-time Transport Protocol (RTP)/User Datagram Protocol (UDP)/Internet Protocol (IP), H.320, etc. and the format of the media such as for example, H.261 video, MPEG video, etc. In addition, the SDP message includes the address and port details to which the media data is sent, e.g., the remote IP address and remote port to which the media is being sent. The SDP session description contains a number of lines of text of the form: <type>=<value>. For example, "m=<media> <proto><fmt>" refers to the media information describing a particular media stream. <media> is the media type which include "audio", "video", "text", "application", and "message." <port> is the transport port to which the media stream is to be sent. <proto> is the transport protocol and <fmt> is the media format description. Some of the fields and/or attributes of the SDP messages included in SIP Invite message 5024 are shown in box 5025. For ease of explanation and clarity only some of the SDP message fields and attributes are shown and described in connection with the figures of the application and the format of the fields and attributes are provided are exemplary and representative. The SDP message fields of the SIP Invite message 5024 are m=audio 1234 RTP/AVP G711, m=video 5678 VP8, m=application 9 TCP/BFCP*, m=message 9 TCP/MSRP*. The m=audio 1234 RTP/AVP G711 field indicates that the session is to include an audio stream, the port address to which the stream is to be sent is 1234 and that the audio stream is encoded in a G.711 ITU-T standard codec format. The m=video 5678 RTP/AVP VP8 attribute indicates that the session is to include a video media stream, port address is 5678 and the video is encoded in open source VP8 video compression format. The m=application 9 TCP/BFCP* attribute indicates that the session is to include a non-real time application BFCP stream. The m=message 9 TCP/MSRP* indicates that the session is to include a non-real time application MSRP stream.

Operation proceeds from step 5015 to step 5020. In step 5020, Peer A 102 sends the SIP Invite message 5024 to Peer B 116 via SBC-1 104 to initiate a conference call session with Peer B 116. Operation proceeds from step 5020 to step 5030.

In step 5030 the ingress SBC-1 104 receives the SIP Invite message 5024. Operation proceeds from step 5030 to step 5040. In step 5040, the SBC-1 104 determines from the SIP policy and routing server which egress peer the call needs to be routed to and which egress SBC will be used. In this case, the determined egress peer is Peer B 116 and the determined egress SBC is SBC-2 114. Operation proceeds from step 5040 to step 5042.

In step 5042, based at least in part on the Packet Service Profile (PSP) of the ingress Trunk Group which includes entries for the media, e.g., audio/video, encoding methods supported on the ingress Trunk Group and the Packet Service Profile of the egress Trunk Group which includes entries for the media, e.g., audio/video, encoding methods supported on the egress Trunk Group facing the respective ingress and egress peers respectively, a decision is made, by SBC-1 104, apriori whether to invoke an MRF to be included in the path or not. In some embodiments, SBC-1 104, the ingress SBC, determines whether or not to include MRF-1 106 in the call path based in part on information provided in the SDP message of the SIP INVITE message 5024. For example, in some embodiments, SBC-1 104 determines to include a MRF in the call path when one or more audio, video, and/or auxiliary video media streams are indicated as being streams which are part of the call session. In some embodiments, the ingress SBC makes a determination not to include a MRF in the call path when no real-time streams are indicated as being included in the session. In some embodiments, the ingress SBC makes a determination to include a MRF in the call path when real-time streams are indicated as being included in the session. In some embodiments, the ingress SBC always includes a MRF initially in the call path but later removes the MRF for the call path when it is determined that media content processing such as transcoding is not required. If the decision is not to invoke an MRF then the MRF is not included in the media path for the call and the SBC-1 104 sends the call to SBC-2 114. If the decision is to invoke an MRF to be included in the path, then SBC-1 104 invokes an MRF. In this example, the decision is to invoke a Media Resource Function node 1 (MRF 1) 106 as a back-to-back user agent to perform processing on the media of the multi-media streams, e.g., to perform transcoding on the real-time media streams, based on the SIP Invite message 5024 includes a real-time audio media stream encoded using a G.711 codec and a real-time video stream encoded using a VP8 codec. Operation proceeds from step 5042 to step 5044.

In step 5044, the SBC-1 104 selects one of the available MRFs from a list of MRFs stored in its memory that are available to provide transcoding services to various media flows. Stored in memory along with the identity of the MRF is the address of the MRF. In this example, MRF 1 106 is selected. Operation proceeds from step 5044 to step 5046.

In step 5046, SBC-1 104 identifies from the plurality of streams for the session included in the SDP offer message a first set of streams, the first set of streams including one or more streams that do not require media content processing, e.g., transcoding, transrating or transizing of media. In this example, the SBC-1 104 identifies the streams that do not require media content processing based on information describing the plurality of streams for the session included in the SDP message of the SIP Invite message 5024. In some embodiments, the ingress SBC, SBC-1 104, determines that non-real time streams do not require media content processing and identifies those streams as the first set of streams. In some embodiments, determining which of the streams of the plurality of streams of the session are non-real time streams is based on at least one of a media type, a transport protocol type, or a format type of the stream. In some embodiments, the ingress SBC determines that the following Message Session Relay Protocol (MSRP) streams, Binary Floor Control Protocol (BFCP) and Far End Camera Control protocol streams are not real-time streams, do not include media content processing, and are identified as streams to be included in the first set of streams. In some embodiments, the ingress SBC determines which of the plurality of streams included in the session are real-time streams and excludes those streams from the first set of streams. In some embodiments, the ingress SBC determines which of the plurality of streams included in the session are audio or video streams and excludes those streams from the first set of streams. In this example, SBC-1 104 makes the following determinations based on the media fields of the SDP message of the SIP Invite message 5024: (i) the m=audio stream is a real-time stream and that it should not be including in the first set of streams, (ii) the m=video stream is a real-time stream and that is should not be included in the first set of streams, (iii) the m=application BFCP stream is a non-real time stream, does not require media content processing such as for example transcoding and includes it in the first set of streams for the session, and (iv) the m=message MSRP stream is a non-real time stream, does not require media content processing such as for example transcoding and includes it in the first set of streams for the session. In some embodiments, the ingress SBC determines which of the session streams is to be in the first set of streams based on whether the selected MRF supports the stream type. Those streams which are not supported by the selected MRF are identified and included in the first set of streams. Operation proceeds from step 5046 to step 5048.

In step 5048, SBC-1 104 generates a SIP INVITE message 5054 based on SIP INVITE message 5024 received by SBC-1 104 and the address of the selected MRF 1 106. The SIP INVITE message 5044 includes a SDP offer message including the information shown in box 5055. As shown in box 5055, the SDP message includes fields m=audio 2345 RTP/AVP G711, m=video 6798 RTP/AVP VP8, a=non-realtime attributes for m=application 9 BFCP SBC1, and m=message 9 MSRP SBC1. In this example, MRF 1 106 does not support non-real time streams. The SDP message of the SIP INVITE message 5054 contains media fields, i.e., m-lines for the audio and video streams. SBC-1 104 includes information about the first set of streams, which are the non-real time streams, i.e., the BFCP and MSRP streams, in one or more proprietary SBC attributes, as described above. The proprietary SDP message attribute in this example is a=non-realtime attribute as shown in box 5055. In this way, the ingress SBC passes the information on non-real time streams, e.g., SDP offer corresponding to the non-real time streams) such as the BFCP and MRSP streams in the proprietary SDP attribute while passing the SDP offer for the real-time streams supported by the MRF, i.e. the audio and video streams, via the supported and recognized m lines of the SDP message. In some embodiments, the SDP message only includes m lines for the real-time streams and excludes from the SDP message information about the non-real time streams or the streams in the first set of streams. This is because some MRFs which do not support the non-real time streams will not properly pass information regarding the non-supported streams. In addition, the SBC-1 104 includes a Record-Route header pointing to itself in the SIP INVITE message 5054. In some embodiments, the SDP information corresponding to the non-real time streams is sent in one or more proprietary headers of the SIP INVITE message or in one or more proprietary extensions to an existing header of the SIP INVITE message such as for example in a Route header. In some embodiments, the SDP information corresponding to the non-real time stream is sent in Route header containing an embedded SDP message. Operation proceeds from step 5048 to step 5050.

In step 5050, SBC-1 104 sends the generated SIP INVITE message 5054 to MRF 1 106 via communication link 119. Operation from step 5050 to step 5060. In step 5060, MRF 1 106 receives the SIP INVITE message 5054. Operation proceeds from step 5060 to step 5070.

In step 5070, MRF 1 106 generates a SIP INVITE message 5084 based on the SIP INVITE message 5054. The SIP INVITE message 5084 includes a SDP offer message including the information shown in box 5085. This SDP information includes m=audio 3456 RTP/AVP G711 G729, m=video 7890 RTP/AVP VP8 H264, along with a=non-real-time attributes. The information regarding the first set of streams which in this example is the non-real time streams which was included in the proprietary SDP attribute of SIP INVITE message 5054 is included by the MRF 1 106 unaltered in the SIP INVITE message 5084 SDP message. The MRF-1 updates the SDP description regarding the audio stream to include the codec G729 and the video stream to include codec H264 representing a H.264 codec. These G711 G729 indicates that the MRF supports both G711 and G729 and transcoding of the media of the audio stream between these two codec formats In those embodiments in which the SDP information corresponding to the non-real time streams is received in one or more proprietary headers of the SIP INVITE message or in one or more proprietary extensions to an existing header of the SIP INVITE message such as for example in a Route header, the received SDP information the one or more proprietary headers or one or more proprietary extensions to an existing header is included in the SIP Invite Message generated by the MRF 1 106 and is in this way passed to the SBC-2 114. In those embodiments in which the SDP information corresponding to the non-real time streams is sent in a Route header containing an embedded SDP message, the MRF includes the Route header containing the embedded SDP message with the information corresponding to the non-real time streams or the first set of streams in the SIP Invite message it generates. Operation proceeds from step 5070 to step 5080.

In step 5080, MRF 1 106 sends the SIP INVITE 5084 message to SBC-2 114. The egress SBC-2 114 address was included in the SIP INVITE message Route header 5054. Operation proceeds from step 5080 to step 5090. In step 5090, SBC-2 114 receives the SIP INVITE message 5084. Operation proceeds from step 5090 to step 5100.

In step 5100, SBC-2 114 processes the SIP INVITE message 5084 and the SDP offer message included in the SIP INVITE 5084. SBC-2 114 processes the SDP message extracting the information corresponding to the streams for the session. SBC-2 114 processes the m=audio 3456 RTP/AVP G711 G729 and m=video 7890 RTP/AVP VP8 H264 lines of the SDP offer message and determines that the session will include real time audio and video streams on the respective ports and in the formats identified. The SBC-1 114 also identifies and extracts the proprietary information corresponding to the first set of streams for the session which in this example includes the non-real time BFCP and MSRP streams. In this example, SBC-2 114 is configured to identify and process the proprietary attribute(s) a=non-realtime. In a sub-step of this step 5100, SBC-2 stores this information in memory, e.g., data/information 320 of memory 310 for later use. SBC-2 is configured to process the SIP INVITE messages it receives with proprietary SDP message attributes so that it identifies that the a=non-realtime line identifies the subsequent m lines of the SDP message as providing information on non-real time streams which are part of the session. The SBC-2 114 is further configured to identify the "application 9 TCP/BFCP SBC1 line as identifying a non-real time BFCP stream which will be communicated over a call session leg routed directly from SBC1 to SBC2 and not via the session leg from MRF 1 106. Similarly, SBC-2 114 is configured to identify the m=message 9 TCP/MSRP*SBC1 as another non-real time which is part of the call session but will be communicated over the call session leg routed directly from SBC1 to SBC2 and not via the session leg from MRF 1 106. In those embodiments in which the SDP information corresponding to the non-real time streams is instead sent in a Route header containing an embedded SDP message, SBC-2 114 is configured to identify and extract the information including routing information corresponding to the first set of streams which in this case is the non-real time streams for the session from the Route header's SDP message. In those embodiments in which the information corresponding to the first set of streams which in this case are the non-real time streams for the session is passed in one or more proprietary headers and/or one or more proprietary header extensions of existing extensions such as a Route header, the SBC-2 is configured to identify and extract the information including routing information corresponding to the first set of streams. Operation proceeds from step 5100 to step 5110.

In step 5110, SBC-2 114 generates SIP INVITE message 5124 based on the SIP INVITE message 5084. SIP INVITE message 5124 includes a SDP offer message including information corresponding to the streams for the session which is shown in box 5125. The SDP stream information shown in box 5125 includes m=audio 4567 RTP/AVP G711 G729, m=video 89091 RTP/AVP VP8 H264, m=application 9 TCP/BFCP* and m=message 9 TCP/MSRP*. In this example, the information corresponding to the streams for the session are based on the information contained in the SDP offer message included in the SIP INVITE message 5084. This includes the m line descriptions for the audio, video, BFCP and MSRP streams. The information corresponding to the BFCP and MSRP streams is obtained from the proprietary attribute of the SDP message included in SIP INVITE message 5084. In those embodiments in which the SDP information corresponding to the non-real time streams is instead sent in a Route header containing an embedded SDP message, SBC-2 114 is configured to use the identified and extracted information including routing information corresponding to the first set of streams which in this case is the non-real time streams for the session from the Route header's SDP message in the generation of the SIP INVITE message 5124 and the SDP message included therein including the m line descriptions describing the non-real time BFCP and MSRP stream. In those embodiments in which the information corresponding to the first set of streams which in this case are the non-real time streams for the session is passed in one or more proprietary headers and/or one or more proprietary header extensions of existing headers such as a Route header, the SBC-2 is configured to use the identified and extracted information including routing information corresponding to the first set of streams and use that information in the generation of the SIP INVITE message 5124 and the SDP message included therein including the m line descriptions describing the non-real time BFCP and MSRP stream. The m line descriptions for the BFCP and MSRP streams included in the SDP message of SIP 5124 are standard m lines and not part of a proprietary attribute. Operation proceeds from step 5110 to step 5120.

In step 5120, SBC-2 114 sends SIP INVITE message 5124 to Peer B 116. Operation proceeds from step 5120 to step 5130. In step 5130, Peer B 116 receives SIP INVITE message 5124. Operation proceeds from step 5130 to step 5140.

In step 5140, Peer B 116 processes the SIP INVITE message 5124 and the SDP offer message it includes. In some embodiments, step 5140 includes a sub-step 5142 in which Peer B 116 stores the information contained in the SDP offer in memory, e.g., data/information 220 of memory 210 for later use. Operation proceeds from step 5140 to step 5145. As part of the processing of step 5140, Peer B 116 reviews the list of codec formats from the SDP offer corresponding to the audio stream, i.e., G711 and G729 and compares it to the list of codec formats it supports which in some embodiments it stores in memory 210 and determines the G729 codec format is a supported codec format that it desires to use for the session. Also as part of the processing of step 5140, Peer B 116 reviews the list of codec formats from the SDP offer corresponding to the video stream and compares it to the list of codec formats it supports which may be stored in memory 210 and determines the H.264 codec format is a codec format that it supports and desires to use for the video stream of the session. Operation proceeds from step 5140 to step 5145.

In step 5145, Peer B 116 generates in response to the received SIP INVITE message 5124, a SIP 200 OK response message 5154 including a SDP answer message. The SIP 200 OK response message is based on the SIP INVITE message 5124 as well as the determinations made regarding the codecs supports in step 5140. The SDP answer message includes the information contained in box 5155. The SDP answer message includes the following stream descriptions for the session, m=audio 4321 RTP/AVP G729, m=video 8765 RTP/AVP H264, m=application 3210 TCP/BFCP*, m=message 7650 TCP/MSRP*. The specification of G729 in connection with the audio stream and H264 in connection with the video stream identifies Peer B 116 chose of codec to use for the session. Operation proceeds from step 5145 to step 5150.

In step 5150, Peer B 116 sends the SIP 200 OK response message 5154 including the SDP answer message to SBC-2 114. Operation proceeds from step 5150 to step 5160. In step 5160, SBC-2 114 receives the SIP 200 OK response message 5154. Operation proceeds from step 5160 to step 5170.

In step 5170, SBC-2 114 processes the SIP 200 OK response message 5154. SBC-2 114 extracts the information from the SDP answer message included in the SIP 200 Ok response message 5154 corresponding to the streams and stores it in memory for later use. Operation proceeds from step 5170 to step 5175.

In step 5175, SBC-2 114 generates SIP 200 OK response message 5184 based on the SIP 200 OK response message 5154. SIP 200 OK response message includes a SDP answer message including the information shown in box 5185 corresponding to the streams for the session. The SDP message includes m=audio 5432 RTP/AVP G729, m=video 9867 RTP/AVP H264, a=non-realtime attributes containing application 4320 BFCP SBC2 and message 8670 MSRP SBC2. The m line description for the SDP answer message provide the answer for the audio and video streams. The answer corresponding to the first set of streams which for this example are the non-realtime streams for the session are placed in the proprietary attributes of the SDP message, "a=non-realtime m=application BFCP SBC2 m=message MSRP SBC2." The m=application BFCP SBC2 indicates that SBC-2 114 accepts the offer to setup the BFCP stream for this session between SBC-1 104 and SBC-2 114. The m=message MSRP SBC2 indicates that SBC-2 114 accepts the offer to setup the MSRP stream for this session between SBC-1 and SBC-2 114. The m line descriptions for the real time audio and video stream include the answers to the SDP offer for those streams provided by Peer B 116 and included in the SDP message of SIP 200 OK message 5154.

In those embodiments in which the information corresponding to the first set of streams which in this case are the non-real time streams for the session is passed in one or more proprietary headers and/or one or more proprietary header extensions of existing headers such as a Route header, the SBC-2 114 is configured to include the answer information corresponding to the first set of streams which are the non-real time stream in one or more proprietary headers and/or one or more proprietary header extensions of existing headers such as for example in a Route header instead of in the SDP message.

In those embodiments in which the SDP information corresponding to the first set of streams which is the non-real time streams has been received by the SBC-2 114 in a Route header containing an embedded SDP message, SBC-2 114 is configured provide the SDP answer corresponding to the first set of streams which in this case is the non-real time streams for the session in a SDP answer message embedded in a SIP 200 OK response message for example as an embedded SDP in a Record-Route header pointing to SBC-1 included in the SIP 200 OK response message 5184. Operation proceeds from step 5175 to step 5180.

In step 5180, SBC-2 114 sends the SIP 200 OK response message 5184 to MRF 1 106. Operation proceeds from step 5180 to step 5190. In step 5190, MRF 1 106 receives he SIP 200 OK message 5184. Operation proceeds from step 5190 to step 5200.

In step 5200, MRF 1 106 processes the SIP 200 OK response message 5184 including the SDP information included therein shown in box 5185 which is extracted and stored and in memory. With respect to the audio stream for the session it determines from the SDP answer that it will need to transcode the media for the audio stream so audio content sent to Peer A 102 is in G.711 format and audio sent to Peer B is in G729 format. With respect to the video stream for the session it determines from the SDP answer that it will need to transcode the video for the video stream of the session so that video sent to Peer B 116 is in H.264 format and that video sent to Peer A 102 is sent in VP8 format. This requires MRF 1 106 to perform audio transcoding between G.711 and G.729 formats and video transcoding between VP8 and H.264 formats. As the answer to the first set of streams which are the non-real time streams which are to not to be routed via the MRF 1 106, the SDP answer corresponding to these streams is included in the SDP proprietary attribute of the answer is therefore not addressed by the MRF 1 106. Operation proceeds from step 5200 to step 5205.

In step 5205, the MRF 1 106 generates a SIP 200 OK response message 5214 based on the SIP 200 OK response message 5184 and the determination made in processing message 5184. SIP 200 OK response message 5214 includes a SDP answer message including the information shown in box 5215. Information included in the SDP answer includes the stream descriptions m=audio 6543 RTP/AVP G711, m=video 1986 RTP/AVP VP8, a=non-realtime attributes. The m audio line G711 and m video line VP8 descriptions indicate the acceptance of the codec formats for the streams as per the SDP offer message as the MRF 1 106 will be performing the transcoding between the formats. The answer information corresponding to the first set of streams which is the non-real time streams in this case is included in the proprietary attributes a=non-realtime which is an unaltered version of the proprietary attribute included in the SDP answer included in SIP 200 OK message 5184.

In those embodiments in which the information corresponding to the first set of streams which in this case are the non-real time streams for the session is passed in one or more proprietary headers and/or one or more proprietary header extensions of existing headers such as a Route header, the MRF 1 106 is configured to include the answer information corresponding to the first set of streams which are the non-real time stream in one or more proprietary headers and/or one or more proprietary header extensions of existing headers such as for example in a Route header instead of in the SDP message. Because the information corresponding to the non-real time streams is included in proprietary headers or extensions they will be just be passed along by the MRF-1 106.

In those embodiments in which the SDP information corresponding to the first set of streams which are the non-real time streams has been passed in a Route header containing an embedded SDP message, the SDP answer corresponding to the first set of streams which in this case is the non-real time streams for the session is passed in a SDP answer message embedded in a SIP 200 OK response message header for example as an embedded SDP message in a Record-Route header pointing to SBC-1 included in the SIP 200 OK response message 5214 which has been generated based on the Record-Route header included in the SIP 200 OK message 5184. Operation proceeds from step 5205 to 5210.

In step 5210, MRF 1 106 sends the SIP 200 OK response message 5214 to SBC-1 104. Operation proceeds to step 5220. In step 5220, SBC-1 104 receives the SIP 200 OK response message 5214. Operation proceeds from step 5220 to step 5230.

In step 5230, SBC-1 104 processes the received SIP 200 OK message 5214. In this example, SBC-1 104 is configured to identify and process in the SDP answer message the proprietary attributes a=non-realtime. In sub-step 5235, SBC-1 104 stores this information in memory, e.g., data/ information 320 of memory 310 for later use. SBC-1 104 is configured to process the SIP 200 OK response messages it receives with proprietary SDP message attributes so that it identifies that the a=non-realtime line identifies the subsequent m lines of the SDP message as providing information on non-real time streams which are part of the session. The SBC-1 104 is further configured to identify the m=application TCP/BFCP SBC2 line as identifying the answer to the offer regarding the non-real time BFCP stream and that the answer is affirmative that the stream which will be communicated over a call session leg routed directly from SBC1 to SBC2 and not via the session leg from MRF 1 106. Similarly, SBC-1 104 is configured to identify the m=message TCP/MSRP SBC2 as the SDP answer to the non-real time MSRP stream which is part of the call session but will be communicated over the call session leg routed directly from SBC1 to SBC2 and not via the session leg from MRF 1 106.

In those embodiments in which the SDP information corresponding to the non-real time streams is instead sent in a Route header containing an embedded SDP message, SBC-1 104 is configured to identify and extract the answer information corresponding to the first set of streams which in this case is the non-real time streams for the session from the Route header's embedded SDP message.

In those embodiments in which the information corresponding to the first set of streams which in this case are the non-real time streams for the session is passed in one or more proprietary headers and/or one or more proprietary header extensions of existing headers such as a Route header, the SBC-1 104 is configured to identify and extract the answer information corresponding to the first set of streams from the proprietary header or header extensions. The answer to the real-time audio and video streams is processed as normal SDP stream session description answers. Operation proceeds from step 5230 to step 5235.

In step 5235, SBC-1 104 generates SIP 200 OK response message 5244 based on the response received from the MRF 1 106 in SIP 200 OK response message 5214. SIP 200 OK response message 5244 includes a SDP answer message including the information shown in box 5245 corresponding to the streams for the session. This information includes: m=audio 6423 RTP/AVP G711, m=video 6901 RTP/AVP VP8, m=application 4230 TCP/BFCP\*, m=message 9010 TCP/MSRP\*. The information corresponding to the real-time audio and video streams of the session are answers received from the MRF 1 104 in the SIP 200 OK message 5214 and the answers corresponding to the non-real time streams are based on the answers from proprietary attribute corresponding to the BFCP and MSRP streams for the session. Operation proceeds from step 5235 to step 5240.

In step 5240, SBC-1 104 sends SIP 200 OK message 5244 to Peer A 102. Operation proceeds from step 5240 to step 5250. In step 5250, Peer A 102 receives the SIP 200 OK response message 5244. Operation proceeds from step 5250 to step 5260.

In step 5260, Peer A 102 processes the received SIP 200 OK response, stores in memory SDP answer information corresponding to the real and non-real time streams for the session.

At the conclusion of step 5260, the SDP offer answer exchange has been completed and the routes for the session streams have been established. The route or media path for the real-time audio and video streams of the session has been setup via MRF 1 106 and the route for the non-real time BFCP and MSRP streams have setup to be directly exchanged between SBC-1 104 and SBC-2 114. The routing for the streams is shown in FIG. 5B. Signaling arrow 5300 shows the established route and exchange of signals for both the real-time and non-real time streams between Peer A 102 and SBC-1 104. Signaling arrows 5410 and 5420 show the established route and exchange of signals for the audio and video real-time streams for the session from SBC-1 104 to SBC-2 114 via MRF 1 106 where the audio and video content of the streams is transcoded. Signaling arrow 5400 shows the established route and exchange of signals for the first set of streams which are the non-real time streams from SBC-1 104 to SBC-2 114. The route for the non-real time streams bypasses the MRF 1 106. Signaling arrow 5500 shows the established route and exchange of signals for both the real-time and non-real time streams of the session between SBC-2 114 and Peer B 116

The use of this method has saved MRF resources. MRF ports and resources are not tied up with processing and passing through non-real time streams which do not require media content processing such transcoding. This makes those MRF resources available for processing additional streams which do require media content processing such as transcoding. This method also has the advantage of being less costly when the MRF resources are not owned by the network operators but licensed on a stream usage basis by third party provides such as when network operators invoke MRF cloud based solutions to provide transcoding services.

Figure 6B:
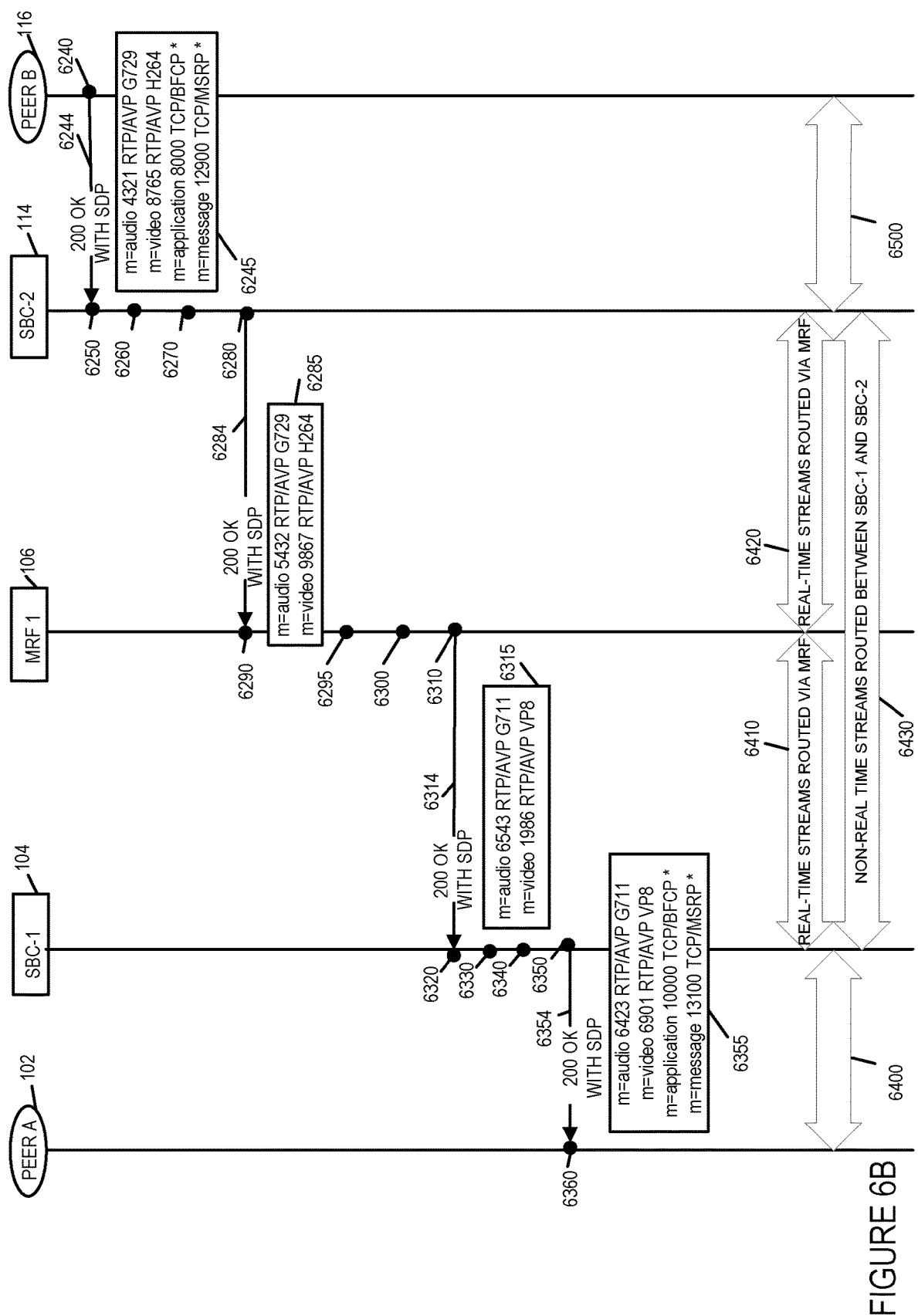
FIG. 6B illustrates a second part of an exemplary signaling diagram and method in accordance with an exemplary embodiment of the present invention.

FIG. 6 consisting of a first part FIG. 6A and a second part FIG. 6B shows a signaling diagram 6000 illustrating the exemplary communications system 100 with signaling and the steps implemented as part of another exemplary method of determining which streams of a session to route via an MRF and which to route without going through an MRF in accordance with one embodiment of the present invention. Elements or steps with the same reference numbers used in different figures are the same or similar and those elements or steps will not be described in detail again.

In the example shown in signaling diagram 6000 of FIG. 6, the MRF 106 acts as a SIP B2BUA Back-to-Back User Agent (UA) when SBC-1 104 invokes an MRF for media processing such as transcoding, transrating, or transizing of the content of one or more media streams. In this example, the SDP offer-answer exchange for streams which SBC-1 104 determines do not need to routed via the MRF 1 106 is directly exchanged between SBC-1 104 and SBC-2 114 using SIP OPTIONS messages.

On receiving a SIP INVITE message from Peer A 102 directed to Peer B 116, SBC-1 104 analyzes the SIP INVITE message and determines which streams of the session are to be routed via MRF 1 106 and which streams of the session are not to be routed via MRF 1 106 but are to bypass MRF 1 106 thereby conserving MRF resources. In this example, SBC-1 104 identifies from the SIP INVITE message that the session will have four streams two streams are real-time streams and two streams are non-real time streams. The two real time streams are an audio stream and a video stream. The two non-real time streams are a BFCP stream and a MSRP stream. SBC-1 104 determines that the egress SBC to which the SIP INVITE message is to be routed on its way to Peer B 116 is SBC-2 114. SBC-1 104 also identifies and places the two non-real time streams in a first set of streams which the SBC-1 104 determines will not require media content processing and which will be routed to SBC-2 116 without passing through MRF 1 106. SBC-1 104 determines that the two real-time streams will be routed to SBC-2 114 via an MRF so that the media of the audio and video content of the real-time streams can be processed such as for example by transcoding, transizing and/or transrating the media content of the streams.

Having determined that the audio and video streams of the session will be routed via a MRF node, SBC-1 104 selects MRF 1 106. SBC-1 104 sends a SIP INVITE message via MRF-1 106 to SBC-2 114. This SIP INVITE message contains a SDP offer message with m line descriptions for the audio and video streams. The SDP offer message does not contain descriptions for the non-real time MSRP and BFCP streams of the session. In parallel with sending the SIP INVITE message to SBC-2 114 via MRF 1 106, SBC-1 sends a SIP OPTIONS message containing an SDP offer for the two non-real time of the session, the MSRP and BFCP streams, to SBC-2 114. In some embodiments the SIP OPTIONS message may be delayed so that the SBC-2 114 can correlate the SDP offers from the SIP INVITE and SIP OPTIONS messages and send a combined SDP message containing information on all streams of the session in a SIP INVITE towards egress call-leg to Peer B 116.

The information needed to correlate both the call-legs may be, and in some embodiments is, exchanged in a Route header or in a Request-URI header of the SIP INVITE and SIP OPTIONS messages. In this example it is shown the information is shown as a hint-ID sent in a proprietary Route header of the SIP INVITE message and SIP OPTIONS message. The SBC-2 114 sends a 200 OK message to the SIP OPTIONS message. The SIP 200 OK response message includes a SDP answer message with information corresponding to the non-real time streams.

The SBC-2 114 sends a SIP INVITE message to Peer B 1116 which includes a SDP offer message including information on both the real-time and non-real time streams of the session. The SBC-2 114 receives a response from the Peer B 116 to the SDP offer message including information on all of the streams of the session. When SBC-2 114 receives the SDP answer from the egress Peer B 116, SBC-2 114 sends the audio and video SDP answers to SBC-1 104 via MRF 1 106. The SDP answer for the non-real time streams has already been sent in the 200 OK to OPTIONS response. In some embodiments, instead of sending the SDP answer corresponding to the streams of the session which will not to be routed via the MRF 1 106, to SBC-1 104 in a SDP answer contained in the SIP 200 OK response to the SIP OPTIONS message, SBC-2 114 sends the SDP answer after receiving the response from Peer B 116 using a different SIP OPTIONS-200 OK message exchange in which it initiates the SIP OPTIONS message which contains the SDP answer information for the streams to be routed directly from SBC-1 104 to SBC-2 114 without going through MRF 1 106.

The steps and signaling of method 6000 of FIG. 6 will now be explained in further detail.

Method 6000 of FIG. 6 starts as start step 6002 shown in FIG. 6A. Operation proceeds from step 6002 to step 6010. In step 6010, Peer A 102 determines that it wants to setup a communications session with Peer B 116 and generates SIP INVITE message 6024 which includes a SDP offer message. SDP information corresponding to the streams of the session are shown in box 6025, this information includes m=audio 1234 RTP/AVP G711, m=video 5678 RTP/AVP VP8, m=application 9 TCP/BFCP*, m=message 9 TCP/MSRP*. Peer A 102 is proposing that there be four streams in the session to be established, a real-time audio stream, a real-time video stream, a non-real time BFCP stream and a non-real time MSRP stream. The audio stream is proposed to be in G711 codec format and the video stream is proposed to be in VP8 codec format. The port information for the audio stream is 1234 and the port information for the video stream is 5678. Operation proceeds from step 6010 to step 6020.

In step 6020, Peer A sends SIP INVITE message 6024 to SBC-1 104. Operation proceeds from step 6020 to step 6030. In step 6030, SBC-1 104 receives SIP INVITE message 6024 with the SDP offer message. Operation proceeds from step 6030 to step 6040.

In step 6040, SBC-1 104 determines the egress SBC for the session based on Peer B 116 identity to be SBC-2 114. Operation proceeds from step 6040 to step 6050, in step 6050, SBC-1 104 determines based at least in part on the SDP offer information in the SIP INVITE message 6024 which stream of the session will be routed via an MRF node and which streams of the session will not be routed via an MRF node. In some embodiments, SBC-1 104 determines that all real-time streams will be routed via the MRF node. In some embodiments, SBC-1 104 determines that no non-real time streams will be routed via MRF. In some embodiments, SBC-1 104 determines based on the capabilities of the MRFs available for service which of the session's streams will be routed via the MRF node. Those streams which are not supported by the MRF are not routed through the MRF but bypass the MRF to conserve MRF resources. In some embodiments only those session streams which require media content processing are determined to be routed via a MRF thereby conserving MRF resources and costs, e.g., licensing fees associated with the processing of streams which are only passed through the MRF without requiring processing of the media content. In this example, SBC-1 104 identifies the real-time streams as the streams to be sent via an MRF which includes the audio and video streams and the SBC-1 104 determines that the non-real time streams, the BFCP and MSRP streams, will not be routed via an MRF but will bypass the MRF. In this embodiment, the streams of the session which will not be routed via an MRF are identified and placed in a first set of streams which will bypass the MRF. Operation proceeds from step 6050 to step 6060.

In step 6060, SBC-1 114 identifies and selects which MRF to invoke for the real-time streams of the session from the available MRF nodes available to provide transcoding services. In this example, SBC-1 104 identifies and selects MRF 1 106. Operation proceeds from step 6060 to steps 6065 and 6130 in parallel.

In step 6065, SBC-1 104 generates SIP INVITE message 6074 based on the information contained in the SIP INVITE message 6024. SIP INVITE message 6074 includes an SDP offer message including information on the real-time streams to be routed to Peer B 116 via MRF 1 106. The SDP offer included in SIP INVITE message 6074 includes the stream description information shown in box 6075, m=audio 2345 RTP/AVP G711 and m=video 6789 RTP/AVP VP8. The SIP INVITE message also includes the route header 6076, ROUTE: <SBC2; hint_id>. SBC2 is the destination of the SIP INVITE message and hint_id is information which will be used to identify the call leg or dialog of the session to the SBCs. The hint_id is information contained in a proprietary extension of the Route header. The session id may, and in some embodiments is sent in the SDP message. Operation proceeds from step 6065 to step 6070. In step 6070, SBC-1 104 sends the SIP INVITE message 6074 to MRF-1 106. Operation proceeds from step 6070 to step 6080.

In step 6080, MRF-1 106 receives SIP INVITE message 6074. Operation proceeds from step 6080 to step 6090.

In step 6090, MRF 1 106 processes the received SIP INVITE 6074 message and generates SIP INVITE message 6104 based on the received SIP INVITE 6074. SIP INVITE message 6104 includes Route header 6106, ROUTE<SBC2; hint_id> and a SDP offer message including the information shown in box 6105 corresponding to the audio and video streams, m=audio 3456 RTP/AVP G711 G729, m=video 7890 RTP/AVP VP8 H264. With respect to the audio stream of the session, MRF-1 106 has added the codec formats it supports to the m-line description. In this example, in addition to supporting the G711 codec format, MRF 1 106 also supports the G729 codec format and includes this codec on the list of supported codec formats in the description. With respect to the video stream, MRF 1 106 in addition to supporting VP8 also supports H.264 codec format and adds this information to the description for the video codecs formats supported in the SDP offer message. Operation proceeds from step 6090 to step 6100. In step 6100, MRF 1 106 sends the SIP INVITE message 6104 to SBC-2 114. Operation proceeds from step 6100 to step 6110. In step 6110, SBC-2 114 receives SIP INVITE message 6104. Operation proceeds from step 6110 to step 6120.

In step 6120, SBC-2 114 processes the received SIP INVITE 6104 message including identifying the hint_id. SBC-2 114 is configured upon identifying a hint_id in a proprietary extension of a route header of a SIP INVITE message that this indicates that the SDP message included in the SIP INVITE message only contains a description of some of the streams of the session and that the SBC-2 will need to identify a SIP OPTIONS message with a route header having the same hint_id in the route header of a proprietary extension. Upon identifying the SIP OPTIONS message with the hint_id in the route header, SBC-2 will extract the SDP offer message in the SIP OPTIONS message and then correlate the two SDP messages to the same session. In this example, SBC-2 114 extracts the SDP message offer information shown in box 6105 of SIP INVITE message 6104 and stores it in memory. The SBC-2 114 identifies this SDP information as streams for the session which will be routed via MRF-1 106. Operation proceeds from step 6120 to step 6160. In some embodiments, the SIP OPTIONS message with the route header containing the hint_id information used to correlate the two legs of the communications session is received first in such an embodiment, SBC-2 correlates the information received in the SDP offer of the SIP OPTIONS method with a SIP INVITE message having a route header including the same hint_id value.

Returning to step 6130, SBC-1 104 generates SIP OPTIONS message 6144. The SIP OPTIONS message is based on the information contained in the SIP INVITE message 6024. SIP OPTIONS message 6144 includes a SDP offer message. Box 6145 includes some of the information included the SDP offer message included in the SIP OPTIONS message 6144. This information includes m=application BFCP and m-application MSRP which is the information corresponding to the streams which SBC-1 104 has determined will routed directly to SBC-2 bypassing MRF-1 106, i.e., this is information about the non-real time streams of the session which are not to be routed via MRF-1 106. The SIP OPTIONS message also includes a Route header message 6146, ROUTE: <SBC2; hint_id>, identifying SBC2 as the destination and containing a proprietary extension including the information hint_id. Operation proceeds from step 6130 to step 6140. In step 6140, SBC-1 104 sends the SIP OPTIONS message with the SDP offer message to SBC-2 114. In some embodiments, SBC-1 104 delays typically by a slight amount of time the sending of the SIP OPTIONS message 6144 to SBC-2 114 so that SBC-2 114 can receive the SIP INVITE from SBC-1 104 via the MRF 1 106 before receiving the SIP OPTIONS message. This makes it easier for SBC-2 114 to correlate the two legs of the session and the corresponding streams of the session. Operation proceeds from step 6140 to step 6150.

In step 6150, SBC-2 114 receives SIP OPTIONS message 6144. In step 6160, SBC-2 114 processes the SIP OPTIONS message with the SDP offer. SBC-2 is configured to identify SIP OPTIONS message with a route header including hint_id information as one leg of a communication session containing an SDP offer message with information for streams of the sessions which will be routed from another SBC directly to SBC-2 bypassing an MRF. In this example, SBC-2 114 extracts the SDP offer information from the SIP OPTIONS message 6144 including the information on first set of streams which include the BFCP and MSRP streams for the session. SBC-2 114 stores this information in memory. Operation then proceeds to step 6165. In step 6165, SBC-2 114 generates SIP 200 OK message 6174 in response to the SIP OPTIONS message. The SIP 200 OK message is based on the SIP OPTIONS message 6144 and includes an SDP answer message including the information shown in box 6175. The SDP answer message includes information on the streams to be routed to SBC-2 114 without passing through the MRF 1 106. The SDP answer message includes m=application BFCP and m=message MSRP. The SDP answer message does not include information on the streams of the session which will be routed via the MRF 1 106. Operation proceeds from step 6165 to step 6170. In step 6170, SBC-1 114 sends the SIP 200 OK response message 6174 to SBC-1 104. It is routed so that it does not pass through MRF 1 106 but is sent directly to SBC-1 104 from SBC-2 114. Operation proceeds from step 6170 to step 6180 and step 6200.

In step 6180, SBC-1 104 receives the SIP 200 OK response message 6174. Operation proceeds from step 6180 to step 6190. In step 6190, SBC-1 104 processes the SIP 200 OK response message 6174 and the information from the SDP answer message containing the information in box 6175. The SBC-1 stores this information in memory.

In step 6200, SBC-2 114 uses the hint_id to correlate the SDP offer received in the SIP INVITE message 6104 with the SDP offer received in the SIP OPTIONS message 6144. SBC-2 114 based on the SIP INVITE message 6104 and the SIP OPTIONS message 6144 and the SDP offer messages contained therein generates SIP INVITE message 6214 combining the information included in both SDP offer message. The SIP INVITE message 6214 includes a SDP offer message including the information on streams of the session shown in box 6215. The SDP offer message includes the following m-line descriptions m=audio 4567 RTP/AVP G711 G729, m=video 8901 RTP/AVP VP8 H254, m=application 9 TCP/BFCP* and m=message 9 TCP/MSRP*. SBC-2 114 does not include the route header SBC2 and hint_id information in the SIP INVITE message 6214 as this information was for the SBC-2 and not for the Peer B 116. Operation proceeds from step 6200 to step 6210. In step 6210, SBC-2 114 sends SIP INVITE message 6214 to Peer B 116. Operation proceeds from step 6210 to step 6220. In step 6220, Peer B 116 receives the SIP INVITE message 6214. Operation proceeds from step 6220 to step 6230.

In step 6230, Peer B processes the SIP INVITE message 6214 including the SDP offer message contained therein and determines that it can support the G729 and H264 audio and video codecs respectively selecting them from the list of codec formats in the SDP offer message. Operation proceeds from step 6230 to step 6235. In step 6235, Peer B 116 generates SIP 200 OK response message 6244 in response to SIP INVITE message 6214. The SIP INVITE message 6244 is based on the SIP INVITE message 6214 and the determination made regarding the SDP offer. The SIP INVITE message 6244 includes an SDP answer message to the SDP offer included in the SIP INVITE message 6214. The SDP answer message includes the information shown in box 6245 corresponding to the streams of the session. This SDP answer information includes m=audio 4321 RTP/AVP G729, m=video 8765 RTP/AVP H264, m=application 7650 TCP/BFCP* and m=message 3210 TCP/MSRP*. The m-line description corresponding to the audio stream includes G729 as the codec format selected by Peer B 116 for the session and m-line description corresponding to the video stream includes H264 as the codec format selected by Peer B 116 for the session. Operation proceeds from step 6235 to step 6240.

In step 6240 shown on FIG. 6B, Peer B 116 sends the SIP 200 OK response message 6244 to SBC-2 114. Operation proceeds from step 6240 to step 6250. In step 6250, SBC-2 114 receives the SIP 200 OK message 6244 from Peer B 116. Operation proceeds from step 6250 to step 6260. In step 6260, SBC-2 114 processes the SIP 200 OK message 6244 correlates this SDP answer with session having two communication session legs have the hint_id value in the SIP OPTIONS message 6144 and SIP INVITE message 6104 and stores the SDP answer including the information shown in box 6245 in memory corresponding to the identified session. Operation proceeds from step 6260 to step 6270.

In step 6270, SBC-2 114 generates SIP 200 OK response message 6284 in response to SIP INVITE message 6104. SIP 200 OK response message 6284 includes a SDP answer message including the information shown in box 6285 which is m=audio 5432 RTP/AVP G729 and m=video 9867 RTP/AVP H264. The SDP answer message does not include information on the streams of the session which are not to be routed via MRF 1 106. The SDP answer for the streams of the session which are to be routed without passing through MRF 1 106 was sent in SIP 200 OK response message 6174. In some embodiments, instead of sending the SDP answer for the streams of the session which are to be routed without passing through MRF 1 106 in the SIP 200 OK response message 6174, a new SIP OPTIONS message is generated after the receipt of the response from Peer B 116 and then sent from SBC-2 114 to SBC-1 114. Operation proceeds from step 6270 to step 6280.

In step 6280, SBC-2 114 sends SIP 200 OK response message 6284 to MRF 1 106. Operation proceeds from step 6280 to step 6290. In step 6290, MRF 1 106 receives SIP 200 OK message 6284. In step 6290, MRF 1 106 receives the SIP 200 OK response message 6284. Operation proceeds from step 6290 to step 6295.

In step 6295, MRF 1 106 processes the SIP 200 OK response message 6284 including the SDP answer message included therein. MRF 1 106 identifies that Peer B 116 has selected G729 for the audio stream codec format and H264 for the video stream codec format and therefore determines that the media of the audio stream sent toward Peer B 116 will need to be in G729 codec format while media of the audio stream sent toward Peer A 102 will need to be in G711 format. MRF 1 then determines to perform transcoding of the audio stream as necessary. With respect to the video stream of the session, MRF 1 determines that Peer B 116 has selected the H.264 codec format and that media of the video stream sent toward Peer B 116 will need to be in H.264 codec format will media of the video stream sent toward Peer A 102 will be VP8 codec format. MRF 1 then determines to perform transcoding of the video stream as necessary. Operation proceeds from step 6295 to step 6300.

In step 6300, MRF 1 106 generates SIP 200 OK response message 6314 in response to SIP INVITE message 6074. SIP 200 OK response message is based on SIP 200 OK response message 6284 and the determination made in step 6295. SIP INVITE message 6314 includes a SDP answer message to the SDP offer message included in the SIP INVITE message 6074. The SDP answer message includes the information on audio and video streams shown in box 6315 which is m=audio 6543 RTP/AVP G711 and m=video 1986 RTP/AVP VP8. The G711 codec format for the audio stream and VP8 codec format for the video stream indicate that the codec in the SDP offer from Peer A 102 are accepted. Operation proceeds from step 6300 to step 6310. In step 6310 MRF 1 106 sends SIP 200 OK message 6314 to SBC-1 104. Operation proceeds from step 6310 to step 6320. In step 6320, SBC-1 104 receives SIP 200 OK response message 6314. Operation proceeds from step 6320 to step 6330.

In step 6330, SBC-1 104 processes the SIP 200 OK response message 6314. SBC-1 104 stores the SDP answer information included the information for the real-time audio and video streams and the non-real time MSRP and BFCP streams in memory corresponding to information for the streams of the session. Operation proceeds from step 6330 to step 6340.

In step 6340, SBC-1 104 generates SIP 200 OK response message 6354 in response to SIP INVITE message 6024. The SIP 200 OK response message 6354 is based on the SIP 200 OK response message 6314 (or in some embodiments on the SIP OPTIONS message sent from SBC-2 114 which includes the hint_id) and the SIP 200 OK response message 6174 and the SDP answer messages contained therein. SIP 200 OK response message 6354 includes a SDP answer message to the SDP offer message included in the SIP INVITE message 6024 including the information on all of the streams of the session. The SDP answer message includes the information shown in box 6355 which is m=audio 6423 RTP/AVP G711, m=audio 6901 RTP/AVP VP8, m=application 9 TCP/BFCP* and m=message 3456 TCP/MSRP*. Operation proceeds from step 6340 to step 6350. In step 6350, SBC-1 104 sends the SIP 200 OK response message to Peer A 102. Operation proceeds from step 6350 to step 6360.

In step 6360, Peer A receives and processes the SIP 200 OK response message. At the conclusion of step 6360, the SDP offer answer exchange has been completed and the routes for the session streams have been established. The route or media path for the real-time audio and video streams of the session has been setup via MRF 1 106 and the route for the non-real time BFCP and MSRP streams have been established to be directly exchanged between SBC-1 104 and SBC-2 114. The routing for the streams is shown in FIG. 6B. Signaling arrow 6400 shows the established route and exchange of signals for both the real-time and non-real time streams between Peer A 102 and SBC-1 104. Signaling arrows 6410 and 6420 show the established route and exchange of signals for the audio and video real-time streams for the session from SBC-1 104 to SBC-2 114 via MRF 1 106 where the audio and video content of the streams is transcoded. Signaling arrow 6430 shows the established route and exchange of signals for the first set of streams which are the non-real time streams from SBC-1 104 to SBC-2 114. The route for the non-real time streams bypasses the MRF 1 106. Signaling arrow 6500 shows the established route and exchange of signals for both the real-time and non-real time streams of the session between SBC-2 114 and Peer B 116.

Figure 7B:
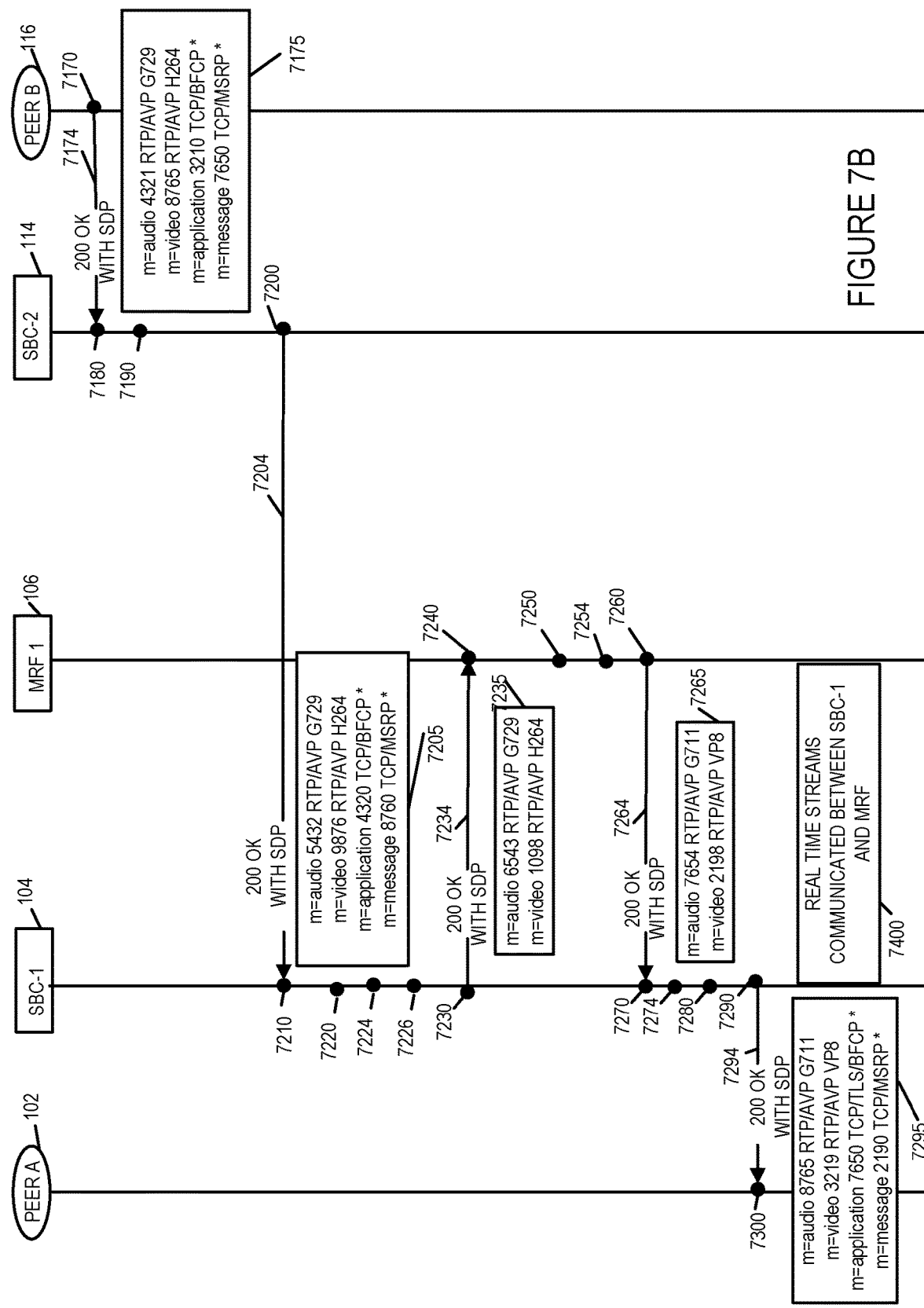
FIG. 7B illustrates a second part of an exemplary signaling diagram and method in accordance with an exemplary embodiment of the present invention.
Figure 7C:
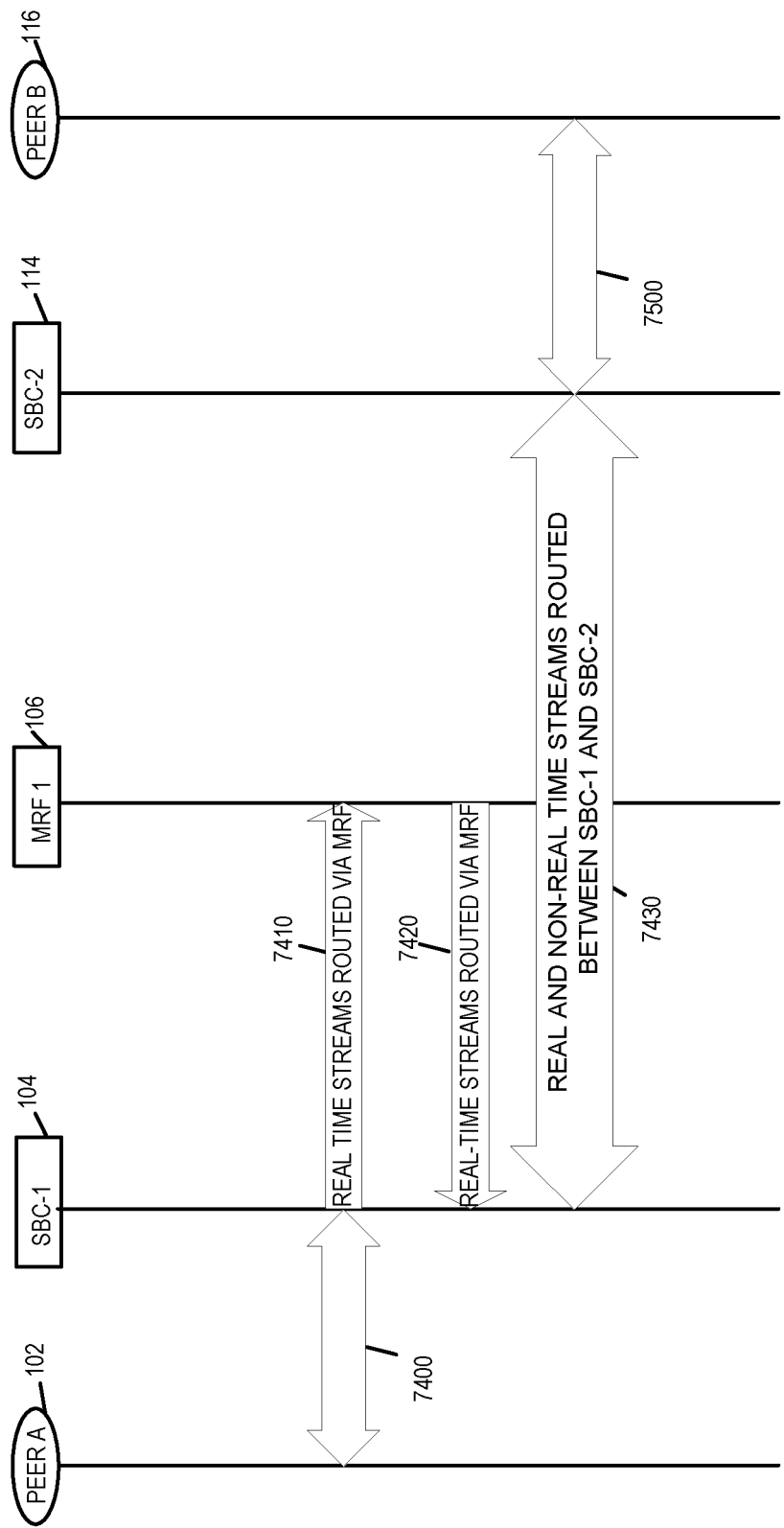
FIG. 7C illustrates a third part of an exemplary signaling diagram and method in accordance with an exemplary embodiment of the present invention.

FIG. 7 consisting of a first part FIG. 7A, a second part FIG. 7B, and a third part FIG. 7C shows a signaling diagram 7000 illustrating the exemplary communications system 100 with signaling and the steps implemented as part of another exemplary method of determining which streams of a session to route via an MRF and which to route without going through an MRF in accordance with one embodiment of the present invention. Elements or steps with the same reference numbers used in different figures are the same or similar and those elements or steps will not be described in detail again.

In the example shown in signaling diagram 7000 of FIG. 7, the MRF 106 acts as a SIP B2BUA Back-to-Back User Agent (UA) when SBC-1 104 invokes an MRF for media processing such as transcoding, transrating, or transizing of the content of one or more media streams. In this example, the ingress SBC, SBC-1 determines to route the SDP offer answer for the streams to be routed via the MRF through the MRF before exchanging a combined SDP offer that includes both the streams of the session to be routed via the MRF and the streams of the session not to be routed via the MRF in a SDP offer sent to the egress SBC, SBC-2. In this example, SBC-1 104 determines to use this procedure upon determining that the egress SBC, SBC-2 114 does not support proprietary header extensions or SDP message attributes.

On receiving a SIP INVITE message from Peer A 102 directed to Peer B 116, SBC-1 104 analyzes the SIP INVITE message and determines which streams of the session are to be routed via MRF 1 106 and which streams of the session are not to be routed via MRF 1 106 but are to bypass MRF 1 106 thereby conserving MRF resources. In this example, SBC-1 104 identifies from the SIP INVITE message that the session will have four streams two streams are real-time streams and two streams are non-real time streams. The two real time streams are an audio stream and a video stream. The two non-real time streams are a BFCP stream and a MSRP stream. SBC-1 104 also identifies and places the two non-real time streams in a first set of streams which the SBC-1 104 determines will not require media content processing and which will be routed to SBC-2 116 without passing through MRF 1 106. SBC-1 104 determines that the two real-time streams will be routed to SBC-2 114 via an MRF so that the media of the audio and video content of the real-time streams can be processed such as for example by transcoding, transizing and/or transrating the media content of the streams.

SBC-1 104 further determines that the egress SBC to which the SIP INVITE message is to be routed on its way to Peer B 116 is SBC-2 114. SBC-1 104 further determines that SBC-2 is not configured to support the exchange of proprietary SDP attributes, headers or header extensions to perform session establishment procedures for setting up multiple call legs of a session as described in connection with methods of FIGS. 5 and 6.

Having determined that the audio and video streams of the session will be routed via a MRF node, SBC-1 104 selects MRF 1 106. SBC-1 104 sends a SIP INVITE message via MRF-1 106 to SBC-2 114. This SIP INVITE message contains a SDP offer message with m line descriptions for the audio and video streams. The SDP offer message does not contain descriptions for the non-real time MSRP and BFCP streams of the session. SBC-1 104 also adds a Route header so that the call loops back to itself and in the Route header SBC-1 104 includes dialog state information in a proprietary header referred to as hint_id. MRF-1 106 receives the SIP INVITE message with the SDP offer message and augments the SDP offer message with additional codecs (audio/video) and sends the SIP INVITE message back to SBC-1 104 based on the Route header. The dialog-state information present in the Route header is used by SBC-1 104 to correlate the two call-legs and also to determine that additional streams not to be routed via MRF 1 106 such as the non-real time streams for the session are present.

Using this information, SBC-1 104 generates a SIP INVITE with an SDP offer having the audio/video stream descriptions from the SDP offer received from the MRF and includes the description lines from the original SDP message from the ingress Peer A 102 for the streams to be routed without including MRF-1 106 which in this example includes the non-real time BFCP and MRSRP streams. SBC-1 104 then sends the generated SIP INVITE with the combined SDP offer to SBC-2 114. The SBC-1 104 stores in memory the hint_id and session id so that it can correlate the response from the SBC-2 114 with the response which needs to be sent to MRF-1 106. SBC-2 114 receives and sends the SIP INVITE with SDP offer to Peer B 116. Peer B 116 selects the codec formats for the audio and video streams and sends back a SIP 200 OK response with an SDP answer message to SBC-2 114. SBC-2 114 sends a SIP 200 OK response message with SDP answer based on the answer from Peer B 116 back to SBC-1 104.

SBC-1 104 on receiving the SDP answer from SBC-2 114 uses the session id in the response to correlate this answer with the session and the corresponding hint_id. SBC-1 104 then generates and sends a SIP 200 OK response with an SDP answer message containing the audio and video SDP answer line descriptions received in the SDP answer from SBC-2 114 but removes the SDP answer line descriptions corresponding to the streams that are not be routed via MRF 1 106 which in this example are the non-real time streams to MRF 1 106.

MRF 1 106 receives the SIP 200 OK message, processes the SDP answer and generates and sends a SIP 200 OK response message with a SDP answer message to SBC-1 104. SBC-1 104 on receiving the SIP 200 OK response message with MRF 1 106's SDP answer message generates a SIP 200 OK response to send to Peer A including a SDP answer message including the SDP answer from MRF-1 106 corresponding to the streams which are to be routed via MRF-1 and the SDP answer received from Peer B 116 via SBC-2 114 with respect to the streams to be routed without passing through MRF 1 106. SBC-1 104 then sends the generated SIP 200 OK response with the combined SDP answer for the streams of the sessions to Peer A 102. Peer A 102 receives and processes the SIP 200 OK response message with SDP answer and at the conclusion of the processing the routes for the real-time and non-real time streams have been established with the real-time audio and video streams being routed via the MRF 1 106 and the non-real time BFCP and MSRP streams not being routed via the MRF 1 106 but bypassing MRF 1 106 and being routed directly to SBC-2 from SBC-1.

Details of the steps and signaling of the exemplary method 7000 illustrated in FIG. 7 will now be provided. In this example, SBC-2 114 does not support the proprietary exchange of information to establish the separate routing paths for some streams to be routed via the MRF and other streams to be routed not through the MRF.

Operation of the method begins in start step 7010 shown on FIG. 7A. Operation proceeds from start step 7010 to step 7015. In step 7015, Peer A 102 determines to establish a call session with Peer B 116. The call session is to have four streams two real time streams an audio stream and a video stream and two non-real time streams a BFCP stream and a MSRP stream. Peer A 102 generates SIP INVITE message 7024 with a SDP offer message including the stream description information shown in box 7025. This information contains m-line descriptions for the streams and includes m=audio 1234 RTP/AVP G711, m=video 5678 RTP/AVP VP8, m=application 9 TCP/BFCP* and m=message 9 TCP/MSRP*. Operation proceeds from step 7015 to step 7020. In step 7020, Peer A 102 sends the SIP INVITE message 7024 to SBC-1 104. Operation proceeds from step 7020 to step 7030. In step 7030, SBC-1 104 receives SIP INVITE message 7024. Operation proceeds from step 7030 to step 7035.

In step 7035, SBC-1 104 processes the received SIP INVITE message 7024 and its SDP offer message. SBC-1 104 determines which of the streams for the session are to be routed via an MRF and which of the streams of the session are to be routed along a path which does not include an MRF. SBC-1 104 also selects MRF 1 106 as the MRF through which various streams of the session will be routed. In some embodiments, MRF 1 106 is selected from a plurality of MRFs available for providing media processing including for example transcoding, transizing and/or transrating of media content of streams. In this example, SBC-1 104 determines that the real-time audio and video streams of the session will be routed via MRF 1 106 and that the non-real time BFCP and MSRP streams will be routed to Peer B 116 along a route that does not include MRF 1 106 that is that these non-real time streams of the session will bypass MRF 1 106 thereby conserving MRF resources and in some embodiments reducing the cost of licensing MRF services for the call. In some embodiments, SBC-1 104 identifies and determines a first set of streams from the plurality of streams of the session which will not be routed via the MRF in this case the first set of streams is the set of non-real time streams. Operation proceeds from step 7035 to step 7040.

In step 7040, SBC-1 104 determines that the egress SBC for the call through which the call will be routed to Peer B 116 is SBC-2 114.

In step 7046, SBC-1 104 makes the determination to route the real-time streams via MRF 1 106 using a Route header that will cause the call flow of the real-time streams of the session to loop back from MRF-1 106 to SBC-1 104 before being routed to the egress SBC-2 114. SBC-1 104 also determines to route the non-real time streams directly to SBC-2 114 bypassing the MRF 1 106. In some embodiments, SBC-1 104 makes this loopback determination based on the configuration and/or capabilities of the egress SBC, SBC-2 114. For example, in some embodiments, SBC-1 104 performs a sub-step 7047 and determines the egress SBC, SBC-2 114 does not support the proprietary exchange of information to establish separate routes for different streams of the session such as for example described in connection with the methods 5000 or 6000 or in some instances does not support the same mechanism which SBC-1 104 supports for establishing the separate routes for the different streams. In such cases, SBC-1 104 determines that the loopback mode of operation should be used. Operation proceeds from step 7046 to step 7048.

In step 7048, SBC-1 104 generates SIP INVITE message 7054 based on the SIP INVITE message 7024 and the determinations made by SBC-1 104 made in steps 7035, 7040, 7046 and 7047. The SIP INVITE message 7054 includes a SIP offer message with the information included in box 7055, m=audio 2345 G711 and m=video 6789 VP8 and a route header 7056 with a route destination pointing back to SBC-1 and a proprietary extension including a hint_id value which will be used to identify this call leg of the call. The route header 7056 includes ROUTE:<SBC1; hint_id>. The SDP offer message included in the SIP INVITE message 7054 only includes information for the streams to be routed via MRF 1 106 which are the audio and video real-time streams. No information is provided for the non-real MSRP and BFCP streams which are not to be routed via MRF 1 106. Operation proceeds from step 7048 to step 7050.

In step 7050, SBC-1 104 sends the SIP INVITE message 7054 to MRF 1 106. Operation proceeds from step 7050 to step 7060. In step 7060, MRF 1 106 receives the SIP INVITE message 7054. Operation proceeds from step 7060 to step 7070.

In step 7070, MRF 1 106 generates a SIP INVITE message 7084 including a SDP offer message. The SIP INVITE message 7084 is based on the SIP INVITE message 7024. The SDP offer message of the SIP INVITE message 7084 is based on the SDP offer message included in the SIP INVITE message 7024 but is augmented to include additional audio and video codecs supported by MRF 1 106. Box 7085 includes stream description information included in the SDP offer message included in SIP INVITE 7084 which includes m=audio 2345 RTP/AVP G711 G729 and m=video 6789 RTP/AVP VP8. It should be noted that the audio codec format list has been augmented to include G729 codec format and that the video codec format list has been augmented to include the VP8 codec. The SIP INVITE 7084 message also includes a Route header pointing to SBC-1 104 as the destination and including the hint_id. Operation proceeds from step 7070 to step 7080. In step 7080 MRF-1 106 sends the SIP INVITE message 7084 to SBC-1 104. Operation proceeds from step 7080 to step 7090. In step 7090, SBC-1 104 receives the SIP INVITE 7084 message. Operation proceeds from step 7090 to step 7100.

In step 7100, SBC-1 104 processes the received SIP INVITE message 7084. SBC-1 104 identifies the hint_id value in the Route header and correlates this SIP INVITE message 7084 with SIP INVITE message 7054. Operation proceeds from step 7100 to step 7105. In step 7105, SBC-1 104 generates SIP INVITE message 7114 based on the SIP INVITE message 7024 and SIP INVITE message 7084 and the SDP offer messages contained therein. The SIP INVITE message 7114 contains an SDP offer message which combines the SDP offer information corresponding to the real-time streams from the SDP offer in the SIP INVITE message 7084 and the SDP offer information corresponding to the non-real time streams that is the streams not to be routed via MRF 1 106 from the SDP offer message included in the SIP INVITE message 7024. The SDP offer message includes the information shown in box 7115 which is m=audio 3456 RTP/AVP G711 G729, m=video 7890 RTP/AVP VP8 H264, m=application 9 TCP/BFCP*, and m=message 1234 TCP/MSRP*. The SBC SBC-1 104 then stores this information in memory along with the hint_id from the Route header and a session id corresponding to the SIP INVITE message 7024. The SIP INVITE message 7114 does not include a SIP route header including the hint_id. Operation proceeds from step 7105 to step 7110. In step 7110, SBC-1 104 sends the SIP INVITE message 7114 to SBC-2 114. Operation proceeds from step 7110 to step 7120.

In step 7120, SBC-2 114 receives SIP INVITE message 7114. Operation proceeds from step 7120 to step 7130. In step 7130, SBC-2 114 processes the SIP INVITE message 7114 and generates SIP INVITE message 7144 based on SIP INVITE message 7114. SIP INVITE message 7144 includes a SDP offer message including the information regarding the streams of the session shown in box 7145. The stream information shown in box 7145 includes m=audio 4567 G711 G729, m=video 8901 VP8 H264, m=application BFCP and m=message MSRP. Operation proceeds from step 7130 to step 7140. In step 7140, SBC-2 114 sends SIP INVITE message 7144 to Peer B 116. Operation proceeds from step 7140 to step 7150.

In step 7150, Peer B 116 receives SIP INVITE message 7144. Operation proceeds from step 7150 to step 7160. In step 7160, Peer B 116 processes the SIP INVITE message 7144 and the SDP offer message included therein and selects the audio stream codec format to be G729 and the video stream codec format to be H.264. Operation proceeds from step 7160 to step 7165.

In step 7165, Peer B 116 generates SIP 200 OK response message 7174 shown in FIG. 7B based on the SIP INVITE message and the determinations made on the selection of codecs performed in step 7160. The SIP INVITE message is a response to the SIP INVITE message 7144 and includes a SDP answer message to SDP offer message included in the SIP INVITE message 7144. The SDP answer message includes the stream description information shown in box 7175. This stream description information includes m=audio 4321 G729, m=video 8765 H264, m=application BFCP and m=message MSRP. The stream description information for the audio stream indicates the selection of the G729 codec format for the media of the audio stream. The stream description for the video stream indicates the selection of the H.264 codec format for the media of the video stream. Operation proceeds from step 7165 to step 7170 shown on FIG. 7B. In step 7170, Peer B 116 sends SIP 200 OK response message 7174 to SBC-2 114. Operation proceeds from step 7170 to step 7180.

In step 7180, SBC-2 114 receives the SIP 200 OK response message 7174. Operation proceeds from step 7180 to step 7190. In step 7190, SBC-2 114 processes the SIP 200 OK message 7174 and generates a SIP 200 OK response message 7204 responding the SIP INVITE message 7114. The SIP 200 OK response message 7204 is based on the SIP 200 OK response message 7174 and includes a SDP answer message including the information shown in box 7205. This SDP answer information includes: m=audio 5432 G729, m=video 9876 H264, m=application BFCP and m=message MSRP. Operation proceeds from step 7190 to step 7200. In step 7200, SBC-2 114 sends SIP 200 OK response message 7204 to SBC-1 104. Operation proceeds from step 7200 to step 7210.

In step 7210, SBC-1 104 receives the SIP 200 OK response message 7204. Operation proceeds from step 7210 to step 7220. In step 7220, SBC-1 104 uses the session id included in the SIP 200 OK response message to identify corresponding dialog identifier hint_id. Operation proceeds from step 7220 to step 7224.

In step 7224, SBC-1 104 generates SIP 200 OK response message 7234 based on the SIP 200 OK response message 7204. The SIP 200 OK response message 7234 responds to SIP INVITE message 7084. The SIP INVITE message 7234 includes a SDP answer message based on the SDP answer message included in the SIP 200 OK response message 7204. The SDP answer message includes only information corresponding to the streams which are to be routed via the MRF 1 106 which in this example are the real-time audio and video streams. The SDP answer information includes the information shown in box 7235 which includes m=audio 6543 G729 and m=video 1098 H264. The stream information corresponding to the streams for the session which are not to routed via MRF 1 106 are not included the SDP answer message, that is in this example the stream information for the non-real time BFCP and MSRP streams for the session. Operation proceeds from step 7224 to step 7226. In step 7226, SBC-1 104 stores stream information for the non-real time streams in memory. Operation proceeds from step 7226 to step 7230. In step 7230, SBC-1 104 sends the SIP 200 OK response message 7234 to MRF 1 106. Operation proceeds from step 7230 to step 7240.

In step 7240, MRF 1 106 receives the SIP 200 OK response message 7234. Operation proceeds from step 7240 to step 7250. In step 7250, MRF 1 106 processes the SIP 200 OK response message 7234 including the SDP information included therein shown in box 7235 which is extracted and stored and in memory. With respect to the audio stream for the session it determines from the SDP answer that it will need to transcode the media for the audio stream so audio content sent to Peer A 102 is in G.711 format and audio sent to Peer B is in G729 format. With respect to the video stream for the session it determines from the SDP answer that it will need to transcode the video for the video stream of the session so that video sent to Peer B 116 is in H.264 format and that video sent to Peer A 102 is sent in VP8 format. This requires MRF 1 106 to perform audio transcoding between G.711 and G.729 formats and video transcoding between VP8 and H.264 formats. Operation proceeds from step 7250 to step 7254.

In step 7254, MRF 1 106 generates a SIP 200 OK response message 7264 based on the SIP 200 OK response message 7234 and the determination made in processing message 7234. SIP 200 OK response message 7264 is in response to SIP INVITE message 7054 and includes a SDP answer message including the information shown in box 7265. Information included in the SDP answer includes the stream descriptions m=audio 7654 G711, m=video 2198 VP8. Them audio line G711 and m video line VP8 descriptions indicate the acceptance of the codec formats for the streams as per the SDP offer message from Peer A 102 as the MRF 1 106 will be performing the transcoding between the formats. Operation proceeds from step 7254 to step 7260. In step 7260, MRF 1 106 sends SIP 200 OK response message 7264 to SBC-1 104. Operation proceeds from step 7260 to step 7270.

In step 7270, SBC-1 104 receives the SIP 200 OK response message 7264. Operation proceeds from step 7270 to step 7274. In step 7274, SBC-1 104 processes the received SIP 200 OK message 7264. SBC-1 104 determines that there are additional streams for the session and correlates the call legs of the session using call id information included the SIP 200 OK message. Operation proceeds from step 7274 to step 7280.

In step 7280, SBC-1 104 generates SIP 200 OK response message 7294 responding to SIP INVITE message 7024 based on the SIP 200 OK response message 7264 and SIP 200 OK response message 7204 and the SDP answer messages included therein. The SIP 200 OK response message 7294 includes the SDP answer information for the streams to be routed via the MRF-1 106 from the SDP answer message included in the SIP 200 OK response message 7264 and the SDP answer information for the streams which are not to be routed via MRF 1 106 from the SDP answer message included in the SIP 200 OK response message 7204. The SDP answer message included in the SIP 200 OK response message 7294 includes the stream description information shown in box 7295 which includes m=audio 8765 G711, m=video 3219 VP8, m=application BFCP and m=message MSRP. Operation proceeds from step 7280 to step 7290. In step 7290, SBC-1 sends SIP 200 OK response message 7294 to Peer A 102. Operation proceeds from step 7290 to step 7300.

In step 7300, Peer A 102 receives and processes the SIP 200 OK response message 7294. At the conclusion of step 7300, the SDP offer answer exchange has been completed and the routes for the streams of the session have been established. The route or media path for the real-time audio and video streams of the session has been setup via MRF 1 106 and the route for the non-real time BFCP and MSRP streams have been established to be directly exchanged between SBC-1 104 and SBC-2 114. The routing for the streams is shown in FIG. 7C. Signaling arrow 7400 shows the established route and exchange of signals for both the real-time and non-real time streams between Peer A 102 and SBC-1 104. Signaling arrows 7410 and 7420 show the established route and exchange of signals for the audio and video real-time streams for the session from SBC-1 104 to MRF 1 106 and back to SBC-1 where the audio and video content of the streams is transcoded at MRF 1 106. Signaling arrow 7430 shows the established route and exchange of signals for both the real and non-real time streams of the session from SBC-1 104 to SBC-2 114. The route for the non-real time streams bypasses the MRF 1 106. Signaling arrow 7500 shows the established route and exchange of signals for both the real-time and non-real time streams of the session between SBC-2 114 and Peer B 116.

Figure 8A:
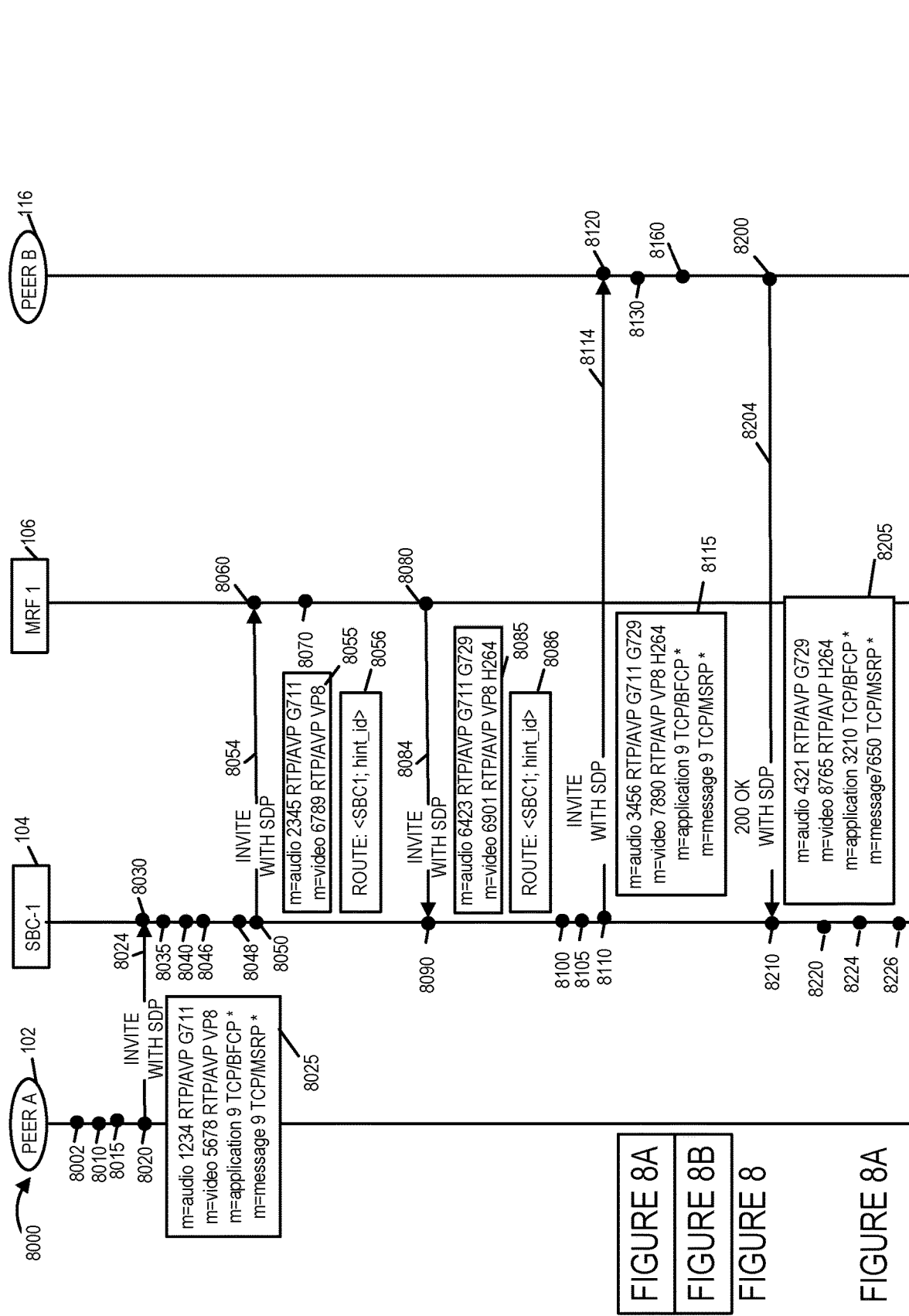
FIG. 8A illustrates a first part of an exemplary signaling diagram and method in accordance with an embodiment of the present invention.
Figure 8B:
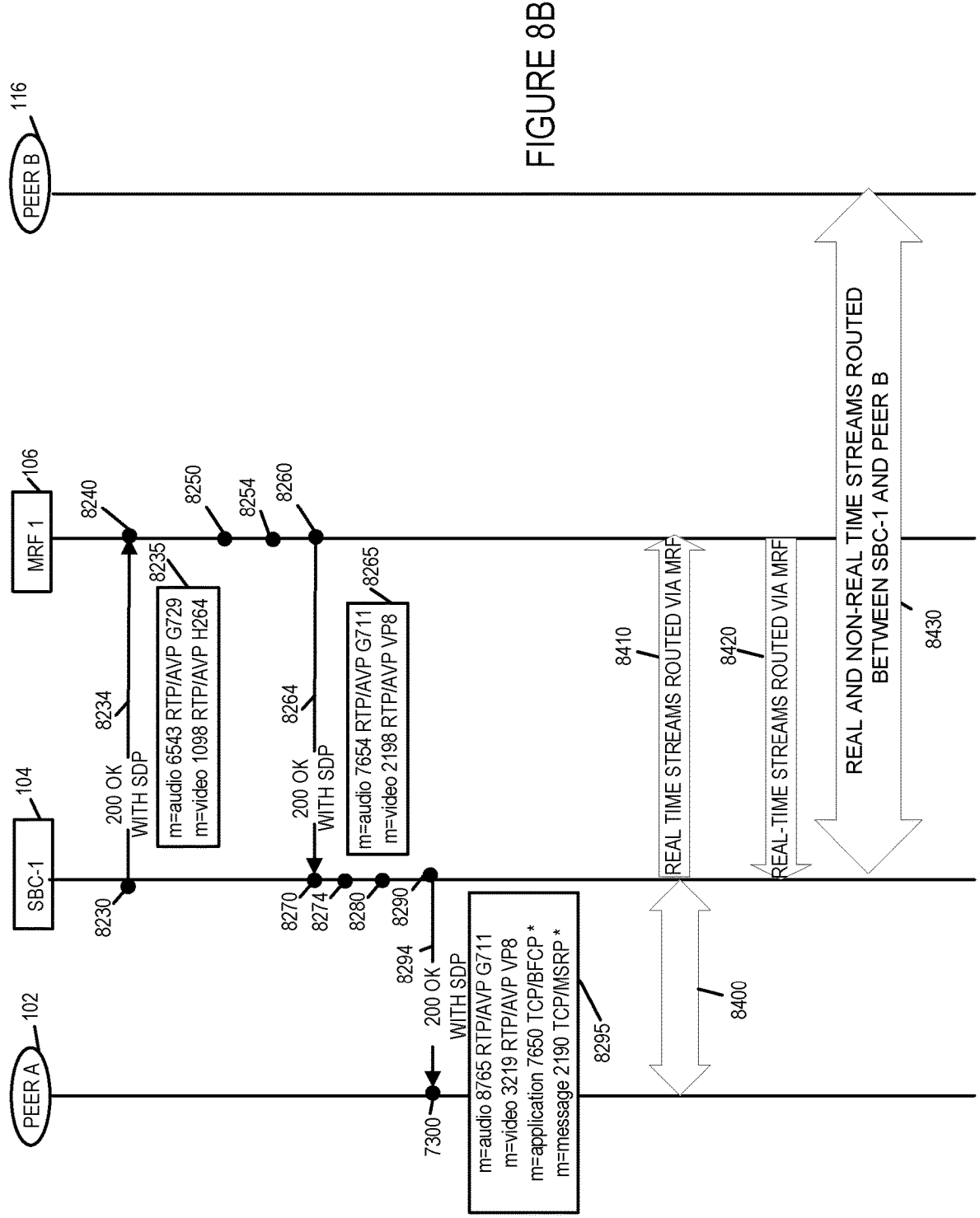
FIG. 8B illustrates a second part of an exemplary signaling diagram and method in accordance with an embodiment of the present invention.

FIG. 8 consists of FIGS. 8A and 8B. In the example shown in signaling diagram/method 8000 of FIG. 8, the MRF 106 acts as a SIP B2BUA Back-to-Back User Agent (UA) when SBC-1 104 invokes an MRF for media processing such as transcoding, transrating, or transizing of the content of one or more media streams. In this example, a single SBC, SBC-1 104, is used to route the plurality of streams of a session received from a first device, Peer A, to a second device, Peer B. The SBC-1 104 routes some of the streams of the session through the MRF 106 and back to itself and then sends all streams of the session on to second device, Peer B. The method and signaling for this example will now be explained in further detail.

On receiving a SIP INVITE message from Peer A 102 directed to Peer B 116, SBC-1 104 analyzes the SIP INVITE message and determines which streams of the session are to be routed via MRF 1 106 and which streams of the session are not to be routed via MRF 1 106 but are to bypass MRF 1 106 thereby conserving MRF resources. In this example, SBC-1 104 identifies from the SIP INVITE message that the session will have four streams two streams are real-time streams and two streams are non-real time streams. The two real time streams are an audio stream and a video stream. The two non-real time streams are a BFCP stream and a MSRP stream. SBC-1 104 also identifies and places the two non-real time streams in a first set of streams which the SBC-1 104 determines will not require media content processing and which will be routed to Peer B 116 without passing through MRF 1 106. SBC-1 104 determines that the two real-time streams will be routed to an MRF so that the media of the audio and video content of the real-time streams can be processed such as for example by transcoding, transizing and/or transrating the media content of the streams.

SBC-1 104 further determines that it will use a loop back mechanism to route the real time streams of the session to the MRF 1 106 and back to SBC-1 104 before sending the real-time streams of the session to the destination Peer B 116.

Having determined that the audio and video streams of the session will be routed via a MRF node, SBC-1 104 selects MRF 1 106. SBC-1 104 sends a SIP INVITE message via MRF-1 106. This SIP INVITE message contains a SDP offer message with m line descriptions for the audio and video streams. The SDP offer message does not contain descriptions for the non-real time MSRP and BFCP streams of the session. SBC-1 104 also adds a Route header so that the call loops back to itself and in the Route header SBC-1 104 includes dialog state information in a proprietary header referred to as hint_id. MRF-1 106 receives the SIP INVITE message with the SDP offer message and augments the SDP offer message with additional codecs (audio/video) and sends the SIP INVITE message back to SBC-1 104 based on the Route header. The dialog-state information present in the Route header is used by SBC-1 104 to correlate the two call-legs and also to determine that additional streams not to be routed via MRF 1 106 such as the non-real time streams for the session are present.

Using this information, SBC-1 104 generates a SIP INVITE with an SDP offer having the audio/video stream descriptions from the SDP offer received from the MRF and includes the description lines from the original SDP message from the ingress Peer A 102 for the streams to be routed without including MRF-1 106 which in this example includes the non-real time BFCP and MRSRP streams. SBC-1 104 then sends the generated SIP INVITE with the combined SDP offer to Peer B 116. The SBC-1 104 stores in memory the hint_id and session id so that it can correlate the response from the Peer B 116 with the response which needs to be sent to MRF-1 106. Peer B 116 selects the codec formats for the audio and video streams and sends back a SIP 200 OK response with an SDP answer message to SBC-1 104.

SBC-1 104 on receiving the SDP answer from Peer B 116 uses the session id in the response to correlate this answer with the session and the corresponding hint_id. SBC-1 104 then generates and sends a SIP 200 OK response with an SDP answer message containing the audio and video SDP answer line descriptions received in the SDP answer from Peer B 116 but removes the SDP answer line descriptions corresponding to the streams that are not be routed via MRF 1 106 which in this example are the non-real time streams to MRF 1 106.

MRF 1 106 receives the SIP 200 OK message, processes the SDP answer and generates and sends a SIP 200 OK response message with a SDP answer message to SBC-1 104. SBC-1 104 on receiving the SIP 200 OK response message with MRF 1 106's SDP answer message generates a SIP 200 OK response to send to Peer A including a SDP answer message including the SDP answer from MRF-1 106 corresponding to the streams which are to be routed via MRF-1 and the SDP answer received from Peer B 116 with respect to the streams to be routed without passing through MRF 1 106. SBC-1 104 then sends the generated SIP 200 OK response with the combined SDP answer for the streams of the sessions to Peer A 102. Peer A 102 receives and processes the SIP 200 OK response message with SDP answer and at the conclusion of the processing the routes for the real-time and non-real time streams have been established with the real-time audio and video streams being routed via the MRF 1 106 and the non-real time BFCP and MSRP streams not being routed via the MRF 1 106 but bypassing MRF 1 106 and being routed directly to Peer B 116.

Details of the steps and signaling of the exemplary method 8000 illustrated in FIG. 8 will now be provided.

Operation of the method begins in start step 8002, shown on FIG. 8A. Operation proceeds from start step 8002 to step 8010. In step 8010, Peer A 102 makes a determination to establish a call session with Peer B 116. The call session is to have four streams two real time streams, an audio stream and a video stream, and two non-real time streams, a BFCP stream and a MSRP stream. Operation proceeds from step 8010 to step 8015. In step 8015, Peer A 102 generates SIP INVITE message 8024 with a SDP offer message including the stream description information shown in box 8025. This information contains m-line descriptions for the streams and includes m=audio 1234 RTP/AVP G711, m=video 5678 RTP/AVP VP8, m=application 9 TCP/BFCP*, and m=message 9 TCP/MSRP*. Operation proceeds from step 8015 to step 8020. In step 8020, Peer A 102 sends the SIP INVITE message 8024 to SBC-1 104. Operation proceeds from step 8020 to step 8030. In step 8030, SBC-1 104 receives SIP INVITE message 8024. Operation proceeds from step 8030 to step 8035.

In step 8035, SBC-1 104 processes the received SIP INVITE message 8024 and its SDP offer message. SBC-1 104 determines which of the streams for the session are to be routed via an MRF and which of the streams of the session are to be routed along a path which does not include an MRF. SBC-1 104 also selects MRF 1 106 as the MRF through which various streams of the session will be routed. In some embodiments, MRF 1 106 is selected from a plurality of MRFs available for providing media processing including for example transcoding, transizing and/or transrating of media content of streams. In this example, SBC-1 104 determines that the real-time audio and video streams of the session will be routed via MRF 1 106 and that the non-real time BFCP and MSRP streams will be routed to PEER B along a route that does not include MRF1 106 that is that these non-real time streams of the session will bypass MRF 1 106 thereby conserving MRF resources and in some embodiments reducing the cost of licensing MRF services for the call. In some embodiments, SBC-1 104 identifies and determines a first set of streams from the plurality of streams of the session which will not be routed via the MRF in this case the first set of streams is the set of non-real time streams. Operation proceeds from step 8035 to step 8040.

In step 8040, SBC-1 104 determines to route the call to Peer B 116 without the call passing through a second SBC-.

In step 8046, SBC-1 104 makes the determination to route the real-time streams via MRF 1 106 using a Route header that will cause the call flow of the real-time streams of the session to loop back from MRF-1 106 to SBC-1 104 before being routed to the Peer B 116. SBC-1 104 also determines to route the non-real time streams directly to Peer B 116 bypassing the MRF 1 106. Operation proceeds from step 8046 to step 8048.

In step 8048, SBC-1 104 generates SIP INVITE message 8054 based on the SIP INVITE message 8024 and the determinations made by SBC-1 104 made in steps 8035, 8040, and 8046. The SIP INVITE message 8054 includes a SIP offer message with the information included in box 8055, m=audio 2345 RTP/AVP G711 and m=video 6789 RTP/AVP VP8 and a route header 8056 with a route destination pointing back to SBC-1 104 and a proprietary extension including a hint_id value which will be used to identify this call leg of the call. The route header 8056 includes ROUTE:<SBC1; hint_id>. SBC1 being a port and IP address for SBC-1 104. The SDP offer message included in the SIP INVITE message 8054 only includes information for the streams to be routed via MRF 1 106 which are the audio and video real-time streams. No information is provided for the non-real MSRP and BFCP streams which are not to be routed via MRF 1 106. Operation proceeds from step 8048 to step 8050.

In step 8050, SBC-1 104 sends the SIP INVITE message 8054 to MRF 1 106. Operation proceeds from step 8050 to step 8060. In step 8060, MRF 1 106 receives the SIP INVITE message 8054. Operation proceeds from step 8060 to step 8070.

In step 8070, MRF 1 106 generates a SIP INVITE message 8084 including a SDP offer message. The SIP INVITE message 8084 is based on the SIP INVITE message 8054. The SDP offer message of the SIP INVITE message 8084 is based on the SDP offer message included in the SIP INVITE message 8054 but is augmented to include additional audio and video codecs supported by MRF 1 106. Box 8085 includes stream description information included in the SDP offer message included in SIP INVITE 8084 which includes m=audio 6423 RTP/AVP G711 G729 and m=video 6901 RTP/AVP VP8 H264. It should be noted that the audio codec format list has been augmented to include G729 codec format and that the video codec format list has been augmented to include the H264 codec. The SIP INVITE 8084 message also includes a Route header 8086 pointing to SBC-1 104 as the destination and including the hint_id. Operation proceeds from step 8070 to step 8080. In step 8080 MRF-1 106 sends the SIP INVITE message 8084 to SBC-1 104. Operation proceeds from step 8080 to step 8090. In step 8090, SBC-1 104 receives the SIP INVITE 8084 message. Operation proceeds from step 8090 to step 8100.

In step 8100, SBC-1 104 processes the received SIP INVITE message 8084. SBC-1 104 identifies the hint_id value in the Route header and correlates this SIP INVITE message 8084 with SIP INVITE message 8054. Operation proceeds from step 8100 to step 8105. In step 8105, SBC-1 104 generates SIP INVITE message 8114 based on the SIP INVITE message 8024 and SIP INVITE message 8084 and the SDP offer messages contained therein. The SIP INVITE message 8114 contains an SDP offer message which combines the SDP offer information corresponding to the real-time streams from the SDP offer in the SIP INVITE message 8084 and the SDP offer information corresponding to the non-real time streams that is the streams not to be routed via MRF 1 106 from the SDP offer message included in the SIP INVITE message 8024. The SDP offer message includes the information shown in box 8115 which is m=audio 3456 RTP/AVP G711 G729, m=video 7890 RTP/AVP VP8 H264, m=application 9 TCP/BFCP*, and m=message 9 TCP/MSRP*. SBC-1 104 then stores this information in memory along with the hint_id from the Route header and a session id corresponding to the SIP INVITE message 8024. The SIP INVITE message 8114 does not include a SIP route header including the hint_id. Operation proceeds from step 8105 to step 8110. In step 8110, SBC-1 104 sends the SIP INVITE message 8114 to Peer B 116. Operation proceeds from step 8110 to step 8120.

In step 8120, Peer B 116 receives SIP INVITE message 8114. Operation proceeds from step 8120 to step 8130. In step 8130, Peer B 116 processes the SIP INVITE message 8114 and the SDP offer message included therein and selects the audio stream codec format to be G729 and the video stream codec format to be H.264. Operation proceeds from step 8130 to step 8160.

In step 8160, Peer B 116 generates SIP 200 OK response message 8204 based on the SIP INVITE message 8114 and the determinations made on the selection of codecs performed in step 8130. The SIP INVITE 200 OK message 8204 is a response to the SIP INVITE message 8114 and includes a SDP answer message to SDP offer message included in the SIP INVITE message 8114. The SDP answer message includes the stream description information shown in box 8205. This stream description information includes m=audio 4321 RTP/AVP G729, m=video 8765 RTP/AVP H264, m=application 3210 TCP/BFCP*, and m=message 7650 TCP/MSRP*. The stream description information for the audio stream indicates the selection of the G729 codec format for the media of the audio stream. The stream description for the video stream indicates the selection of the H.264 codec format for the media of the video stream. Operation proceeds from step 8160 to step 8200. In step 8200, Peer B 116 sends SIP 200 OK response message 8204 to SBC-1 104. Operation proceeds from step 8200 to step 8210.

In step 8210, SBC-1 104 receives the SIP 200 OK response message 8200. Operation proceeds from step 8210 to step 8220. In step 8220, SBC-1 104 uses the session id included in the SIP 200 OK response message to identify corresponding dialog identifier hint_id. Operation proceeds from step 8220 to step 8224.

In step 8224, SBC-1 104 generates SIP 200 OK response message 8234 based on the SIP 200 OK response message 8204. The SIP 200 OK response message 8234 responds to SIP INVITE message 8084. The SIP 200 OK Response message 8234 includes a SDP answer message based on the SDP answer message included in the SIP 200 OK response message 8204. The SDP answer message includes only information corresponding to the streams which are to be routed via the MRF 1 106 which in this example are the real-time audio and video streams. The SDP answer information includes the information shown in box 8235 which includes m=audio 6543 RTP/AVP G729 and m=video 1098 RTP/AVP H264. The stream information corresponding to the streams for the session which are not to routed via MRF 1 106 are not included the SDP answer message, that is in this example the stream information for the non-real time BFCP and MSRP streams for the session. Operation proceeds from step 8224 to step 8226. In step 8226, SBC-1 104 stores stream information for the non-real time streams in memory. Operation proceeds from step 8226 to step 8230. In step 8230 shown on FIG. 8B, SBC-1 104 sends the SIP 200 OK response message 8234 to MRF 1 106. Operation proceeds from step 8230 to step 8240.

In step 8240, MRF 1 106 receives the SIP 200 OK response message 8234. Operation proceeds from step 8240 to step 8250. In step 8250, MRF 1 106 processes the SIP 200 OK response message 8234 including the SDP information included therein shown in box 8235 which is extracted and stored and in memory. With respect to the audio stream for the session it determines from the SDP answer that it will need to transcode the media for the audio stream so audio content sent to Peer A 102 is in G.711 format and audio sent to Peer B is in G729 format. With respect to the video stream for the session it determines from the SDP answer that it will need to transcode the video for the video stream of the session so that video sent to Peer B 116 is in H.264 format and that video sent to Peer A 102 is sent in VP8 format. This requires MRF 1 106 to perform audio transcoding between G.711 and G.729 formats and video transcoding between VP8 and H.264 formats. Operation proceeds from step 8250 to step 8254.

In step 8254, MRF 1 106 generates a SIP 200 OK response message 8264 based on the SIP 200 OK response message 8234 and the determination made in processing message 8234. SIP 200 OK response message 8264 is in response to SIP INVITE message 8054 and includes a SDP answer message including the information shown in box 8265. Information included in the SDP answer includes the stream descriptions m=audio 7654 RTP/AVP G711, m=video 2198 RTP/AVP VP8. The m audio line G711 and m video line VP8 descriptions indicate the acceptance of the codec formats for the streams as per the SDP offer message from Peer A 102 as the MRF 1 106 will be performing the transcoding between the formats. Operation proceeds from step 8254 to step 8260. In step 8260, MRF 1 106 sends SIP 200 OK response message 8264 to SBC-1 104. Operation proceeds from step 8260 to step 8270.

In step 8270, SBC-1 104 receives the SIP 200 OK response message 8264. Operation proceeds from step 8270 to step 8274. In step 8274, SBC-1 104 processes the received SIP 200 OK message 8264. SBC-1 104 determines that there are additional streams for the session and correlates the call legs of the session using call id information included the SIP 200 OK message 8264. Operation proceeds from step 8274 to step 8280.

In step 8280, SBC-1 104 generates SIP 200 OK response message 8294 responding to SIP INVITE message 8024 based on the SIP 200 OK response message 8264 and SIP 200 OK response message 8204 and the SDP answer messages included therein. The SIP 200 OK response message 8294 includes the SDP answer information for the streams to be routed via the MRF-1 106 from the SDP answer message included in the SIP 200 OK response message 8264 and the SDP answer information for the streams which are not to be routed via MRF 1 106 from the SDP answer message included in the SIP 200 OK response message 8204. The SDP answer message included in the SIP 200 OK response message 8294 includes the stream description information shown in box 8295 which includes m=audio 8765 RTP/AVP G711, m=video 3219 RTP/AVP VP8, m=application 7650 TCP/BFCP* and m=message 2190 TCP/MSRP*. Operation proceeds from step 8280 to step 8290. In step 8290, SBC-1 104 sends SIP 200 OK response message 8294 to Peer A 102. Operation proceeds from step 8290 to step 8300.

In step 8300, Peer A 102 receives and processes the SIP 200 OK response message 8294. At the conclusion of step 8300, the SDP offer answer exchange has been completed and the routes for the streams of the session have been established. The route or media path for the real-time audio and video streams of the session has been setup via MRF 1 106 and the route for the non-real time BFCP and MSRP streams have been established to be directly exchanged between SBC-1 104 and Peer B 116. The routing for the streams is shown in FIG. 8B. Signaling arrow 8400 shows the established route and exchange of signals for both the real-time and non-real time streams between Peer A 102 and SBC-1 104. Signaling arrows 8410 and 8420 show the established route and exchange of signals for the audio and video real-time streams for the session from SBC-1 104 to MRF 1 106 and back to SBC-1 104 where the audio and video content of the streams is transcoded at MRF 1 106. Signaling arrow 8430 shows the established route and exchange of signals for both the real and non-real time streams of the session from SBC-1 104 to Peer B 116. The route for the non-real time streams bypasses the MRF 1 106.

FIG. 11 illustrates an assembly of modules 1100 for use in a MRF in accordance with an exemplary embodiment of the present invention. The assembly of modules 1100 may be, and in some embodiments is, used as the assembly of modules 418 in MRF 400 illustrated in FIG. 4. In some embodiments, the assembly of modules 1100 is used as the assembly of modules 419 in MRF 400 illustrated in FIG. 4. In some embodiments, some of the modules of the assembly of modules 1100 are implemented as hardware as part of the assembly of modules 419 and some of the modules of the assembly of modules 1100 are implemented in software as part of the assembly of modules 418. The assembly of modules 1100 includes transcoder modules 1102 including audio and video codecs, e.g. G.711 codec, G.729 codec, VP8 codec and H.264 codec, SIP message generation module 1104 including a SIP INVITE message generation module 1106 and a SIP 200 OK response generation module 1108, a SDP message generation module 1110 including a SDP offer message generation sub-module 1112 and a SDP answer generation sub-module 1114, a memory storage control module 1116 configured to store in memory data/information, e.g., SDP offer and answer information.

Figure 12B:
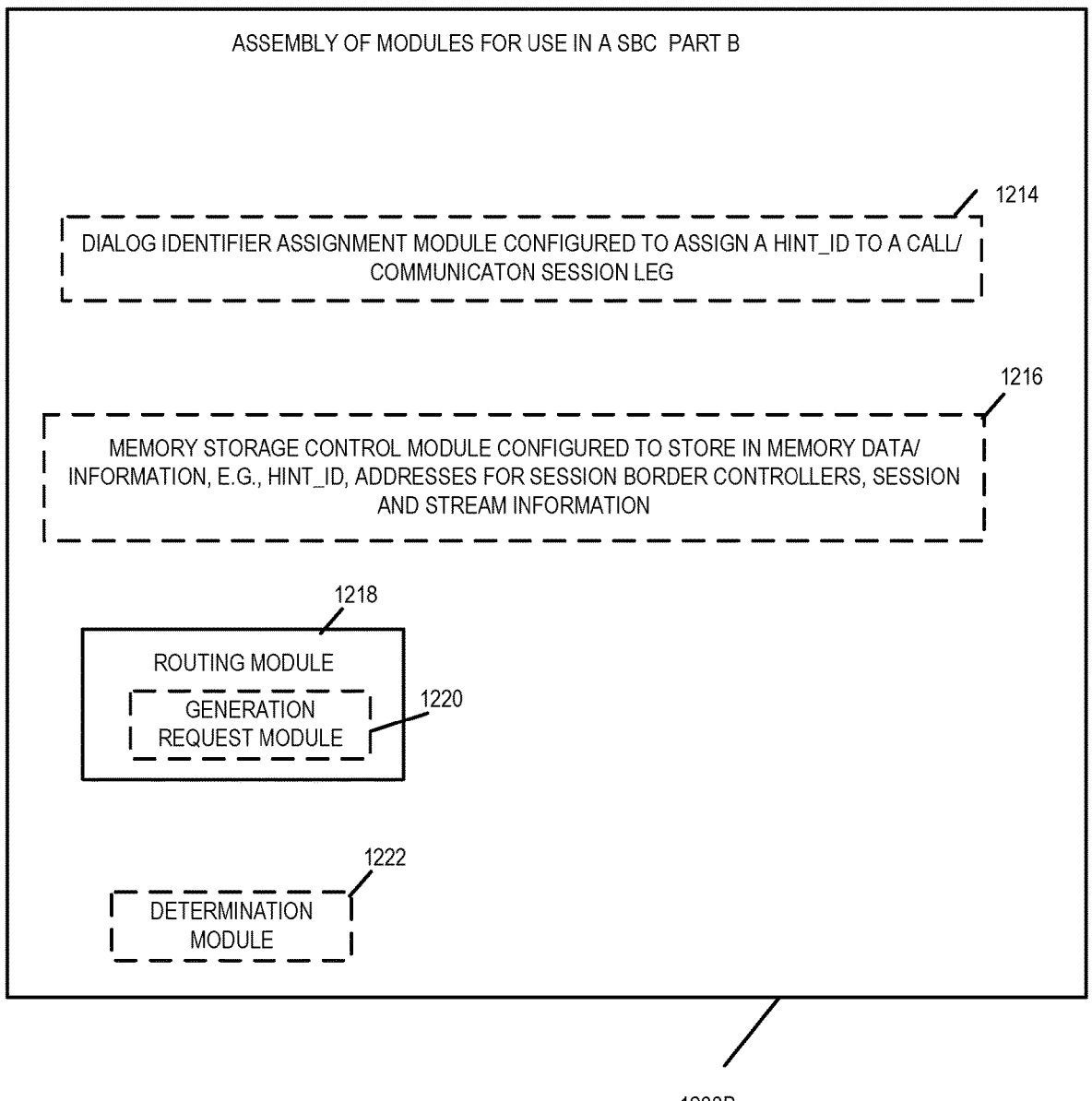
FIG. 12B illustrates a second part of an exemplary assembly of modules for use in a Session Border Controller in accordance with an exemplary embodiment of the present invention.

FIG. 12 which comprises a first part FIG. 12A and a second part FIG. 12B illustrates an assembly of modules for use in a SBC in accordance with an exemplary embodiment of the present invention. The assembly of modules consisting of 1200A and 1200B may be, and in some embodiments is, used as the assembly of modules 318 in SBC 300 illustrated in FIG. 3 and in SBC-1 104 and SBC-2 114 in FIGS. 1A, 1B, 5, 6, 7, and 8 as well as the SBCs of the method 1300. In some embodiments, the assembly of modules 1200A and 1200B is used as the assembly of assembly 319 in SBC 300 illustrated in FIG. 3. In some embodiments, some of the modules of the assembly of modules 1200A and 1200B are implemented as hardware as part of the assembly of modules 319 and some of the modules of the assembly of modules 1200A and 1200B are implemented in software as part of the assembly of modules 318. The assembly of modules 1200 includes a SIP message generation module 1202 including a SIP INVITE message generation module 1204 and a SIP 200 OK response generation module 1206, a SDP message generation module 1208 including a SDP offer message generation sub-module 1210 and a SDP answer generation sub-module 1212, a routing module 1218 including an optional generation request module 1220, an optional determination module 1222, an optional dialog identifier assignment module 1214 configured to assign a unique hint_id to a call/communication session leg, and an optional memory storage control module 1216 configured to store in memory data/information, e.g., SDP offer and answer information, dialog identifier information and device address, e.g., SBCs, MRF nodes, and Peer device addresses.

Figures 13, 13A, 13B, 13C:
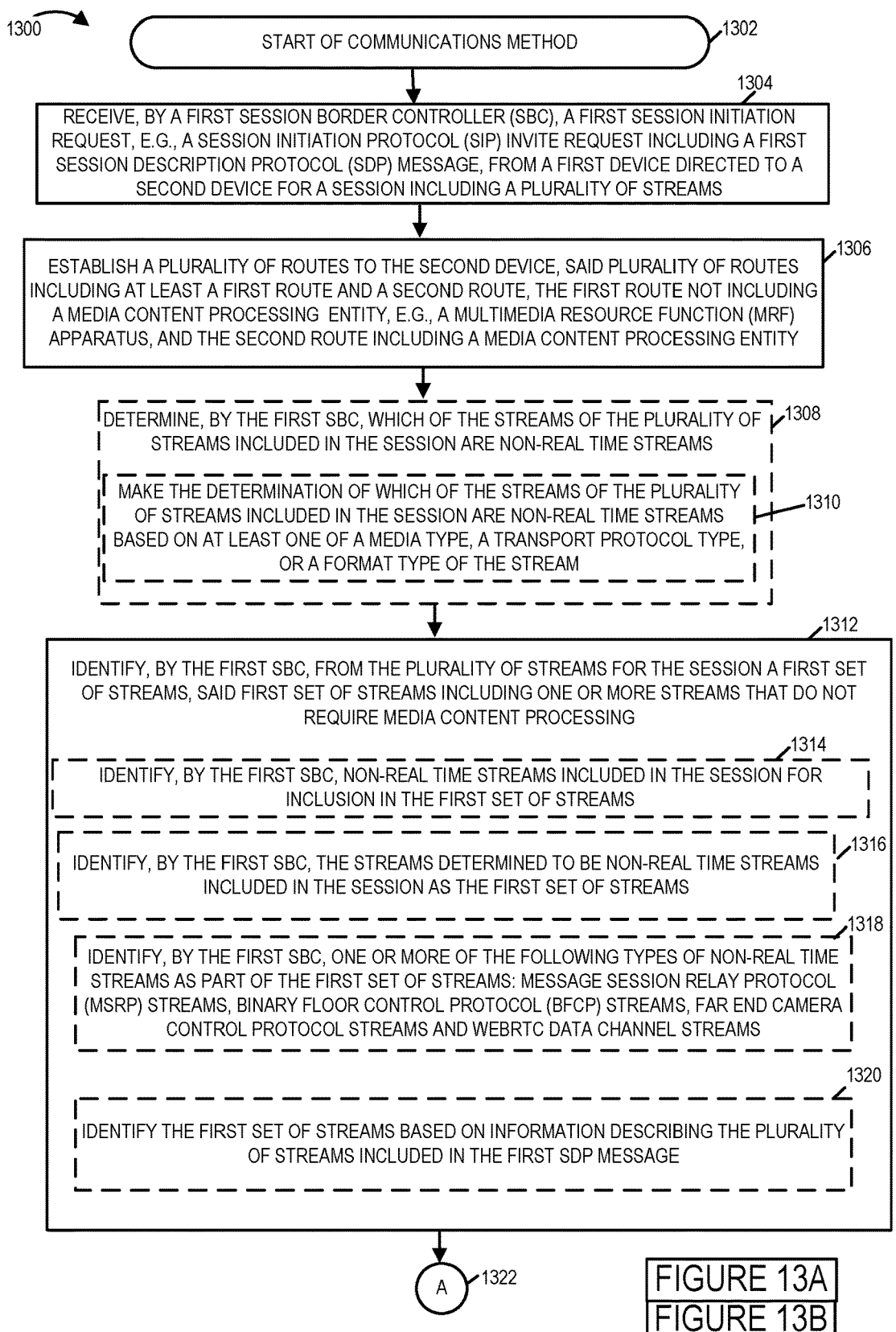
FIG. 13 comprises FIGS. 13A, 13B, and 13C.
FIG. 13A illustrates a first part of a flowchart of an exemplary method in accordance with an embodiment of the present invention.
FIG. 13B illustrates a second part of a flowchart of an exemplary method in accordance with an embodiment of the present invention.
FIG. 13C illustrates a third part of a flowchart of an exemplary method in accordance with an embodiment of the present invention.
Figure 13B:
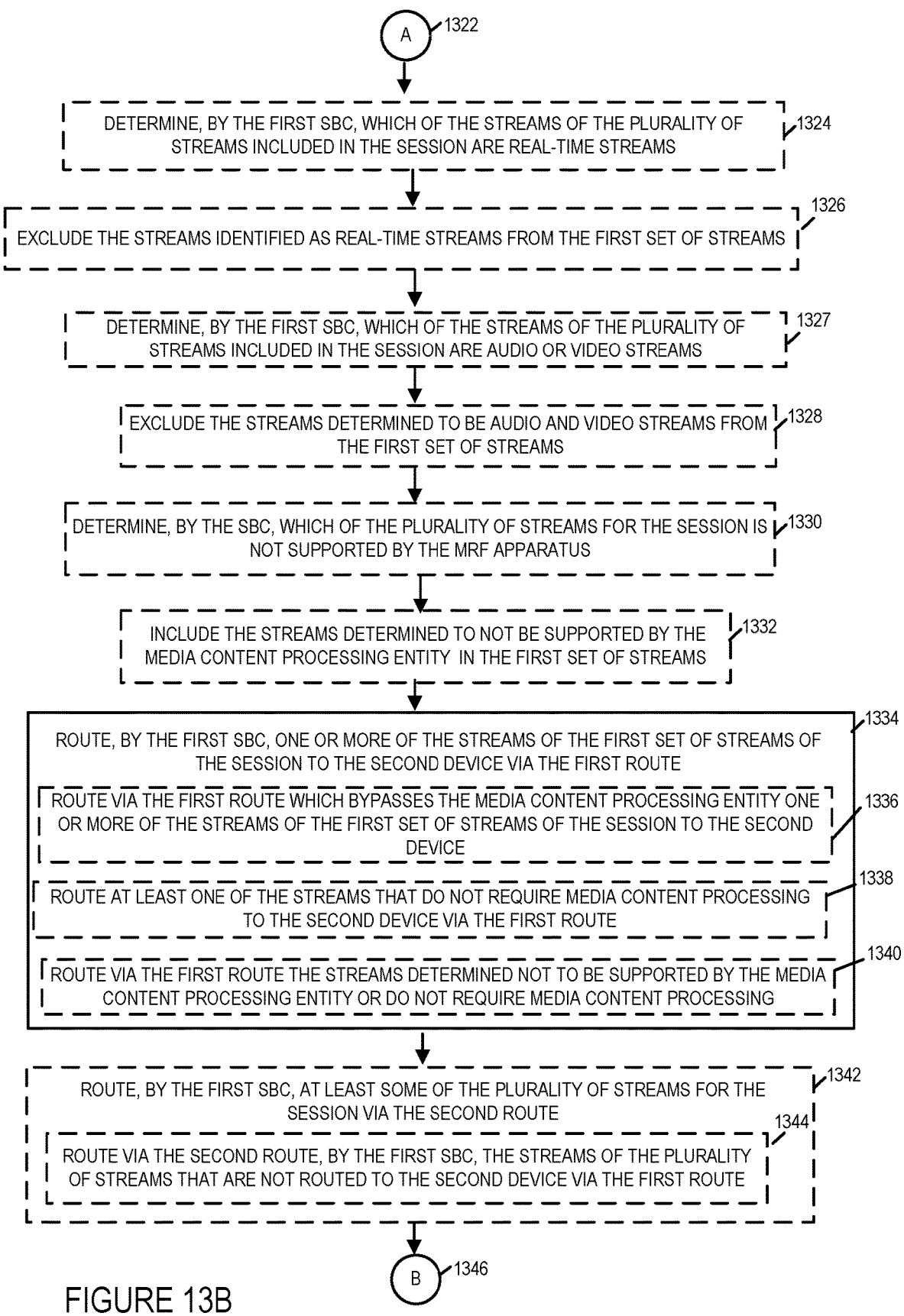
Figure 13C:
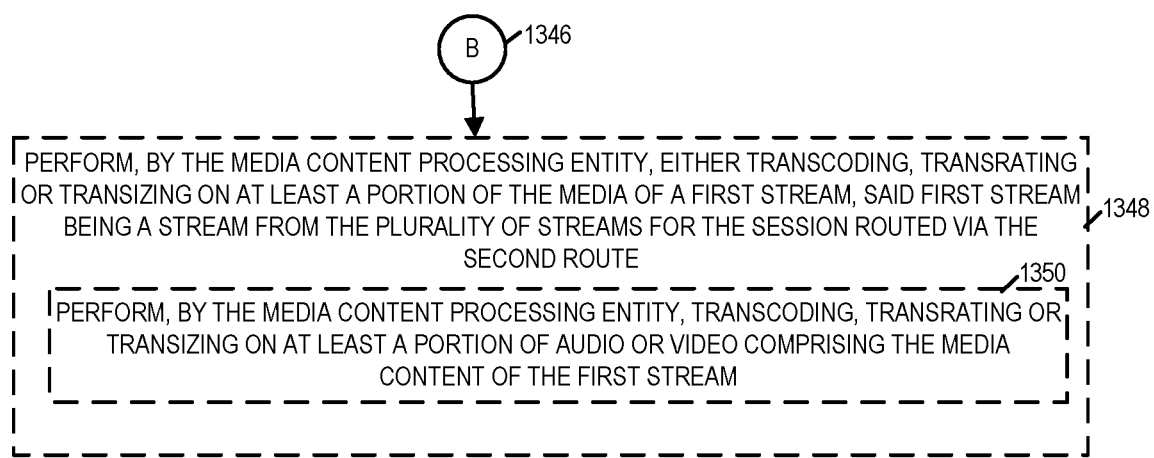

FIG. 13 comprises FIGS. 13A, 13B, and 13C. FIG. 13A illustrates a first part of a flowchart of an exemplary method in accordance with an embodiment of the present invention. FIG. 13B illustrates a second part of a flowchart of an exemplary communications method in accordance with an embodiment of the present invention. FIG. 13C illustrates a third part of a flowchart of an exemplary communications method in accordance with an embodiment of the present invention. The exemplary method 1300 illustrated in the flowchart of FIG. 13 may be, and in some embodiments is, implemented using the system 100 of FIG. 1A.

Method 1300 commences in start step 1302 shown on FIG. 13A. Operation proceeds from start step 1302 to step 1304. In step 1304, a first Session Border Controller (SBC) receives a first session initiation request, e.g., a Session Initiation Protocol (SIP) Invite request including a first Session Description Protocol (SDP) message from a first device directed to a second device for a session including a plurality of streams. The first SDP message may and in most embodiments does include information about each of the plurality of streams. In some embodiments, the first device and second device are peer devices such as for example Peer A 102 and Peer B 116 illustrated in FIG. 100 of FIG. 1A. In some embodiments of the communications method 1300, the first and second devices are user devices such as smartphones, laptops, tablets, computers, etc. In some embodiments of the communications method 1300, the first SBC is an edge of network device. Operation proceeds from step 1304 to step 1306.

In step 1306, a plurality of routes to the second device is established. The plurality of routes include at least a first route and a second route. The first route not including a media content processing entity and the second route including a media content processing entity. In some embodiments, the plurality of routes is established by the first SBC. In some embodiments, the media content processing entity is a Media Resource Function apparatus (MRF) such as for example, MRF 1 106 of system 100. In some embodiments, operation proceeds from step 1306 to optional step 1308.

In step 1308, the first SBC determines which of the streams of the plurality of streams included in the session are non-real time streams. In some embodiments, determination step 1308 includes sub-step 1310. In sub-step 1310, the first SBC makes the determination of which of the streams of the plurality of streams of the session are non-real time streams based on at least one of a media type, a transport protocol type, or a format type of the stream. Operation proceeds from optional step 1308 or step 1306 if step 1308 is not implemented to step 1312.

In step 1312, the first SBC identifies from the plurality of streams for the session a first set of streams. The first set of streams including one or more streams that do not require media content processing. In some embodiments, step 1312 includes one or more sub-steps 1314, 1316, 1318 and 1320. In sub-step 1314, the first SBC identifies the non-real time streams included in the session for inclusion in the first set of streams. In sub-step 1316 the first SBC identifies the streams determined to be non-real time streams included in the session as the first set of streams. In some embodiments, the first set of streams consists essentially of the identified non-real time streams. In some embodiments, the first set of streams consists of the non-real time streams of the session. In sub-step 1318, the first SBC identifies one or more of the following types of non-real time streams as part of the first set of streams: Message Session Relay Protocol (MSRP) streams, Binary Floor Control Protocol (BFCP) streams, Far End Camera Control Protocol streams and webRTC data channel streams. In sub-step 1320, the first set of streams is identified based on the information describing the plurality of streams included in the first session initiation request, e.g., based on the information describing the streams of the plurality included in the first SDP message included in the first session initiation request. Operation proceeds from step 1312 to optional step 1324 shown on FIG. 13B via connection node A 1322.

In step 1324, the first SBC determines which of the streams of the plurality of stream included in the session are real-time streams. Operation proceeds from optional step 1324 to optional step 1326. In optional step 1326, the first SBC excludes the streams identified as real-time streams from the first set of streams. Operation proceeds from optional step 1326 to step 1327. In step 1327, the first SBC determines which of the streams of the plurality of streams included in the session are audio or video streams. Operation proceeds from step 1327 to optional step 1328. In step 1328, the first SBC excludes the streams determined to audio and video streams from the first set of streams. Operation proceeds from step 1328 to optional step 1330.

In step 1330, the first SBC determines which of the plurality of streams for the session is not supported by the media content processing apparatus (MRF) included in the second route. Operation proceeds from step 1330 to optional step 1332. In step 1332 the first SBC includes the streams determined to not be supported by the media content processing entity included in the second route in the first set of streams.

Operation proceeds from 1312 or one of the optional steps 1324, 1326, 1327, 1328, 1330, 1332 to step 1334.

In step 1334, the first SBC routes one or more of the streams of the first set of streams of the session to the second device via the first route. In some embodiments, the first route bypasses the media content processing entity. In some embodiments, step 1334 includes one or more of optional sub-steps 1336, 1338, 1340.

In sub-step 1336, the first SBC routes the one or more of the streams of the first set of streams of the session to the second device via the first route which bypasses the media content processing entity. In sub-step 1338, the first SBC routes at least one of the steams that do not require media content processing to the second device via the first route. In step 1340, the first SBC routes via the first route the streams determined not to be supported by the media content processing entity or do not require media content processing.

In some embodiments, operation proceeds from step 1334 to step 1342. In step 1342, the first SBC routes at least some of the plurality of streams for the session via the second route. In some embodiments, the optional step 1342 includes sub-step 1344. In sub-step 1344, the first SBC routes via the second route, the streams of the plurality of streams of the session that are not routed to the second device via the first route. In some embodiments, the first SBC routes only the streams that require media content processing via the second route and routes all other streams of the session via the first route. In some embodiments, the first SBC routes all of the non-real-time streams of the session via the first route and all of the real time streams of the session via the second route. In some embodiments, the first SBC routes all streams supported by the media content processing entity via the second route and streams not supported by the media content processing entity via the first route. In some embodiments, the first SBC routes only the audio and video streams of the session via the second route and routes the remaining streams of the session via the first route which bypasses the media content processing entity.

In some embodiments operation proceeds from step 1334 or optional step 1342 via connection node B 1346 to optional step 1348 shown on FIG. 13C.

In step 1348, the media content processing entity, e.g., Media Resource Function node, performs one of more of transcoding, transrating, or transizing on at least a portion of the media of a first stream. The first stream being a stream from the plurality of streams for the session routed via the second route. In some embodiments, the media content of said first stream includes at least one of audio or video and the first media processing entity performs said transcoding, transrating or transizing on at least a portion of said audio or said video. In some embodiments, step 1348 includes optional step 1350. In step 1350, the media content processing entity performs transcoding, transrating or transizing on at least a portion of audio or video comprising the media content of the first stream.

While the method 1300 is shown for a single session initiation request, the method 1300 may be, and in some embodiments, is repeated for each new session initiation request received by the first SBC.

In some embodiments of the communications method 1300, the media content processing entity is a Media Resource Function apparatus or node operating in back-to-back user agent mode. In some embodiments, of the communications method 1300, the Media Resource Function apparatus or node included in the second route does not support processing or pass through of non-real time protocol streams.

Figure 14A:
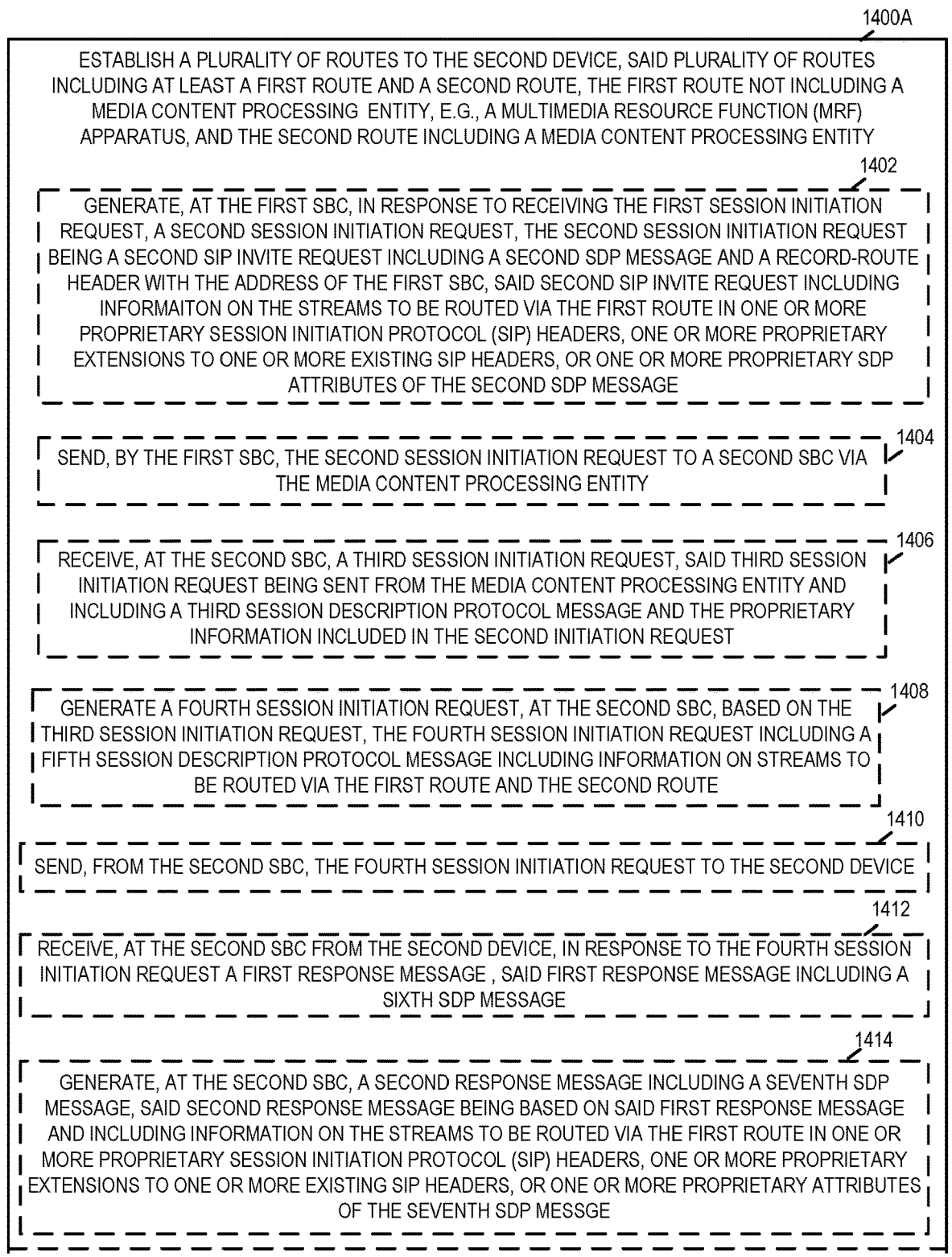
FIG. 14A illustrates a first part of a flowchart providing additional exemplary sub-steps of the route establishment step of the exemplary method illustrated in FIG. 13 in accordance with an embodiment of the present invention.
Figure 14B:
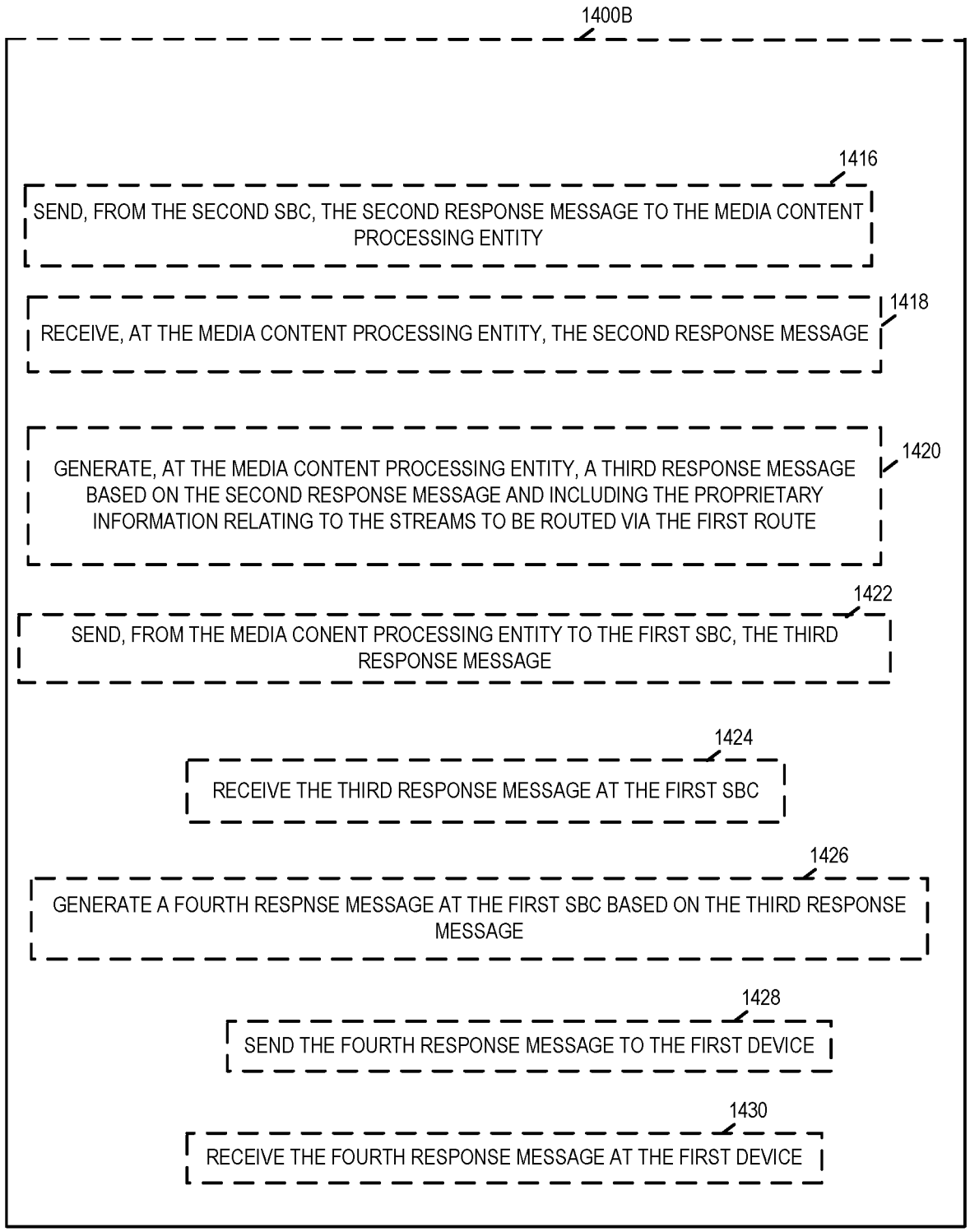
FIG. 14B illustrates a second part of a flowchart providing additional exemplary sub-steps of the route establishment step of the exemplary method illustrated in FIG. 13 in accordance with an embodiment of the present invention.

FIG. 14 comprises FIGS. 14A and 14B. FIG. 14A shows a first part of a set of optional sub-steps that may be, and in some embodiments are, implemented as part of step 1306 of the method 1300. FIG. 14B shows a second part of a set of optional sub-steps that may be, and in some embodiments are, implemented as part of the step 1306 of the method 1300. In some embodiments of the communications method 1300, step 1306 which establishes a plurality of routes to the second device includes one or more of sub-steps 1402, 1404, 1406, 1408, 1410, 1412, 1414 shown in 1400A of FIG. 14A and sub-steps 1416, 1418, 1420, 1422, 1424, 1426, 1428 and 1430 shown in 1400B of FIG. 14B.

In step 1402, at the first SBC in response to receiving the first session initiation request a second session initiation request is generated. The second session initiation request is a second SIP Invite request and includes a second SDP message and a record-route header with the address and/or port of the first SBC. the second SDP message also includes information on the streams to be routed via the first route in one or more proprietary session initiation protocol (SIP) headers, one or more proprietary extensions to one or more existing SIP headers, or one or more proprietary SDP attributes of the second SDP message. Operation proceeds from step 1402 to step 1404.

In step 1404 the first SBC sends the second session initiation request to a second SBC via the media content processing entity. Operation proceeds from step 1404 to step 1406.

In step 1406, a third session initiation request is received at the second SBC. The third session initiation request being sent from the media content processing entity and including a third session description protocol message and the proprietary information included in the second initiation request. Operation proceeds from step 1406 to step 1408.

In step 1408, a fourth session initiation request is generated at the second SBC based on the third session initiation request. The fourth session initiation request includes a fifth session description protocol message including information on streams to be routed via the first route and the second route. Operation proceeds from step 1408 to step 1410.

In step 1410, the fourth session initiation request is sent from the second SBC to the second device. Operation proceeds from step 1410 to step 1412. In step 1412, a first response message is received from the second device at the second SBC in response to the fourth session initiation request. The first response message including a sixth SDP message. Operation proceeds from step 1412 to step 1414.

In step 1414, a second response message is generated at the second SBC. The second response message including a seventh SDP message. The second response message being based on the first response message and including information on the streams to be routed via the first route in one or more proprietary session initiation protocol (SIP) headers, one or more proprietary extensions to one or more existing SIP headers, or one or more proprietary attributes of the seventh SDP message. Operation proceeds from step 1414 shown on FIG. 14A to step 1416 shown in FIG. 14B.

In step 1416, the second response message is sent from the second SBC to the media content processing entity. Operation proceeds from step 1416 to step 1418. In step 1418, the second response message is received at the media content processing entity. Operation proceeds from step 1418 to step 1420.

In step 1420, a third response message is generated at the media content processing entity. The third response message is based on the second response message and includes the proprietary information relating to the streams to be routed via the first route. Operation proceeds from step 1420 to step 1422.

In step 1422, the third response message is sent from the media content processing entity to the first SBC. Operation proceeds from step 1422 to step 1424. In step 1424 the third response message is received at the first SBC. Operation proceeds from the step 1424 to step 1426. In step 1426, a fourth response message is generated at the first SBC based on the third response message. Operation proceeds from step 1426 to step 1428. In step 1428, the fourth response message is sent to the first device from the first SBC. Operation proceeds from step 1428 to step 1430. In step 1430, the fourth response message is received at the first device.

Figure 15B:
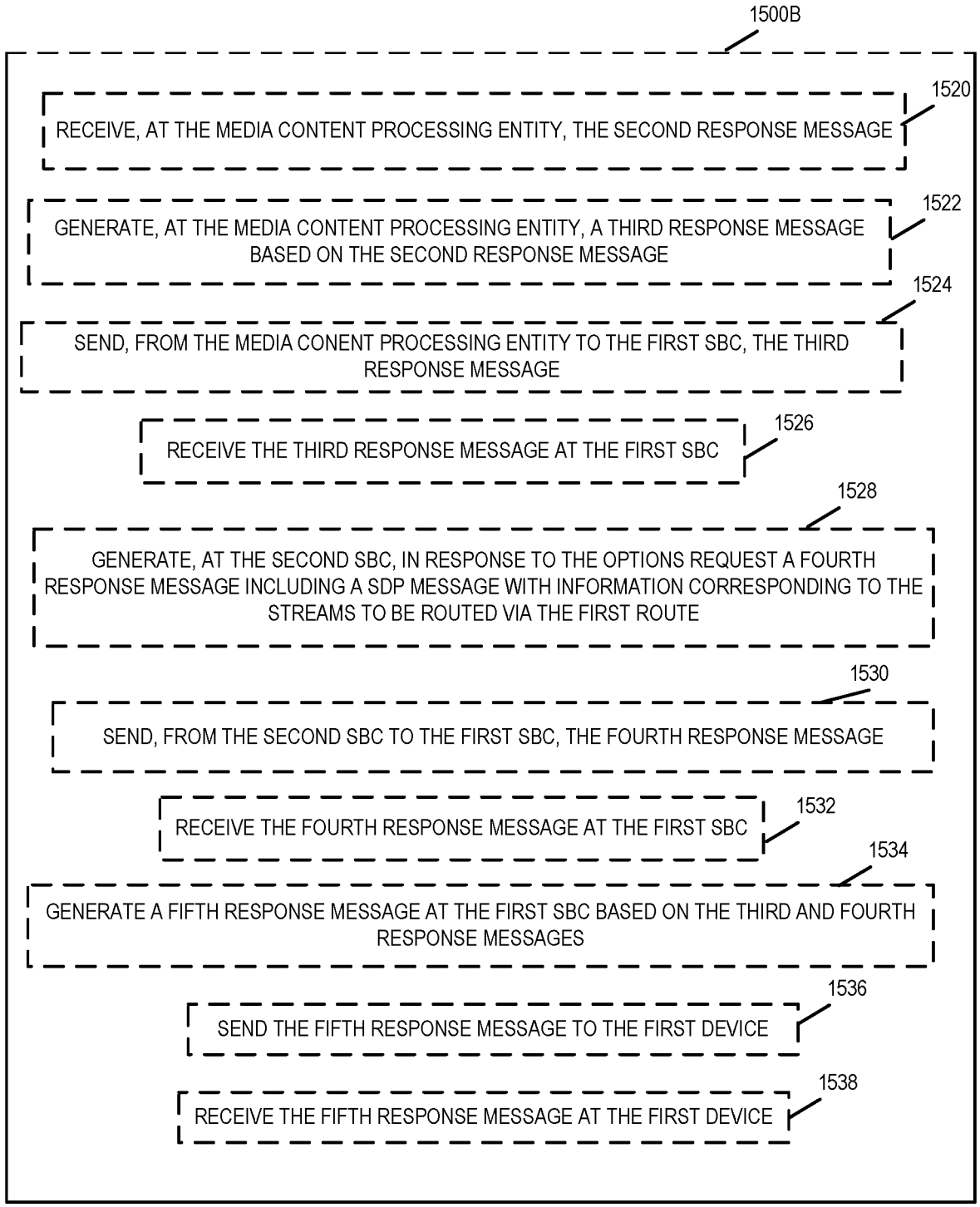
FIG. 15B illustrates a second part of a flowchart providing additional exemplary sub-steps of the route establishment step of the exemplary method illustrated in FIG. 13 in accordance with an embodiment of the present invention.

FIG. 15 comprises FIGS. 15A and 15B. FIG. 15A shows a first part of a set of optional sub-steps that may be, and in some embodiments are, implemented as part of step 1306 of the method 1300. FIG. 15B shows a second part of a set of optional sub-steps that may be, and in some embodiments are, implemented as part of the step 1306 of the method 1300. In some embodiments of the communications method 1300, step 1306 which establishes a plurality of routes to the second device includes one or more of sub-steps 1502, 1504, 1506, 1508, 1510, 1512, 1514, 1516, 1518 shown in 1500A of FIG. 15A and sub-steps 1520, 1522, 1524, 1526, 1528, 1530, 1532, 1536 and 1538 shown in 1500B of FIG. 15B.

In step 1502, at the first SBC in response to receiving the first session initiation request a second session initiation request is generated. The second session initiation request is a second SIP invite request including a second SDP message and a record-route header with the address and/or port of the first SBC. The second SDP message does not include information on the streams to be routed via the first route. The information on the streams to be routed via the first route included in the second session initiation request being a call leg session identifier included in the SIP record-route header. Operation proceeds from step 1502 to step 1504. In step 1504, the second session initiation request is sent to a second SBC via the media content processing entity. Operation proceeds from step 1504 to step 1506.

In step 1506, a SIP Options Request with a third session description protocol message and a route header is sent from the first SBC to the second SBC without traversing the media content processing entity. The third SDP message includes information corresponding to the streams from the session to be routed via the first route and the SIP Options request route header including the call leg session identifier. Operation proceeds from step 1506 to step 1508.

In step 1508, at the second SBC, the SIP Options request is received from the first SBC and a third session initiation request is received from the media content processing entity. The third session initiation request being based on the second initiation request, being sent from the media content processing entity, and including a fourth session description protocol message and any proprietary information sent in the second request along with the record-route header including the call leg session. Operation proceeds from step 1508 to step 1510.

In step 1510, a fourth session initiation request is generated at the second SBC based on the SIP Options Request and the third session initiation request. The fourth session initiation request including a fifth session description protocol message including information on the streams to be routed via the first route and the second route. Operation proceeds from step 1510 to step 1512.

In step 1512, the fourth session initiation request is sent from the second SBC to the second device. In some embodiments the second SBC is an edge of network device. Operation proceeds from step 1512 to step 1514. In step 1514, a first response message is received at the second SBC in response to the fourth session initiation request. The first response message includes a sixth SDP message. Operation proceeds from step 1514 to step 1516. In step 1516, the second SBC generates a second response message including a seventh SDP message. The second response is generated based on the first response message and includes information on the streams to be routed via the second route. Operation proceeds from step 1516 to step 1518. In step 1518, the second SBC sends the second response message to the media content processing entity. Operation proceeds from step 1518 to step 1520 shown on FIG. 15B.

In step 1520, the second response message is received at the media content processing entity. Operation proceeds from step 1520 to step 1522. In step 1522, a third response message is generated at the media content processing entity based on the second response message. Operation proceeds from step 1522 to step 1524. In step 1524, the third response message is sent from the media content processing entity to the first SBC. Operation proceeds from step 1524 to step 1526. In step 1526, the third response message is received at the first SBC. Operation proceeds from step 1526 to step 1528. In step 1528, a fourth response message including a SDP message with information corresponding to the streams to be routed via the first route is generated at the second SBC. Operation proceeds from step 1528 to step 1530. In step 1530, the fourth response message is sent from the second SBC to the first SBC without traversing the media content processing entity. Operation proceeds from step 1528 to step 1530. In step 1530, the fourth response message is sent from the second SBC to the first SBC. Operation proceeds from step 1530 to step 1532.

In step 1532, the fourth response message is received at the first SBC. Operation proceeds from step 1532 to step 1534. In step 1534, a fifth response message is generated at the first SBC based on the third and fourth response messages. Operation proceeds from step 1534 to step 1536. In step 1536, the fifth response message is sent to the first device from the first SBC. Operation proceeds from step 1536 to step 1538. In step 1538 the fifth response message is received at the first device.

Various embodiments of the present invention will now be described.

A communications method embodiment 1 comprising: receiving, by a first Session Border Controller (SBC), a first session initiation request from a first device directed to a second device for a session including a plurality of streams; establishing, by the first SBC, a plurality of routes to the second device, said plurality of routes including at least a first route and a second route, the first route not including a media content processing entity and the second route including a media content processing entity; identifying, by the first SBC, from the plurality of streams for the session a first set of streams, said first set of streams including one or more streams that do not require media content processing; and routing, by the first SBC, one or more of the streams of the first set of streams of the session to the second device via the first route.

A communications method embodiment 1A including the communications method embodiment 1 wherein the first device and second device are peer devices.

A communications method embodiment 1AA including the communications method of embodiment 1A wherein the first device and second devices are user devices.

A communication method embodiment 1AAA including the communications method embodiment 1AA wherein the first SBC is an edge of network device.

A communications method embodiment 1B including the communications method embodiment 1 wherein the first route includes a second SBC and wherein said first or said second SBC is an edge of network device.

A communications method embodiment 1BB including the communication method embodiment 1B wherein the first SBC and the second SBC are edge of network devices.

A communications method embodiment including the communications method embodiment 1 further including routing via the second route, by the first SBC, the streams of the plurality of streams that are not routed to the second device via the first route.

A communications method embodiment 2A including the communications method embodiment 1 wherein the first route bypasses the media content processing entity.

A communications method embodiment 2B including the communications method of embodiment 1 wherein the first SBC identifies non-real time streams included in the session for inclusion in the first set of streams.

A communications method embodiment 2C including the communications method embodiment 2 wherein at least one of the streams that do not require media content processing is routed to the second device via the first route.

A communications method embodiment 2D including the communications method embodiment 2 wherein the media content processing entity is a Media Resource Function apparatus that performs either transcoding, transrating or transizing on at least a portion of the media of a first stream, said first stream being a stream from the plurality of streams for the session routed via the second route.

A communications method embodiment 2DD including the communications method embodiment 2D wherein a media content of said first stream includes at least one of audio or video and the first media processing entity performs said transcoding, transrating or transizing on at least a portion of said audio or said video.

A communications method embodiment 3 including the communications method embodiment 1 wherein said first session initiation request includes a first session description protocol (SDP) message including information describing the plurality of streams included in the session; and wherein said identifying the first set of streams is based on the information describing the plurality of streams included in the first SDP message.

A communications method embodiment 3A including the communications method embodiment 3, wherein one or more of the following types of non-real time streams are identified as part of the first set of streams: Message Session Relay Protocol (MSRP) streams, Binary Floor Control Protocol (BFCP) streams, Far End Camera Control protocol streams and webRTC data channel streams.

A communications method embodiment 4 including the communications method embodiment 3 further including determining which of the streams of the plurality of streams included in the session are non-real time streams and identifying those streams as the first set of streams.

A communications method embodiment 4A including the communications method embodiment 4 wherein determining which of the streams of the plurality of streams are non-real time streams is based on at least one of a media type, a transport protocol type, or a format type of the stream.

A communications method embodiment 5 including the communications method embodiment 3 further including determining which of the streams of the plurality of streams included in the session are real-time streams and excluding those streams from the first set of streams.

A communications method embodiment 5A including the communications method embodiment 3 further including: determining which of the plurality of streams included in the session are audio or video streams and excluding those streams from the first set of streams.

A communications method embodiment 6 including the communications method embodiment 2 wherein the media content processing entity is a Media Resource Function apparatus operating in back-to-back user agent mode.

A communications method embodiment 6A including the communications method embodiment 6 wherein the Media Resource Function apparatus does not support processing or pass through of non-real time protocol streams.

A communications method embodiment 6B including the communications method of embodiment 6A further including: determining, by the SBC, which of the plurality of streams for the session is not supported by the Media Resource Function apparatus and including these streams in the first set of streams.

A communications method embodiment 6C including the communications method embodiment 6B wherein the one or more streams from the first set of streams that are routed via the first route includes the streams determined not to be supported by the Media Resource Function apparatus.

A communications method embodiment 7 including the communications method embodiment 3 wherein the first session initiation request is a Session Initiation Protocol (SIP) Invite request and the first and second routes include a second Session Border Controller, the method further including: routing, by the first SBC, at least one of the plurality of streams for the session via the second route; wherein establishing a plurality of routes to the second device includes: generating, at the first SBC, in response to receiving the first session initiation request, a second session initiation request, the second session initiation request being a second SIP Invite request including a second SDP message and a Record-Route header with the address of the first SBC, said second SIP Invite request including information on the streams to be routed via the first route in one or more proprietary Session Initiation Protocol (SIP) headers, one or more proprietary extensions to one or more existing SIP headers, or one or more proprietary SDP attributes of the second SDP message; and sending the second session initiation request to the second SBC via the media content processing entity.

A communications method embodiment 7A including the communications method embodiment 7 wherein one or more existing SIP headers is a SIP Route header.

A communications method embodiment 8 including the communications method embodiment 7A wherein the second SDP message does not include information on the streams to be routed via the first route, and the information on the streams to be routed via the first route included in the second session initiation request being a call leg session identifier included in the SIP Route header; and wherein establishing a plurality of routes to the second device further includes: sending, from the first SBC to the second SBC without traversing the media content processing entity, a SIP Options request with a third session description protocol (SDP) message and a route header, the third SDP message including information corresponding to the streams from the session to be routed via the first route, and the SIP Options request route header including the call leg session identifier.

A communications method embodiment 9 including the communications method embodiment 8 wherein establishing a plurality of routes to the second device further includes: receiving, at the second SBC, the SIP Options request and a third session initiation request, said third session initiation request being sent from the media content processing entity and including a fourth session description protocol message and the proprietary information included in the second initiation request; generating a fourth session initiation request, at the second SBC, based on the SIP Options request and THE third session initiation request, the fourth session initiation request including a fifth session description protocol message including information on streams to be routed via the first route and the second route; and sending the fourth session initiation request to the second device.

A communications method 10 including the communications method embodiment 7 wherein establishing a plurality of routes to the second device further includes: receiving, at the second SBC, a third session initiation request, said third session initiation request being sent from the media content processing entity and including a third session description protocol message and the proprietary information included in the second initiation request; generating a fourth session initiation request, at the second SBC, based on the third session initiation request, the fourth session initiation request including a fifth session description protocol message including information on streams routed via the first route and the second route; and sending the fourth session initiation request to the second device.

A communications method embodiment 10A including the communications method embodiment 10 wherein establishing a plurality of routes to the second device further includes: receiving, at the second SBC from the second device, in response to the fourth session initiation request a first response message, said first response message including a sixth SDP message; generating, at the second SBC, a second response message including a seventh SDP message, said second response message being based on the first response message and including information on the streams to be routed via the first route in one or more proprietary Session Initiation Protocol (SIP) headers, one or more proprietary extensions to one or more existing SIP headers, or one or more proprietary attributes of the seventh SDP message; and sending the second response message to the media content processing entity.

A communications method embodiment 10B including the communications method embodiment 10A wherein establishing a plurality of routes to the second device further includes: receiving, at the media content processing entity, the second response message; generating, at the media content processing entity, a third response message based on the second response message and including the proprietary information relating to the streams routed with the first route; sending the third response message to the first SBC, receiving the third response message at the first SBC, and generating a fourth response message at the first SBC based on the third response message; and sending the fourth response message to the first device.

A communications system embodiment 1 including a first Session Border Controller, said first Session Border Controller comprising: an I/O interface configured to receive a first session initiation request from a first device directed to a second device for a session including a plurality of streams; a determination module configured to identify from the plurality of streams for the session a first set of streams, said first set of streams including one or more streams that do not require media content processing; and a routing module configured to: (i) establish a plurality of routes to the second device, said plurality of routes including at least a first route and a second route, the first route not including a media content processing entity and the second route including a media content processing entity and (ii) route one or more of the streams of the first set of streams of the session to the second device via the first route.

A communications system embodiment 1A including the communications system embodiment 1 wherein the first device and second device are peer devices.

A communications system embodiment 1AA including the communications system embodiment 1A wherein the first device and second devices are user devices.

A communications system embodiment 1AAA including the communications system embodiment 1AA wherein the first SBC is an edge of network device.

A communications system embodiment 1AAAA including the communication system embodiment 1A further including a second Session Border Controller (SBC) and wherein at least one of said first and second SBCs are an edge of network device.

A communications system embodiment 2 including the communications system embodiment 1 wherein said routing module is further configured to route via the second route the streams of the plurality of streams that are not routed to the second device via the first route.

A communications system embodiment 2A including the communications system embodiment 1 wherein the first route bypasses the media content processing entity.

A communications system embodiment 2B including the communications system embodiment 1 wherein the first SBC determination module identifies non-real time streams included in the session for inclusion in the first set of streams.

A communications system embodiment 2C including the communications system embodiment 2 wherein at least one of the streams that do not require media content processing is routed to the second device via the first route.

A communications system embodiment 2D including the communications system embodiment 2 wherein the media content processing entity is a Media Resource Function apparatus that performs either transcoding, transrating or transizing on at least a portion of the media of a first stream, said first stream being a stream from the plurality of streams for the session routed via the second route.

A communications system embodiment 2DD including the communications system embodiment 2D wherein a media content of said first stream includes at least one of audio or video and the first media processing entity performs said transcoding, transrating or transizing on at least a portion of said audio or said video.

A communications system embodiment 3 including the communications system embodiment 1 wherein said first session initiation request includes a first session description protocol (SDP) message including information describing the plurality of streams included in the session; and wherein said determination module is configured to identify the first set of streams based on the information describing the plurality of streams included in the first SDP message.

A communications system embodiment 3A including the communications system embodiment 3, wherein one or more of the following types of non-real time streams are identified as part of the first set of streams: Message Session Relay Protocol (MSRP) streams, Binary Floor Control Protocol (BFCP) streams, Far End Camera Control protocol streams and webRTC data challenge streams.

A communications system embodiment 4 including the communications system embodiment 3 wherein said determination module is further configured to determine which of the streams of the plurality of streams included in the session are non-real time streams and identify those streams as the first set of streams.

A communications system embodiment 4A including the communications system embodiment 4 wherein said determination module is configured to determine which of the streams of the plurality of streams are non-real time streams based on at least one of a media type, a transport protocol type, or a format type of the stream.

A communications system embodiment 5 including the communications system of embodiment 3 wherein said determination module is further configured to determine which of the streams of the plurality of streams included in the session are real-time streams and to exclude those streams from the first set of streams.

A communications system embodiment 5A including the communications system embodiment 3 wherein said determination module is further configured to determine which of the plurality of streams included in the session are audio or video streams and to exclude those streams from the first set of streams.

A communications system embodiment 6 including the communications system embodiment 2 wherein the media content processing entity is a Media Resource Function apparatus configured to operate in back-to-back user agent mode.

A communications system embodiment 6A including the communications system embodiment 6 wherein the Media Resource Function apparatus does not support processing or pass through of non-real time protocol streams.

A communications systems embodiment 6B including the communications system of embodiment 6A wherein said determination module is further configured to determine which of the plurality of streams for the session is not supported by the Media Resource Function apparatus and to include these streams in the first set of streams.

A communications system embodiment 6C including the communications system embodiment 6B wherein the one or more streams from the first set of streams that are routed via the first route includes the streams determined not to be supported by the Media Resource Function apparatus.

A communications embodiment 7 including the communications system embodiment 3 wherein the first session initiation request is a Session Initiation Protocol (SIP) Invite request and the first and second routes include a second Session Border Controller, the system further including: said routing module being further configured to route at least one of the plurality of streams for the session via the second route; and wherein said routing module being configured to establish a plurality of routes to said the second devices includes a generation request module, said generation request module being configured to generate in response to said first SBC receiving the first session initiation request, a second session initiation request, the second session initiation request being a second SIP Invite request including a second SDP message and a Record-Route header with the address of the first SBC, said second SIP Invite request including information on the streams to be routed via the first route in one or more proprietary Session Initiation Protocol (SIP) headers, one or more proprietary extensions to one or more existing SIP headers, or one or more proprietary SDP attributes of the second SDP message and to send the second session initiation request to the second SBC via the media content processing device.

A communications system embodiment 7A including the communications system embodiment 7 wherein one or more existing SIP headers is a SIP Route header.

A communications system embodiment 8 including the communications system embodiment 7A, wherein the second SDP message does not include information on the streams to be routed via the first route, and the information on the streams to be routed via the first route included in the second session initiation request being a call leg session identifier included in the SIP Route header; and wherein said routing module configured to establish a plurality of routes to the second device is configured to send, from the first SBC to the second SBC without traversing the media content processing entity, a SIP Options request with a third session description protocol (SDP) message and a route header, the third SDP message including information corresponding to the streams from the session routed via the first route, and the SIP Options request route header including the call leg session identifier.

A communications system embodiment 9 including the communications system embodiment 8 wherein said second SBC includes: an I/O interface configured to receive, the SIP Options request and a third session initiation request, said third session initiation request being sent from the media content processing entity and including a fourth session description protocol message and the proprietary information included in the second initiation request; and a routing module configured to generate a fourth session initiation request, based on the SIP Options request and third session initiation request, the fourth session initiation request including a fifth session description protocol message including information on streams routed via the first route and the second route; and said I/O Interface included in said second SBC further configured to send the fourth session initiation request to the second device.

A communications system embodiment 10 including the communications system embodiment 7 wherein said second SBC includes: an I/O interface configured to receive a third session initiation request, said third session initiation request being sent from the media content processing entity and including a third session description protocol message and the proprietary information included in the second initiation request; and a routing module configured to generate a fourth session initiation request based on the third session initiation request, the fourth session initiation request including a fifth session description protocol message including information on streams routed via the first route and the second route; and said I/O interface included in said second SBC is further configured to send the fourth session initiation request to the second device.

A communications systems embodiment 10A including the communications system embodiment 10: wherein said I/O Interface included in said second SBC is further configured to receive a first response message with a sixth SDP message to the fourth session initiation request from the second device and send a second response message to the media content processing entity; said routing module included in said second SBC being further configured to generate said second response message with a seventh SDP message based on the first response message, said second response message including information on the streams to be routed via the first route in one or more proprietary Session Initiation Protocol (SIP) headers, one or more proprietary extensions to one or more existing SIP headers, or one or more proprietary attributes of the seventh SDP message.

A communications system 10B including the communications system of embodiment 10A wherein said media content processing entity includes: an I/O Interface configured to receive the second response message; and a routing module configured to generate a third response message based on the second response message, said third response message including the proprietary information relating to the streams routed with the first route; and said I/O Interface is further configured to send the third response message to the first SBC; and wherein said I/O Interface at said first SBC is configured to receive the third response message at the first SBC and send a fourth response message to the first device; and said routing module at said first SBC is further configured to generate said fourth response message based on the third response message.

A non-transitory computer readable medium having machine executable instructions stored thereon for controlling a processor in a session border controller, the non-transitory computer readable medium including: code for controlling the processor to receive a first session initiation request from a first device directed to a second device for a session including a plurality of streams; code for controlling the processor to establish a plurality of routes to the second device, said plurality of routes including at least a first route and a second route, the first route not including a media content processing entity and the second route including a media content processing entity; code for controlling the processor to identify from the plurality of streams for the session a first set of streams, said first set of streams including one or more streams that do not require media content processing; and code for controlling the processor to route one or more of the streams of the first set of streams of the session to the second device via the first route.

The techniques of various embodiments may be implemented using software, hardware and/or a combination of software and hardware. Various embodiments are directed to apparatus and/or system, e.g., communications device such as a session border controllers, e.g., a session border controller, etc. Various embodiments are also directed to methods, e.g., a method of operating a communications device such as a session border controller, etc. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices described herein are implemented using one or more modules to perform the steps corresponding to one or more methods, for example, signal generation, signal transmission, signal reception, signal processing, and/or other steps. Thus, in some embodiments various features are implemented using modules. Such modules may be implemented using software, hardware, e.g., circuits, or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a session border controller (SBC) including a processor configured to implement one, multiple or all of the steps of one or more methods of the invention.

In some embodiments, the processor or processors, e.g., CPUs, of one or more devices, e.g., of the communications device, e.g., session border controller, are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device, e.g., a session border controller, with a processor which includes a module corresponding to each of the steps of the various described methods performed by the device in which the processor is included. In some but not all embodiments an apparatus, e.g., a communications device, e.g., a session border controller, includes a module corresponding to each of the steps of the various described methods performed by the device in which the processor is included. The modules may be implemented using software and/or hardware. The hardware may be circuits, ASICs or other specialized or dedicated circuitry.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device, e.g., a session border controller or a web server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
    receiving, by a first Session Border Controller (SBC), a first session initiation request from a first device directed to a second device for a session including a plurality of streams, said first session initiation request including information describing the plurality of streams included in the session;
    determining, by the first SBC, from the plurality of streams for the session a first set of streams, said first set of streams including one or more streams that do not require media content processing, said determining the first set of streams being based on the information describing the plurality of streams included in the session;
    establishing, by the first SBC, a plurality of routes to the second device, said plurality of routes including at least a first route and a second route, the first route not including a media content processing entity and the second route including a media content processing entity that performs transcoding, transrating or transizing on media content, said first and said second routes both including said first SBC and a second SBC; and
    routing, by the first SBC, one or more of the streams of the first set of streams of the session to the second device via the first route.

2. The communications method of claim 1 further including routing via the second route, by the first SBC, the streams of the plurality of streams that are not routed to the second device via the first route.

3. The communications method of claim 2 further including:
    identifying which of the streams of the plurality of streams included in the session are non-real time application streams; and
    wherein said determining from the plurality of streams for the session the first set of streams includes determining that the identified non-real time application streams are streams of said first set of streams.

4. The communications method of claim 3, wherein said identifying which of the streams of the plurality of streams included in the session are non-real time application streams is based on at least one of a media type, a transport protocol type, or a format type of the stream.

5. The communications method of claim 4,
    wherein said establishing a plurality of routes to the second device includes sending, from the first SBC to the second SBC without traversing the media content processing entity, a Session Initiation Protocol (SIP) Options request including information corresponding to the streams from the session to be routed via the first route, said information including a call leg session identifier.

6. The communications method of claim 5, wherein establishing a plurality of routes to the second device further includes:
    receiving, at the second SBC, the SIP Options request from the first SBC;
    receiving, at the second SBC, a session initiation request from the media content processing entity, said session initiation request including said call leg session identifier and information on the second set of streams;

generating, at the second SBC, a second session initiation request based on the SIP Options request received from the first SBC and the session initiation request received from the media content processing entity, the second session initiation request including information on streams to be routed via the first route and the second route; and sending from the second SBC the second session initiation request to the second device.

7. The communications method of claim 2 further including determining which of the streams of the plurality of streams included in the session are real-time streams and excluding those streams from the first set of streams.

8. The communications method of claim 2 further including:
identifying which of the streams of the plurality of streams included in the session are Message Session Relay Protocol streams, Binary Floor Control Protocol streams, Far End Camera Control protocol streams and webRTC data challenge streams; and
wherein said determining from the plurality of streams for the session the first set of streams includes determining that the identified Message Session Relay Protocol streams, Binary Floor Control Protocol streams, Far End Camera Control protocol streams and webRTC data challenge streams are streams of said first set of streams.

9. The communications method of claim 1, wherein the media content processing entity is a Media Resource Function apparatus operating in back-to-back user agent mode.

10. The communications method of claim 9, wherein the Media Resource Function apparatus does not support processing or pass through of non-real time protocol streams.

11. A communications system comprising:
a first Session Border Controller, said first Session Border Controller (SBC) including one or more processors configured to operate the first SBC to perform the following operations:
receive a first session initiation request from a first device directed to a second device for a session including a plurality of streams, said first session initiation request including information describing the plurality of streams included in the session;
determine from the plurality of streams for the session a first set of streams, said first set of streams including one or more streams that do not require media content processing, said determining the first set of streams being based on the information describing the plurality of streams included in the session;
establish a plurality of routes to the second device, said plurality of routes including at least a first route and a second route, the first route not including a media content processing entity and the second route including a media content processing entity that performs transcoding, transrating or transizing on media content, said first and said second routes both including said first SBC and a second SBC; and
route one or more of the streams of the first set of streams of the session to the second device via the first route.

12. The communications system of claim 11, wherein said one or more processors is further configured to operate said first SBC to route via the second route the streams of the plurality of streams that are not routed to the second device via the first route, and
wherein said first SBC is a single device that receives the plurality of streams included in the session from the first device.

13. The communications system of claim 12,
wherein said one or more processors included in the first SBC are further configured to operate the first SBC to perform the following operation:
identify which of the streams of the plurality of streams included in the session are non-real time application streams; and
wherein said operation to determine from the plurality of streams for the session the first set of streams includes determining that the identified non-real time application streams are streams of said first set of streams.

14. The communications system of claim 13, wherein said operation to identify which of the streams of the plurality of streams included in the session are non-real time application streams is based on at least one of a media type, a transport protocol type, or a format type of the stream.

15. The communications system of claim 14,
wherein said operation to establish a plurality of routes to the second device further includes:
sending, from the first SBC to the second SBC without traversing the media content processing entity, a Session Initiation Protocol (SIP) Options request including information corresponding to the streams from the session to be routed via the first route, said information including a call leg session identifier.

16. The communications system of claim 12, wherein said operation to determine from the plurality of streams for the session a first set of streams includes identifying which of the streams of the plurality of streams included in the session are real-time streams and excluding those streams from the first set of streams.

17. The communications system of claim 12,
wherein said one or more processors included in the first SBC are further configured to operate the first SBC to identify which of the streams of the plurality of streams included in the session are Message Session Relay Protocol streams, Binary Floor Control Protocol streams, Far End Camera Control protocol streams and webRTC data challenge streams; and
wherein said operation to determine from the plurality of streams for the session the first set of streams includes determining that the identified Message Session Relay Protocol streams, Binary Floor Control Protocol streams, Far End Camera Control protocol streams and webRTC data challenge streams are streams of said first set of streams.

18. The communications system of claim 11, wherein the media content processing entity is a Media Resource Function apparatus operating in back-to-back user agent mode.

19. The communications system of claim 18, wherein the Media Resource Function apparatus does not support processing or pass through of non-real time protocol streams.

20. A non-transitory computer readable medium having machine executable instructions stored thereon for controlling one or more processors in a first session border controller that operate the first session border controller (SBC), the non-transitory computer readable medium including:
code for controlling said one or more processors to operate the first SBC to receive a first session initiation request from a first device directed to a second device for a session including a plurality of streams, said first session initiation request including information describing the plurality of streams included in the session;

code for controlling the one or more processors to operate the first SBC to determine from the plurality of streams for the session a first set of streams, said first set of streams including one or more streams that do not require media content processing, said determining the first set of streams being based on the information describing the plurality of streams included in the session;

code for controlling the one or more processors to operate the first SBC to establish a plurality of routes to the second device, said plurality of routes including at least a first route and a second route, the first route not including a media content processing entity and the second route including a media content processing entity that performs transcoding, transrating or transizing on media content, said first and said second routes both including said first SBC and a second SBC; and code for controlling the one or more processors to operate the first SBC to route one or more of the streams of the first set of streams of the session to the second device via the first route.

* * * * *